US012249773B1

(12) United States Patent
Veysoglu

(10) Patent No.: US 12,249,773 B1
(45) Date of Patent: Mar. 11, 2025

(54) INTERLEAVED PHASED ARRAY ANTENNAS

(71) Applicant: Amazon Technologies, Inc., Seattle, WA (US)

(72) Inventor: Murat Veysoglu, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 18/096,367

(22) Filed: Jan. 12, 2023

Related U.S. Application Data

(62) Division of application No. 17/064,384, filed on Oct. 6, 2020, now Pat. No. 11,575,204.

(51) Int. Cl.
*H01Q 21/29* (2006.01)
*H01Q 3/34* (2006.01)
*H01Q 5/42* (2015.01)

(52) U.S. Cl.
CPC ................. *H01Q 5/42* (2015.01); *H01Q 3/34* (2013.01); *H01Q 21/29* (2013.01)

(58) Field of Classification Search
CPC ............ H01Q 5/42; H01Q 21/29; H01Q 1/24; H01Q 1/18; H01Q 1/38; H01Q 3/26
See application file for complete search history.

(56) References Cited

U.S. PATENT DOCUMENTS

| | | | | |
|---|---|---|---|---|
| 3,755,815 | A | 8/1973 | Stangel | |
| 10,256,551 | B2 * | 4/2019 | Shehan | H01Q 1/526 |
| 11,552,405 | B1 * | 1/2023 | Bily | H01Q 21/061 |
| 2004/0155820 | A1 | 8/2004 | Sreenivas | |
| 2016/0233588 | A1 * | 8/2016 | Bily | H01Q 21/064 |
| 2016/0315386 | A1 | 10/2016 | Klemes | |
| 2018/0277963 | A1 | 9/2018 | Desclos | |
| 2018/0323490 | A1 * | 11/2018 | Harp | H01Q 1/405 |
| 2019/0252796 | A1 | 8/2019 | Mahanfar | |
| 2019/0252801 | A1 * | 8/2019 | Mahanfar | H01Q 21/24 |
| 2021/0265741 | A1 | 8/2021 | Kenington | |

* cited by examiner

*Primary Examiner* — Awat M Salih
(74) *Attorney, Agent, or Firm* — Lowenstein Sandler LLP

(57) ABSTRACT

Technologies directed to interleaved phased array antennas are described. One apparatus includes a support structure, a first phased array antenna, and a second phased array antenna. The first array antenna includes a first set of antenna elements disposed on a surface of the support structure. The first set of antenna elements is located within a perimeter of a first circular area. The second antenna includes a second set of antenna elements. The second set of antenna elements is located within a perimeter of a second circular area. The second circular area partially overlaps the first circular area. The majority of the second set of antenna elements are located outside the perimeter of the first circular area. A majority of the second set of antenna elements are located in the second circular area in the area not overlapped by the first circular area.

20 Claims, 30 Drawing Sheets

INTERLEAVED PHASED ARRAY ANTENNAS

RELATED APPLICATIONS

This application is a divisional of U.S. patent application Ser. No. 17/064,384, filed on Oct. 6, 2020, now U.S. Pat. No. 11,575,204, the entire contents of which are hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
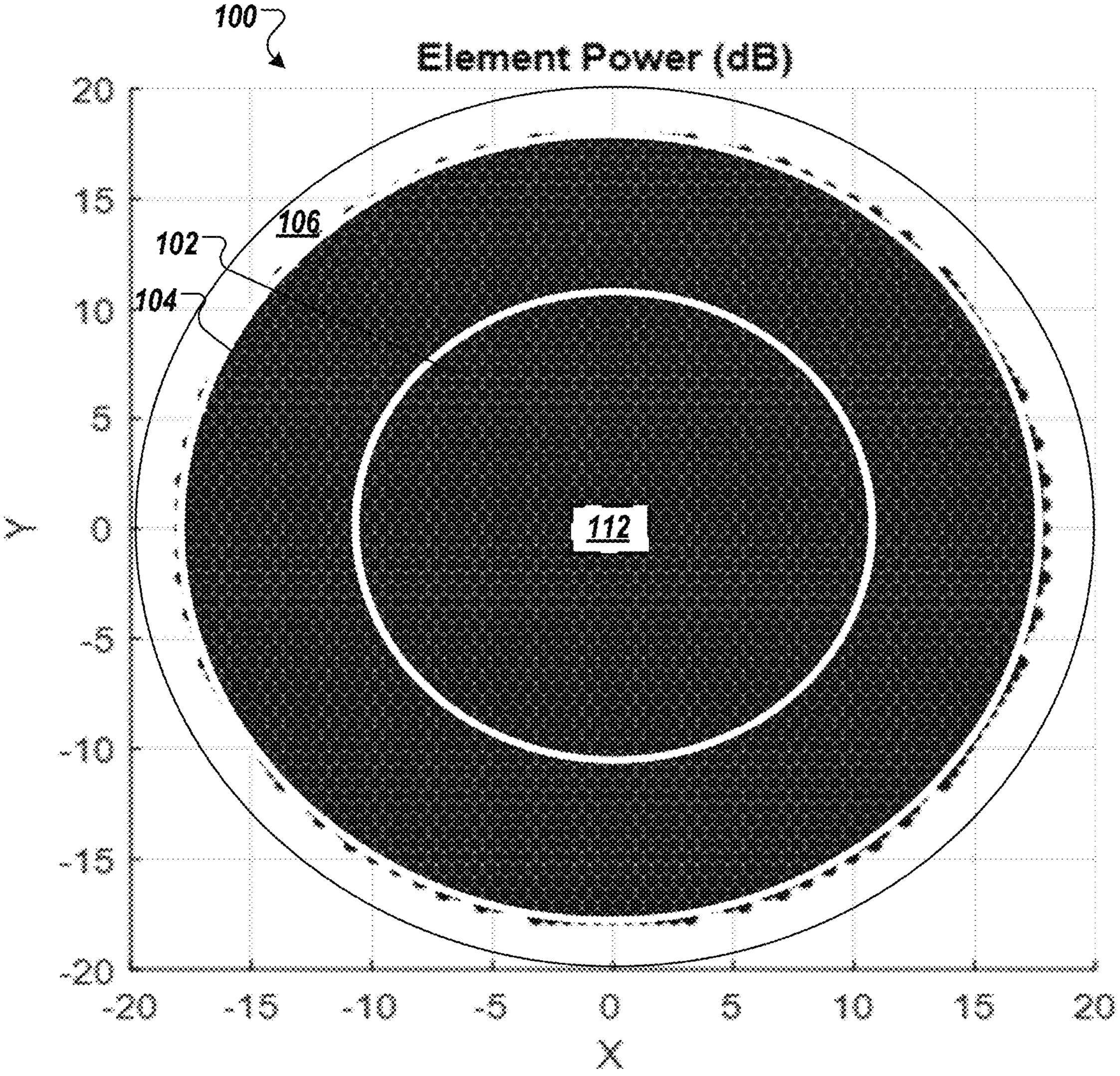
FIG. 1 illustrates an antenna structure with two interleaved phased array antennas disposed on a support structure, according to one embodiment.

Technologies directed to interleaved phased array antennas are described. Conventionally, wireless devices that have multiple phased array antennas would have separate printed circuit boards (PCBs), each PCB including one of the multiple phased array antennas. The phased array antenna synthesizes a specified electric field (phase and amplitude) across an aperture and the elements are spaced apart with a specified inter-element spacing value (e.g., a distance between any two elements of the phased array antenna) as well as disposed within an organized structure to generate a high-quality signal. As a result, wireless devices with multiple phased array antennas have multiple apertures, one aperture per phased array antenna. For example, a user terminal that communicates with a satellite using a first frequency band for downlink communications and another frequency band for uplink communications includes two separate PCBs with two separate apertures. An aperture refers to an absence of materials above the antenna elements of the phased array antenna that allows the antenna elements to radiate electromagnetic energy in order to send a signal (transmitting (TX) signal) to another device or receive and measure an incoming signal (receiving (RX) signal) at the antenna elements. In some cases, there may be some protective material in the aperture above the antenna elements that does not affect the sending and receiving of wireless signals. The multiple apertures and the corresponding PCBs contribute to the size and cost of the wireless device.

Aspects of the present disclosure overcome the deficiencies of conventional wireless devices by interleaving the position of multiple phased array antennas in a single aperture. Aspects of the present disclosure can allow two phased array antennas, performing different radio functions to share an aperture. Examples of different radio functions can include 1) transmitting with a first phased array antenna and receiving with a second phased array antenna, 2) operating a first phased array antenna with a first polarization (e.g., right-hand-circular polarization (RHCP)) and operating a second phased array antenna with a second polarization (e.g., left-hand-circular polarization (LHCP), 3) transmitting/receiving a first beam (or a first beam set) with a first phased array antenna and transmitting/receiving a second beam (or a second beam set) with a second phased array antenna, 4) transmitting/receiving signals with a first phased array antennas as a primary antenna and transmitting/receiving signals with a second phased array antennas a diversity antenna or a secondary antenna in a multiple-input-multiple-output (MIMO) setup, or the like. One apparatus includes a support structure, a first phased array antenna, and a second phased array antenna. The first array antenna includes a first set of antenna elements disposed on a surface of the support structure. The first set of antenna elements is located within a perimeter of a first area. The first area may have an elliptical shape. The second antenna includes a second set of antenna elements. The second set of antenna elements is located within a perimeter of a second area. The second area may have an elliptical shape. The second ellipse partially overlaps the first area. The majority of the second set of antenna elements is located outside the perimeter of the first area. That is, the majority of the second set of antenna elements is located in the second area in the region not overlapped by the first area. The majority may include more than half of the elements. For example, more than 50%, 60%, 70%, 80%, or 90% of the total elements of the second set of antenna elements are located in the second area. One factor in the design of an array antenna is the organized structure or shape of the array antenna formed by the antenna elements. This is typically designed as a compromise between competing figures of merit: the number of elements for a given total array aperture, the desired performance at the design scan angle, and the surface area required by the array antenna to perform the desired function. Aspects of the present disclosure can provide a number of elements of a second array antenna that are interleaved into the overall shape and structure of a first array antenna. In some cases, the combined surface area of the first and second antenna arrays is smaller when interleaved together than if each array antenna were disposed spatially separate. For example, the combined aperture size needed for the combined interleaved array antennas may be smaller than the combined aperture size needed for the array antenna if each antenna includes unique apertures.

Aspects of the present disclosure overcome the deficiencies of conventional wireless devices by providing two interleaved phased array antennas, performing different radio functions (e.g., receive, transmit, different frequency bands, polarization, beam set, etc.) that share an aperture. In some embodiments, a first antenna may perform a receiving function, while a second antenna performs a transmitting function. In another embodiment, the first antenna may operate in a first frequency range, and the second antenna may operate at a second frequency range different from the first frequency range. In another embodiment, the first antenna may operate with a first polarization (e.g., RHCP, horizontal polarization, or other types of polarizations), and the second antenna may operate with a second polarization (e.g., LHCP, vertical polarization, or other types of opposite polarizations). In another embodiment, the first antenna may to designed to send or receive radio frequency (RF) signals of a first beam set (e.g., a first beam), and the second antenna is designed to send or receive RF signals of a second beam set (e.g., a second beam) that is different that the first beam set. In some embodiments, each antenna may operate in any combination of radio functions.

Aspects of the present disclosure overcome the deficiencies of conventional wireless devices by providing two interleaved phased array antennas disposed on a support structure. In some embodiments, concentric interleaved array antenna configurations are used to achieve a level of performance for a given surface area of a shared aperture. In other embodiments, the array antennas may be disposed in a polygon configuration (e.g., the antenna elements form an ellipse, super-ellipse, circle, square, or the like). The array antenna configurations may overlap with each other. For example, elements of a first array antenna may form a first ellipse and elements of a second array may form a second ellipse. The elements of the first array antenna may also be disposed in the second ellipse in an area overlapped by both the first and second ellipse. The interleaved antenna configurations may minimize overall array antenna size while maintaining a threshold level of performance. The interleaved antenna configuration may lead to a reduction in the overall size of the antenna leading to compact packaging, and reduced manufacturing costs, while still maintaining a desired collective antenna performance.

FIG. 1 illustrates an antenna structure 100 with two interleaved phased array antennas 102, 104 disposed on a support structure 106 according to one embodiment. A first phased array antenna 102 includes a first set of antenna elements disposed on a surface of the support structure 106. A second phased array antenna 104 includes a second set of antenna elements disposed on a surface of the support structure 106. The support structure 106 can be a circuit board, such as a PCB, or other structures upon which the antenna elements can be positioned. The first set of antenna elements can be disposed on the support structure 106 such that the first phased array antenna 102 forms a circle with a center 112. The second set of antenna elements can be disposed on the support structure 106 such that the second array antenna 104 forms a ring having a center at center 112. The first phased array antenna 102 can have a radius that is smaller than a radius of the second array antenna 104.

In some embodiments, the first array antenna can have a first inter-element spacing of a first distance between each of the first set of antenna elements. That is, a first inter-element spacing value is equal to the first distance. The second array antenna can have a second inter-element spacing of a second distance between each of the second set of antenna elements. That is, a second inter-element spacing value is equal to the second distance. In some embodiments, the first distance is equal to the second distance; however, in other embodiments, the first and second inter-element spacing values can be different.

In some embodiments, each of the first set of antenna elements can have a first size that is proportional to a first wavelength corresponding to a frequency of a first frequency band. The first phased array antenna 102 can be coupled to a first radio that operates in the first frequency band. The radio can include a baseband processor and radio frequency front-end (RFFE) circuitry. Alternatively, the first phased array antenna 102 can be coupled to other communication systems, such as RF radio, microwave radios, or other signal sources or receivers. Each of the second set of antenna elements has a second size that is proportional to a second wavelength corresponding to a frequency of a second frequency band. The second phased array antenna 104 can be coupled to a second radio that operates in the second frequency band. Alternatively, the first phased array antenna 102 and the second phased array antenna 104 can be coupled to a radio that operates in the second frequency band. It should also be noted that antenna elements can be active antenna elements or terminated elements. A terminated element is an antenna element that is terminated to a matched load. An active antenna element is an antenna element that is coupled to a signal source, such as a radio or a microwave source.

In some embodiments, the first phased array antenna 102 can perform one of a transmit function or a receive function. The second array antenna 104 may perform a transmit function or a receive function. In some embodiments, the function performed by the first phased array antenna 102 and the second phased array antenna 104 may be the same, however, in other embodiments, they may perform a different function. In some embodiments, the functions performed by the first and second phased array antenna 102, 104 are performed concurrently, however, in other embodiments, the functions are performed sequentially.

In some embodiments, the first phased array antenna 102 can operate within a first frequency range. The second array antenna 104 may operate within a second frequency range. In some embodiments, the first and second frequency ranges are the same, however, in other embodiments, the first frequency range includes frequency values less than values in the second frequency range.

In some embodiments, the first phased array antenna 102 can operate with a first signal polarization (e.g., RHCP). The second array antenna 104 can operate with a second signal polarization (e.g., LHCP) that is different from the first signal polarization. In another embodiment, the first phased array antenna 102 can send or receive a radio frequency (RF) signal of a first beam set (e.g., a first beam), and the second antenna can send or receive an RF signal of a second beam set (e.g., a second beam) that is different that the first beam set. The first beam set and the second beam set can be concurrent or sequential beams. In some embodiments, each phased array antenna 102 and 104 may operate in any combination of radio functions (e.g., receive, transmit, different frequency bands, polarization, beam set, etc.).

FIGS. 2-3 illustrate further embodiments of two concentric circular interleaved phased array antennas.

Figure 2A:
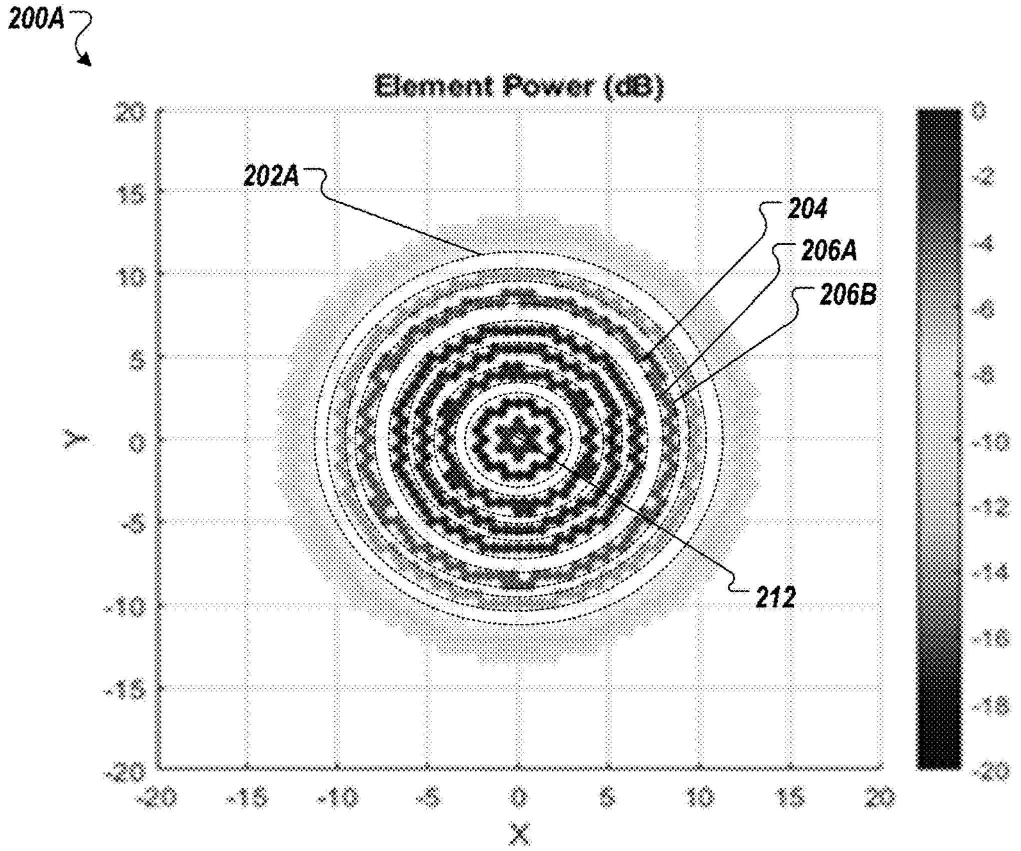
FIGS. 2A-B illustrate continuous array antenna configurations of an antenna structure with two concentric interleaved phased array antennas disposed on a support structure, according to another embodiment.
Figure 2B:
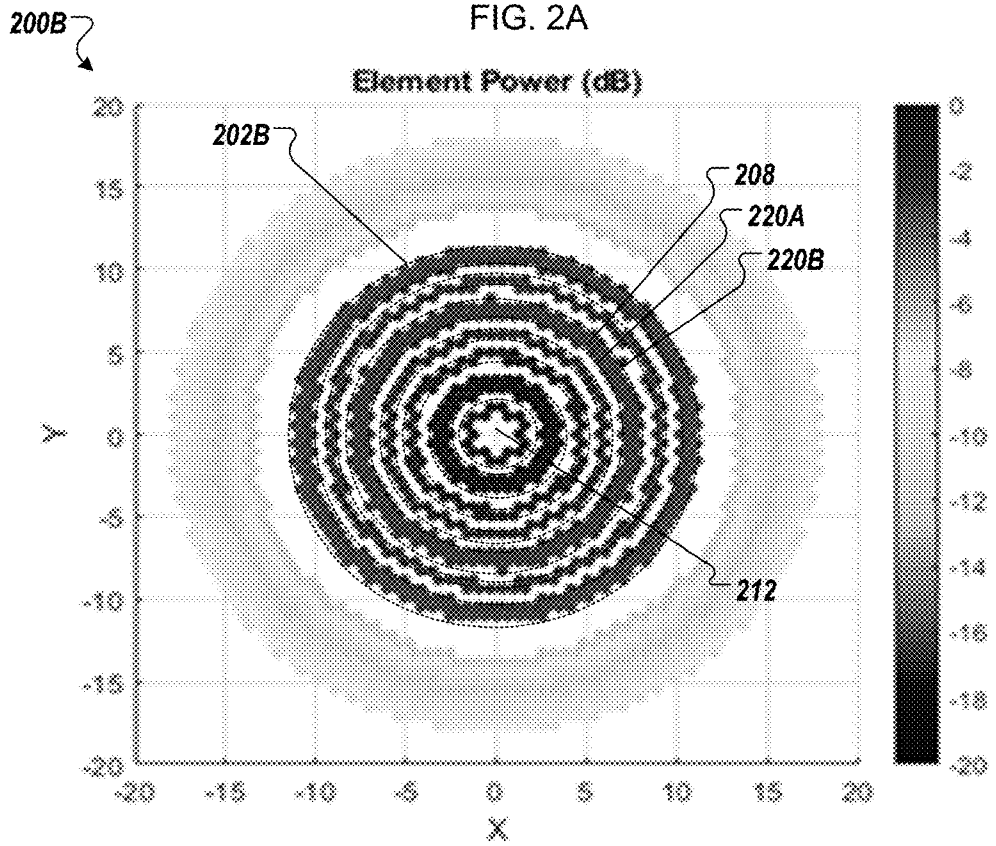
Figure 2C:
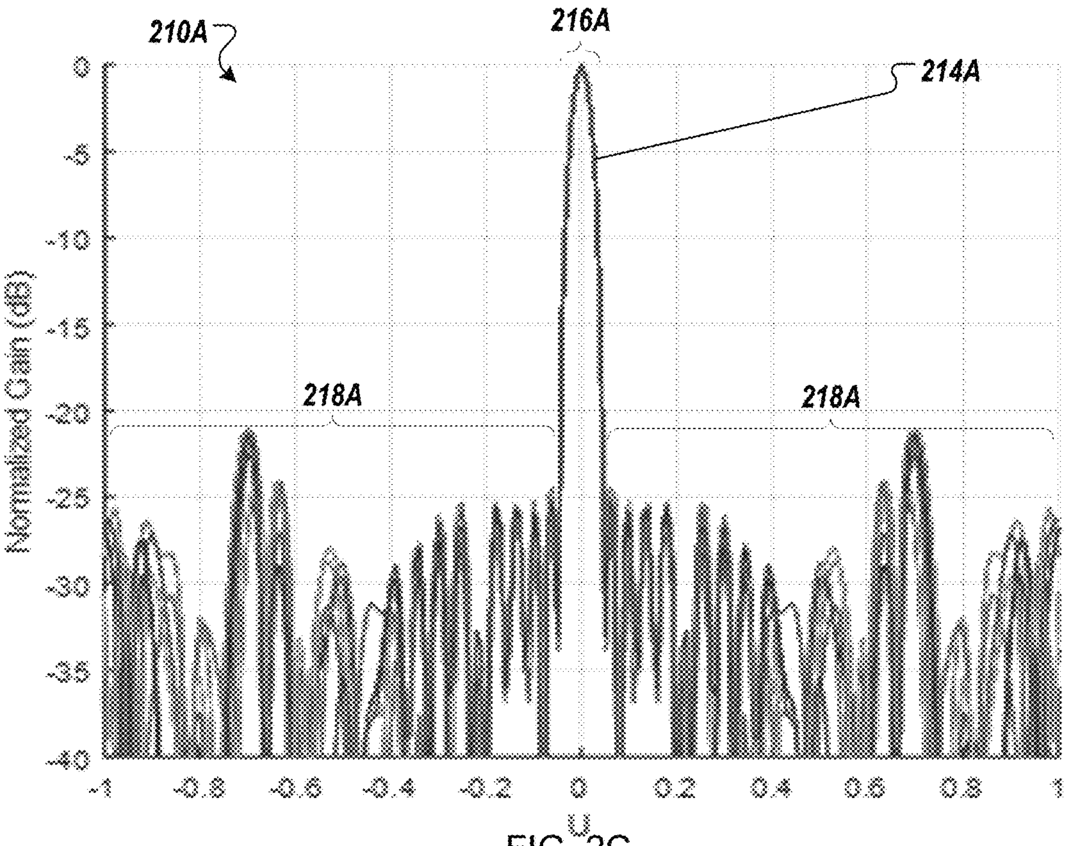
FIGS. 2C-F illustrate radiation patterns of an antenna structure with two concentric interleaved phased array antennas disposed on a support structure, according to another embodiment.
Figure 2D:
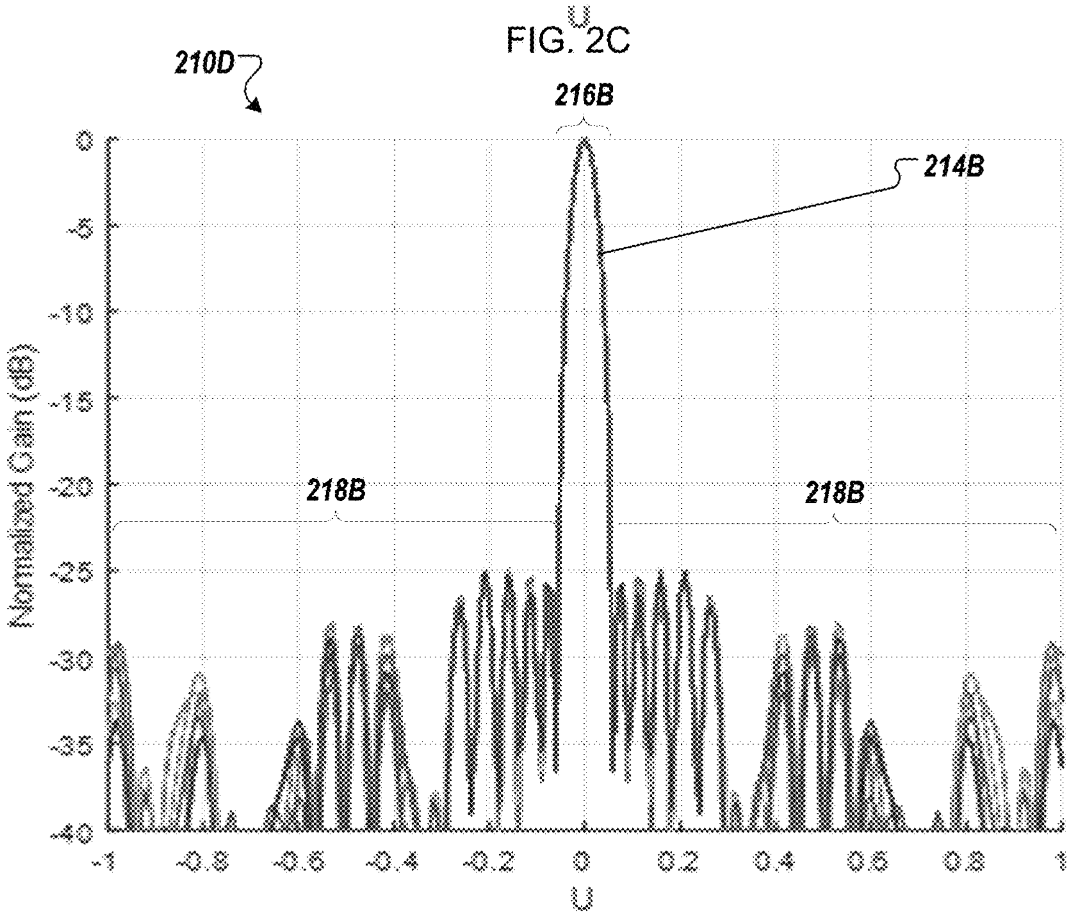
Figure 2E:
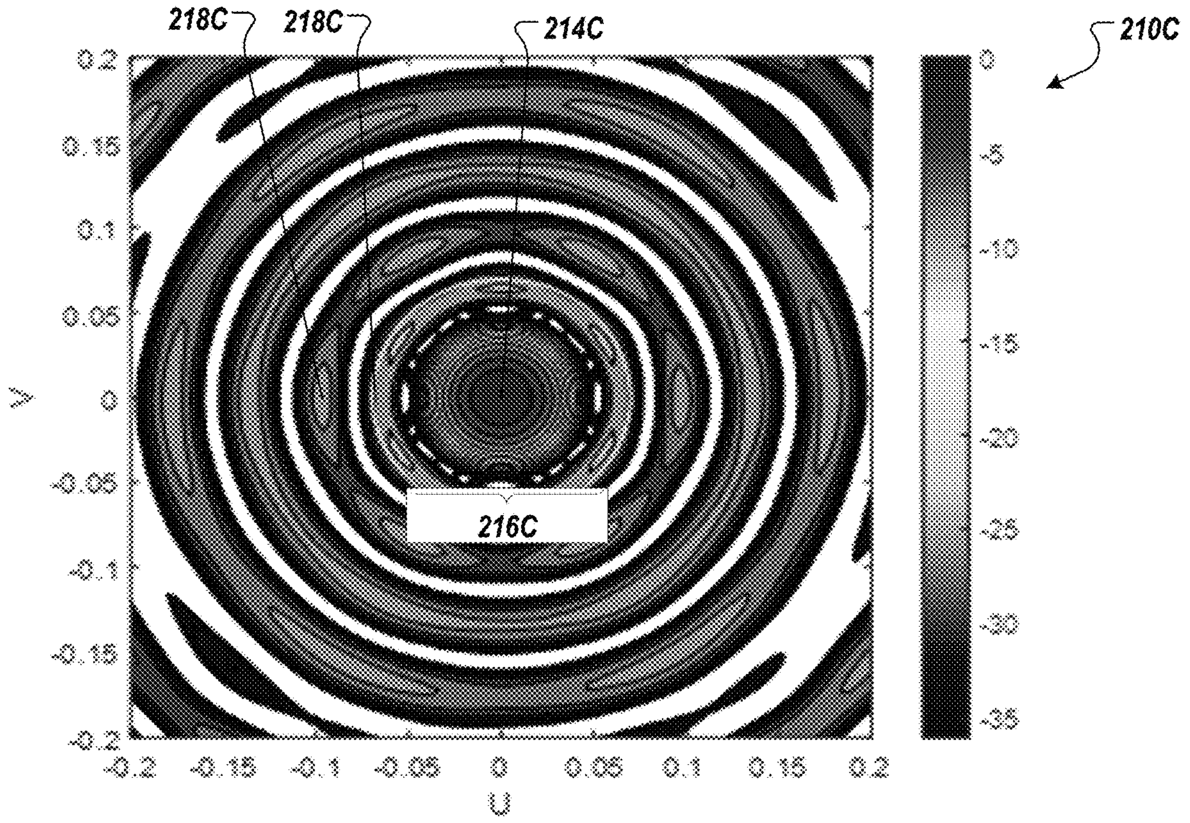
Figure 2F:
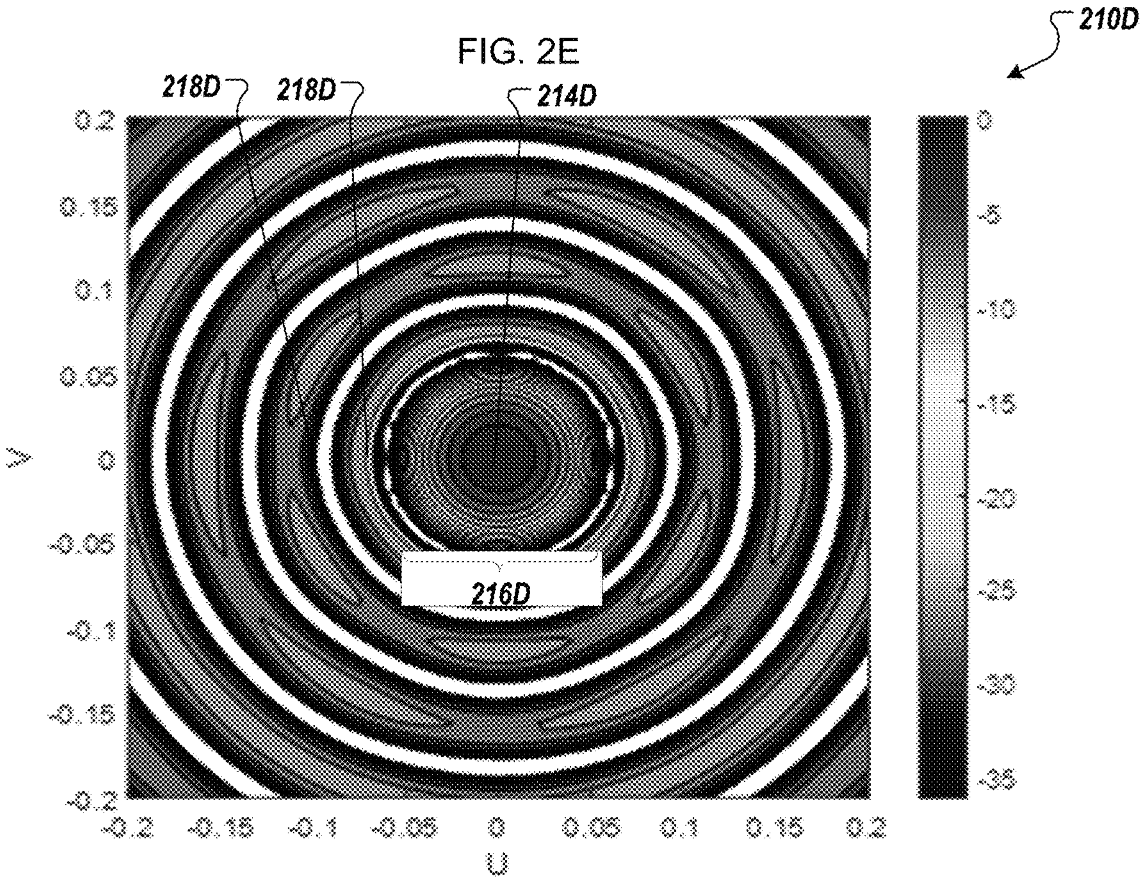

FIGS. 2A-B illustrate continuous array antenna configurations of an antenna structure with two concentric interleaved phased array antennas 200A, 200B disposed on a support structure, according to another embodiment. An antenna structure includes a first phased array antenna 200A and a second phased array antenna 200B. The first phased array antenna 200A includes a first set of antenna elements disposed on a surface of the support structure. The second array antenna 200B can be coupled to the second radio. The second phased array antenna 200B includes a second set of antenna elements disposed on a surface of the support structure.

In some embodiments, as shown in FIGS. 2A-B, the first phased array antenna 200A and the second phased array antenna 200B are complementary such that no two antenna elements occupy the same space when the first and second phased array antennas are interleaved together on a common support structure. For example, as shown in FIGS. 2A-B, an antenna structure may include antenna elements formed into rings that alternate between antenna elements of the first phased array antenna 200A and antenna elements of the second phased array antenna 200B.

In some embodiments, as shown in FIGS. 2A-B, the first set of antenna elements can be organized as a first set of concentric circles 202A. The second set of antenna elements can be organized as a second set of concentric circles 202B. A first concentric circle 204 of the first set of antenna elements is located in a first annulus between two concentric circles 206A, 206B of the second set of antenna elements. A second concentric circle 208 of the second set of antenna elements is located in a second annulus between two concentric circles 220A, 220B of the first set of antenna elements. Alternatively, the first set of antenna elements can be organized as a first set of concentric areas that are not limited to being circles, and the second set of antenna elements can be organized as a set of concentric areas that are also not limited to being circles. For example, the first and second areas may form various shapes (e.g., elliptical shapes, super-ellipse shapes, rectangles, squares, triangles, etc.). For example, in some embodiments, a first concentric area of the first set may be located in a first annulus between two concentric areas of the second set. In another example, the second concentric area of the second set may be located in a second annulus between two concentric areas of the first set.

In some embodiments, as shown in FIGS. 2A-B, the antenna elements of both the first set and the second set may be excited to radiate at various power levels based on the relative location of each individual antenna element is located within the antenna structure. In some embodiments, for example, the power radiated by elements disposed near the center 212 of the antenna structure can be greater than the power radiated by antenna elements disclosed far from the center 212. In another embodiment, antenna elements of the second phased array antenna 200B may be excited to radiate at a higher power than antenna elements of the first phased array antenna 200A. In another embodiment, antenna elements of the first phased array antenna 200A may be excited to radiate at a power level (e.g., decibel (dB) level) equal to or proximate power levels of antenna elements of the second phased array antenna 200B that are disposed adjacent to the first set of antenna elements.

FIGS. 2C-F illustrate radiation patterns 210 of an antenna structure with two concentric interleaved phased array antennas 200A, 200B (see FIGS. 2A-B) disposed on a support structure, according to another embodiment. Radiation pattern 210A represents a two-dimensional (2D) illustration of a signal pattern radiated by the first phased array antenna 200A. Radiation pattern 210B represents a 2D illustration of a signal pattern radiated by the second phased array antenna 200B. Radiation pattern 210C represents a three-dimensional (3D) illustration of a signal pattern radiated by the first phased array antenna 200A. Radiation pattern 210D represents a 3D illustration of a signal pattern radiated by the second phased array antenna 200B. As shown in FIGS. 2C-F, radiation patterns 210 includes a main lobe 214 (e.g., a signal beam) propagating at a desired scan angle. The main lobe 214 includes a beamwidth 216. The radiation patterns 210 include side lobes 218. The side lobes 218 may be a result of dispersive effects of the signals radiated by each of the antenna elements, such as constructive and deconstructive interference between individual signals radiated by each of the antenna elements.

In some embodiments, the structure and shape (e.g., an elliptical shape or super-ellipse shape) of each phased array antenna 200A and 200B may be altered to improve a collective performance of both phased array antennas 200A and 200B. For example, the spacing between of antenna elements, the overall shape (e.g., the radius of each of the concentric circles 202) of the antenna structure, and the relative excitation between antenna elements can be adjusted to mitigate side lobes 218 and generate a main lobe 214 with a consistent beamwidth 216. The beamwidth 216 can correspond to an aperture size capable of transmitting and receiving a signal associated with the interleaved phased array antennas 200A and 200B.

Figure 3A:
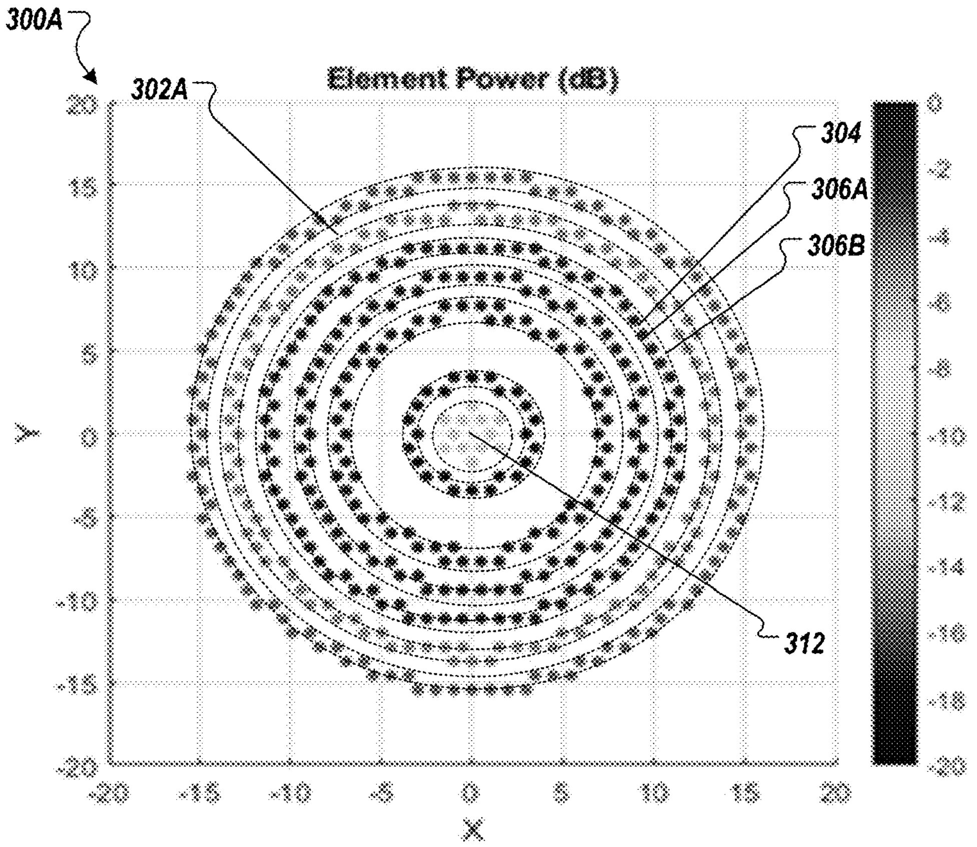
FIGS. 3A-B illustrate array antenna configurations of an antenna structure with two concentric interleaved phased array antennas disposed on a support structure, according to another embodiment.
Figure 3B:
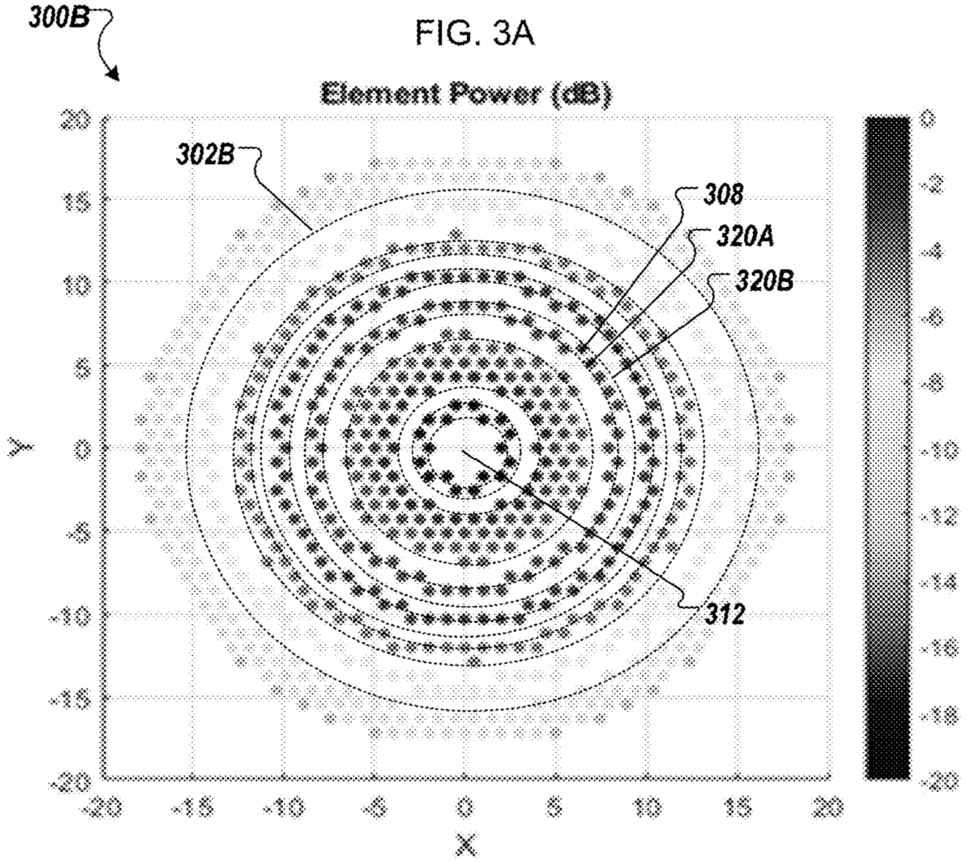
Figure 3C:
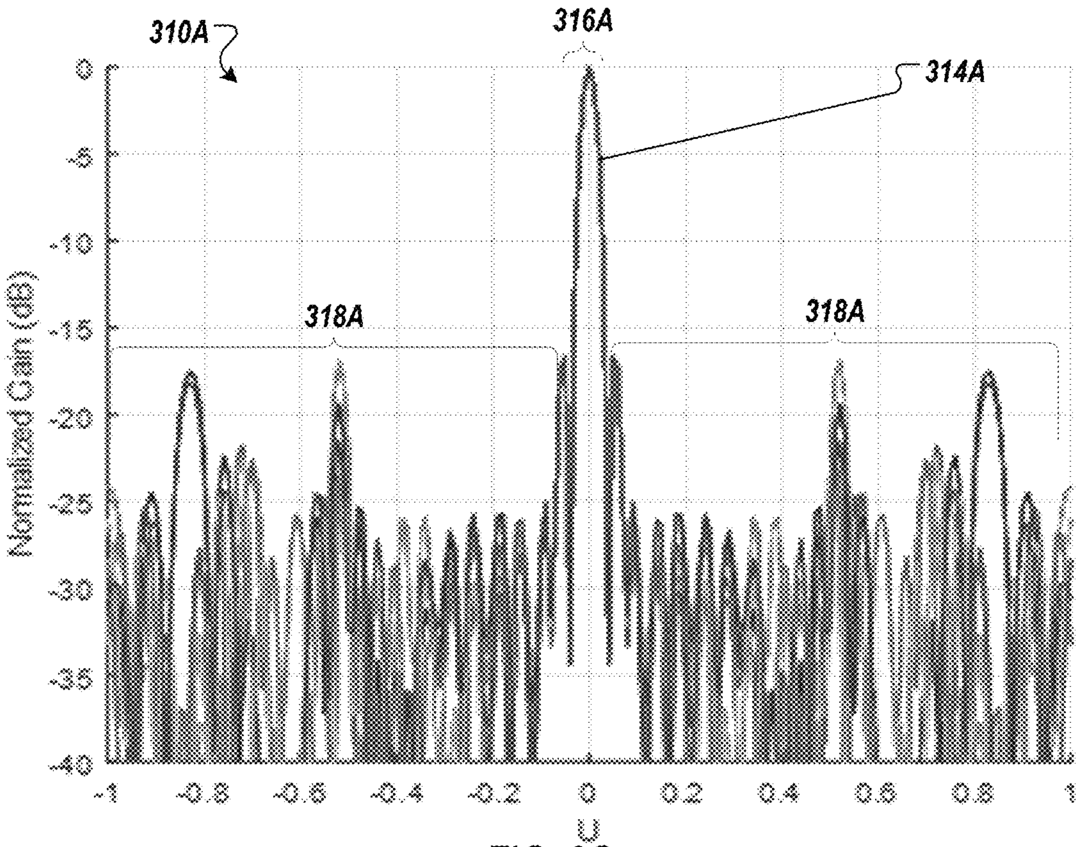
FIGS. 3C-F illustrate radiation patterns of an antenna structure with two concentric interleaved phased array antennas disposed on a support structure, according to another embodiment.
Figure 3D:
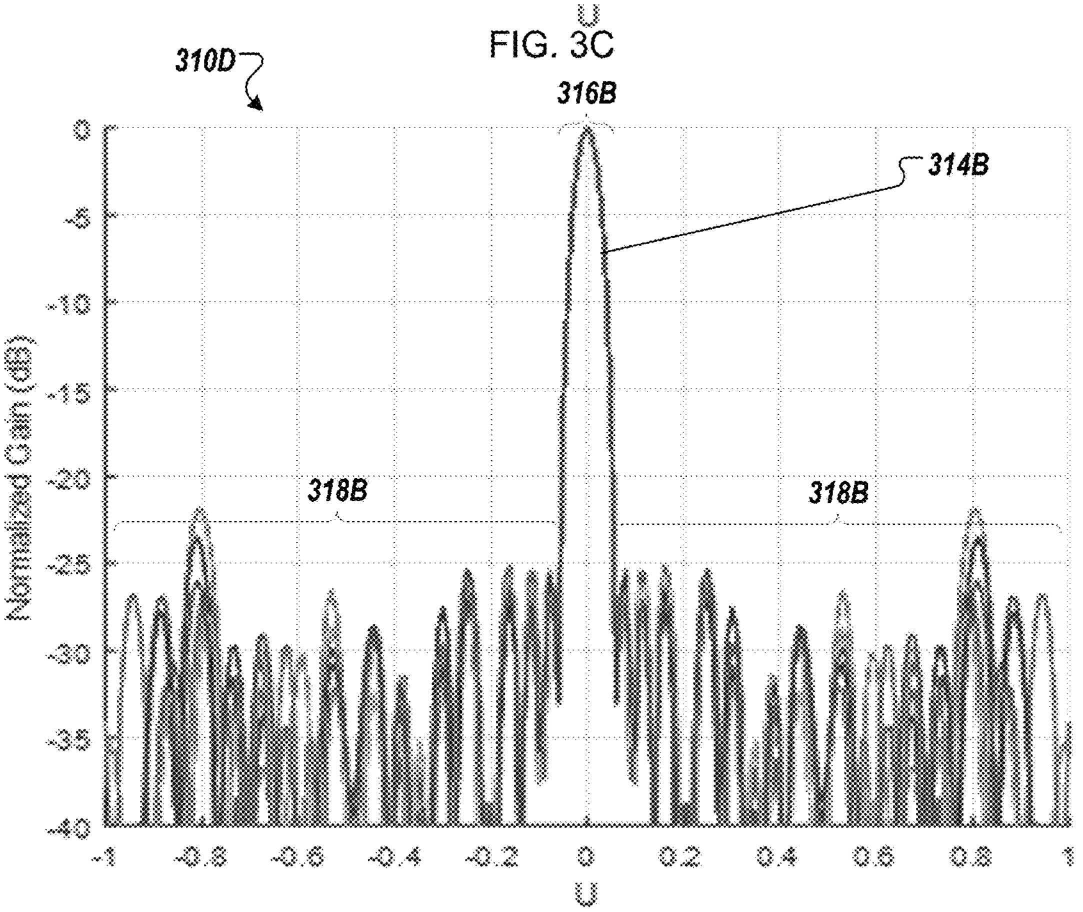
Figure 3E:
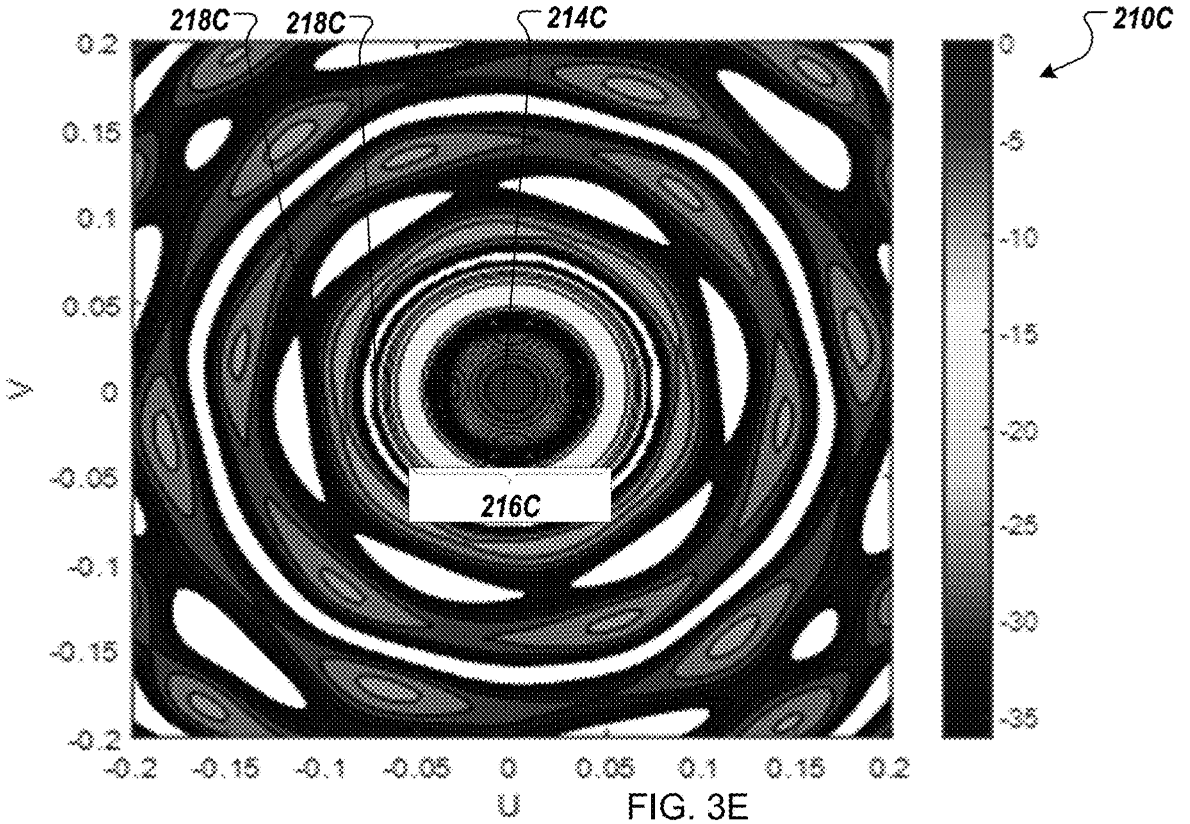
Figure 3F:
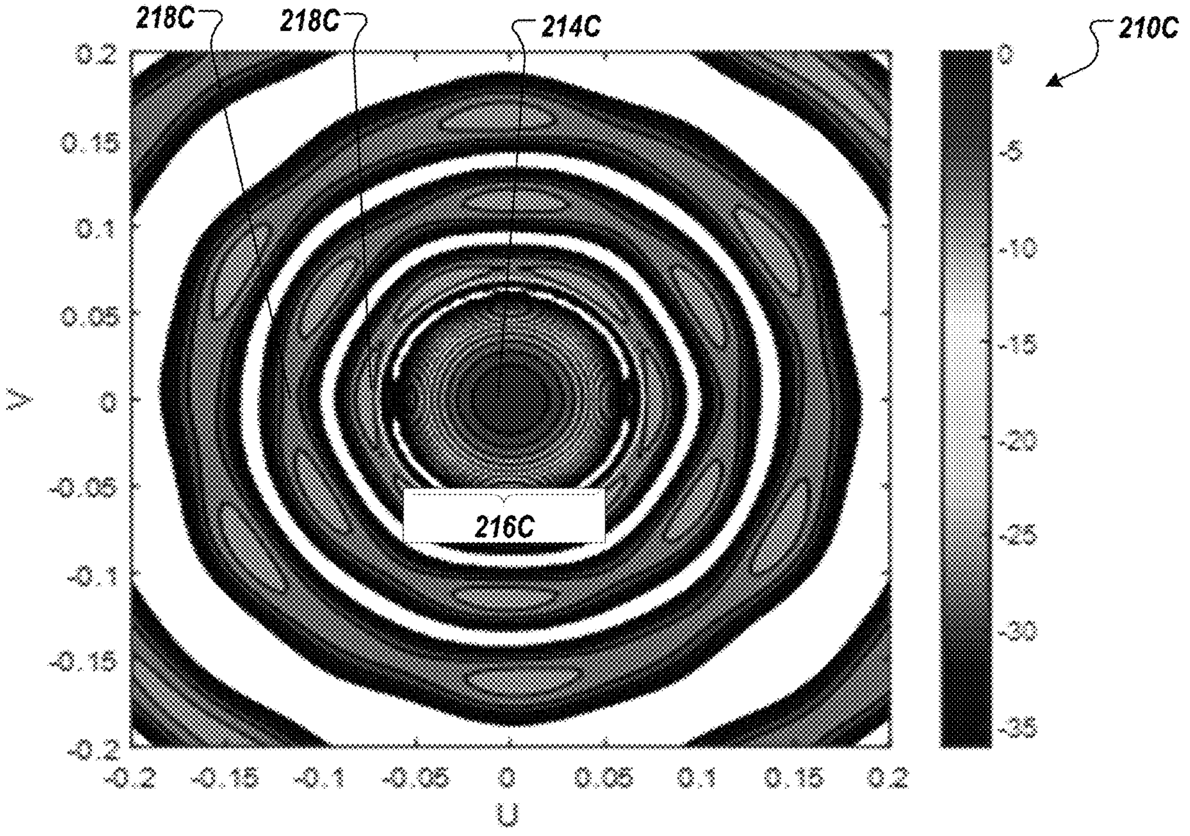

FIGS. 3A-B illustrate array antenna configurations of an antenna structure with two concentric interleaved phased array antennas 300A and 300B disposed on a support structure, according to another embodiment. The antenna structure includes a first phased array antenna 300A and a second phased array antenna 300B. The first phased array antenna 300A includes a first set of antenna elements disposed on a surface of the support structure. The second phased array antenna 300B includes a second set of antenna elements disposed on a surface of the support structure.

In some embodiments, as shown in FIGS. 3A-B, the first phased array antenna 300A and the second phased array antenna 300B are complementary such that no two antenna elements occupy the same space when the first and second phased array antennas are interleaved together on a common support structure. For example, as shown in FIGS. 3A-B, an antenna structure may include antenna elements formed into rings that alternate between antenna elements of the first phased array antenna and antenna elements of the second phased array antenna.

In some embodiments, as shown in FIGS. 3A-B, the first set of antenna elements can be organized as a first set of concentric circles 302A. The second set of antenna elements can be organized as a second set of concentric circles 302B. A first concentric circle 304 of the first set of antenna elements is located in a first annulus between two concentric circles 306A and 206B of the second set. A second concentric circle 308 of the second set of antenna elements is located in a second annulus between two concentric circles 320A and 320B of the first set. Alternatively, the first set of antenna elements and the second set of antenna elements can be organized into first and second concentric areas that are not limited to being concentric circles. For example, the first and second concentric areas may include various polygon-shaped structures (e.g., elliptical shapes, superellipse shapes, triangular shapes, rectangular shapes, or combinations thereof).

In some embodiments, each concentric circle 302 of either of the first and/or the second phased array antennas 300A, 300B may include multiple antenna elements that are stacked radially in the same direction from the center 312. For example, some concentric circles form rings having a single element layer, while other concentric circles form rings having multiple antenna element layers forming a thicker ring of antenna elements. In some embodiments, the radial distance of each element disposed on a concentric circle may vary across various azimuthal angles relative to the center 312. For example, a selection of antenna elements forming a ring may alternate between a first radial and a second radial distance forming a zigzag formation around the ring.

In some embodiments, as shown in FIGS. 3A-B, the antenna elements of both the first set and the second set may be excited to radiate at various power levels based on the relative location of each individual antenna element in the antenna structure. In some embodiments, for example, the power radiated by elements disposed near the center 312 of the antenna structure can be greater than antenna elements disposed relatively farther from the center 312. In another embodiment, antenna elements of the second phased array antenna 300B may be excited to radiate at a higher power than antenna elements of the first phased array antenna 300A. In another embodiment, antenna elements of the first phased array antenna 300A may be excited to radiate at a power level (e.g., decibel (DB) level) equal to or proximate power levels of antenna elements of the second phased array antenna 300B that are disposed proximate or adjacent to the first set of antenna elements.

FIGS. 3C-F illustrate radiation patterns 310 of an antenna structure with two concentric interleaved phased array antennas 300A, 300B (see FIGS. 3A-B) disposed on a support structure, according to another embodiment. Radiation pattern 310A represents a two-dimensional (2D) illustration of a signal pattern radiated by the first phased array antenna 300A. Radiation pattern 310B represents a 2D illustration of a signal pattern radiated by the second phased array antenna 300B. Radiation pattern 310C represents a three-dimensional (3D) illustration of a signal pattern radiated by the first phased array antenna 300A. Radiation pattern 310D represents a 3D illustration of a signal pattern radiated by the second phased array antenna 300B. As shown in FIGS. 3C-F, radiation patterns 310 includes a main lobe 314 (e.g., a signal beam) propagating at a desired scan angle. The main lobe 314 includes a beamwidth 316. The radiation patterns 310 include side lobes 318. The side lobes 318 may be a result of dispersive effects of the signals radiated by each of the antenna elements, such as constructive and deconstructive interference between individual signals radiated by each of the antenna elements.

In some embodiments, the structure and shape of each phased array antenna 300A and 300B may be altered to improve a collective performance of both phased array antennas 300A and 300B. For example, the spacing between of antenna elements, the overall shape (e.g., the radius of each of the concentric circles 302, elliptical shape, superellipse shape, etc.) of the antenna structure, and the relative excitation between antenna elements can be adjusted to mitigate side lobes 318 and generate a main lobe 314 with a consistent beamwidth 316. The beamwidth 316 can correspond to an aperture size capable of transmitting and receiving a signal associated with the interleaved phased array antennas 300A and 300B.

Figure 3G:
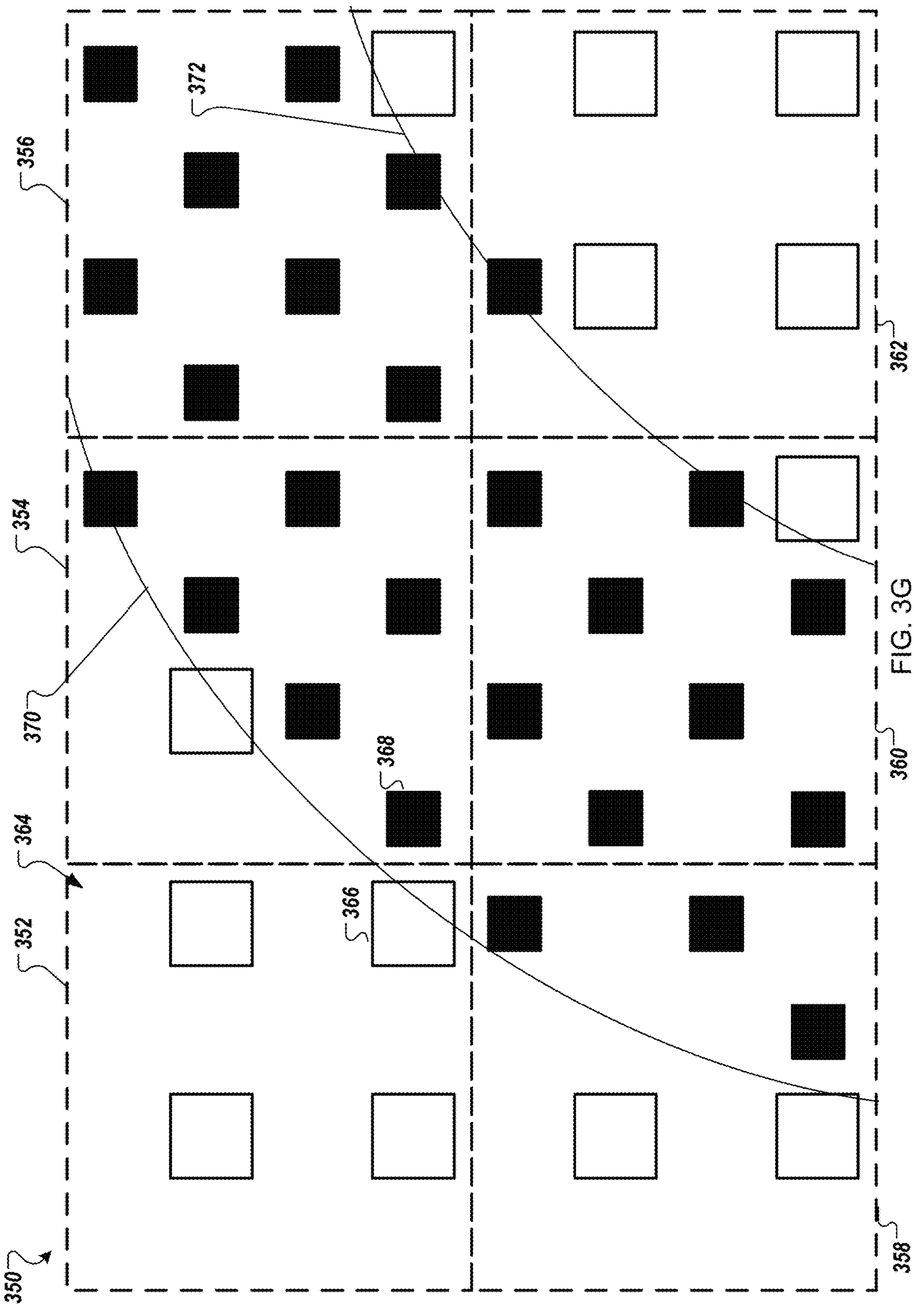
FIG. 3G illustrates a portion of two interleaved phased array antenna made up of six cells, according to another embodiment.

FIG. 3G illustrates a portion 350 of two interleaved phased array antenna (e.g., 300A, 300B from FIGS. 3A-B)

made up of six cells, according to another embodiment. As illustrated in FIG. 3G, multiple cells (e.g., 352, 354, 356, 358, 360, and 362) combine to make the two interleaved phased array antenna (300A, 300B). In some embodiments, some cells (e.g., 356 and 360) are identical for case of manufacturing, assembly, and part management. When combined, the collection of cells results in specific antenna patterns, for example, antenna patterns illustrated in FIGS. 3A-B. As illustrated in FIG. 3G, each cell may include parts of the first phased array antenna 300A and/or parts of the second phased array antenna 300B. Cell 352 illustrates an example of a cell that includes parts of only the first phased array antenna 300A. Cell 354 illustrates an example of a cell that includes parts of both the first phased array antenna 300A and the second array antenna.

As illustrated in FIG. 3G, each cell may include a first antenna element 366 of the first phased array antenna 300A and/or a second element 368 of the second phased array antenna 300B. As illustrated in FIG. 3G, the elements 366 of the first array antenna and elements 368 of the second array antenna may be disposed between boundaries of the portion of concentric circles 370, 372. For example, as illustrated in FIG. 3G, elements of the first phased array antenna are disposed on a first side of the boundary of concentric circle 370. Elements of the second phased array antenna are disposed between two boundaries on a side of concentric circle 370 and on a first side of concentric circle 372. Elements of the first phased array antenna 300A are disposed on a second side of concentric circle 372. In other embodiments, the concentric circles may be ellipses or other boundaries within phased array antenna configurations as described herein.

In some embodiments, as shown in FIG. 3G, the first phased array antenna 300A can have a first inter-element spacing of a first distance between each of the first set of antenna elements. That is, a first inter-element spacing value is equal to the first distance. The second array antenna 300B has a second inter-element spacing of a second distance between each of the second set of antenna elements. That is, a second inter-element spacing value is equal to the first distance. In some embodiments, the first distance is equal to the second distance; however, in other embodiments, the first and second inter-element spacing values can be different.

A cell 354 is positioned to be adjacent to a first side of cell 352. Another cell 356 is positioned to be adjacent to a first side of cell 354. Another cell 358 is positioned to be adjacent to a second side of cell 352. Another cell 360 is positioned to be adjacent to a first side of cell 358. Another cell 362 is positioned to be adjacent to a first side of cell 360. In other embodiments, other numbers of cells can be used to for the interleaved phased array antennas 300A, 300B.

Each of the cells can be made up of a support structure, such as a PCB, and the elements are disposed on a surface of the support structure. The support structures of the multiple cells can be connected together or disposed on another support structure. Once constructed, the two interleaved phased array antennas can be disposed in a single aperture as described herein.

In some embodiments, the elements of one of the first interleaved phased array antennas may include elements (e.g., first element 366) that are larger than elements of a second interleaved phased array antenna (e.g., second element 368). The smaller elements of the second array may be used to perform radio functions that include higher frequencies than the first phased array antenna. The larger elements and spaces between elements may be used for higher frequencies, whereas larger-sized elements and spaces between elements may be used for lower frequencies.

Figure 4A:
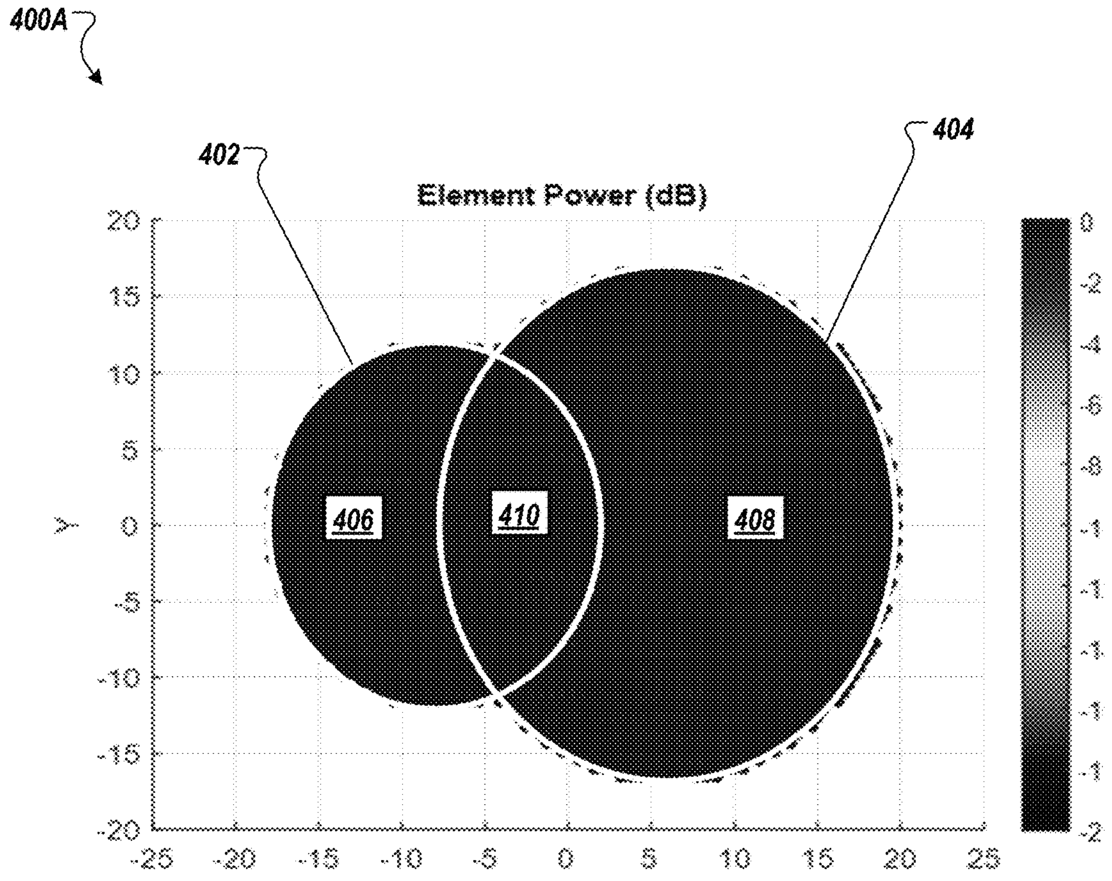
FIG. 4A illustrates a phased array antenna configuration of an antenna structure with two overlapping interleaved phased array antennas disposed on a support structure, according to another embodiment.

FIG. 4A illustrates a phased array antenna configuration 400 of an antenna structure with two overlapping interleaved phased array antennas disposed on a support structure, according to another embodiment. The antenna structure includes a first phased array antenna and a second phased array antenna. The first phased array antenna includes a first set of antenna elements located within a perimeter of a first area 402. The second phased array antenna includes a second set of antenna elements located within a perimeter of a second area 404. As shown in FIG. 4A, the two areas 402, 404 are disposed such that they form various regions 406, 408, and 410.

As shown in FIG. 4A, the antenna structure is formed into two areas 402, 404 that collectively include three different regions. A first region 406 is located inside the first area 402 but outside the second area 404. A second region 408 is located inside the second area 404 but outside the first area 402. A third region 410 is located in the region overlapped by the first and second areas 402, 404.

In some embodiments, the first area 402 and the second area 404 have elliptical shapes forming a first ellipse and a second ellipse. A minor axis of the first ellipse and a minor axis of the second ellipse are located on a same line. In some embodiments, a major axis of the first ellipse and a minor axis of the second ellipse are located on a same line. In some embodiments, a minor axis of the first area (e.g., first ellipse) is aligned with either a minor axis of the second area (e.g., second ellipse) or a major axis of the second area (e.g., second ellipse). In some embodiments, a major axis of the first ellipse and a major axis of the second ellipse are located on a same line. In some embodiments, a minor axis of the first ellipse and a minor axis of the second ellipse are located on a same line. In some embodiments, a major axis of the first area (e.g., first ellipse) is aligned with either a minor axis of the second area (e.g., second ellipse) or a major axis of the second area (e.g., second ellipse).

In some embodiments, a minority of the second set of antenna elements are located in the third region 410. The minority may include less than half of the elements. For example, less than 50%, 40%, 30%, 20%, or 10% of total elements of the second set of antenna elements are located in the third region. In some embodiments, the third region 410 has a width at the minor axis of the second area 404. In some embodiments, the third region 410 has a width that aligns with the minor axis or one or more sides of the minor axis of the second area 404. The size and distribution of the minor axis of either area 402 and 404 may determine the boundaries of the third region overlapped by the first and second ellipses. 402, 404.

In some embodiments, the first phased array antenna and the second phased array antenna are complementary such that no two antenna elements occupy the same space when the first and second phased array antennas are interleaved together on a common support structure. For example, as shown in FIG. 4A, the third region 410 may include antenna elements from the first phased array antenna and antenna elements from the second phased array antenna, but only one antenna element may be disposed at any given point in the third region 410.

In some embodiments, the antenna elements of both the first set and the second set may be excited to radiate at various power levels based on the relative location of each individual antenna element in the antenna structure. In some embodiments, for example, the power radiated by elements of the first phased array antenna disposed near the center of the first area 402 is greater than antenna elements located near the perimeter of the first area 402. In other embodiments, the power radiated by antenna elements of the first phased array antenna disposed near the perimeter of the first area 402 can be greater than power radiated by antenna elements located near the center of the first area 402.

In some embodiments, the two phased array antennas perform different radio functions (e.g., receive, transmit, different frequency bands, polarization, beam set, etc.), as detailed in other embodiments.

Figure 4B:
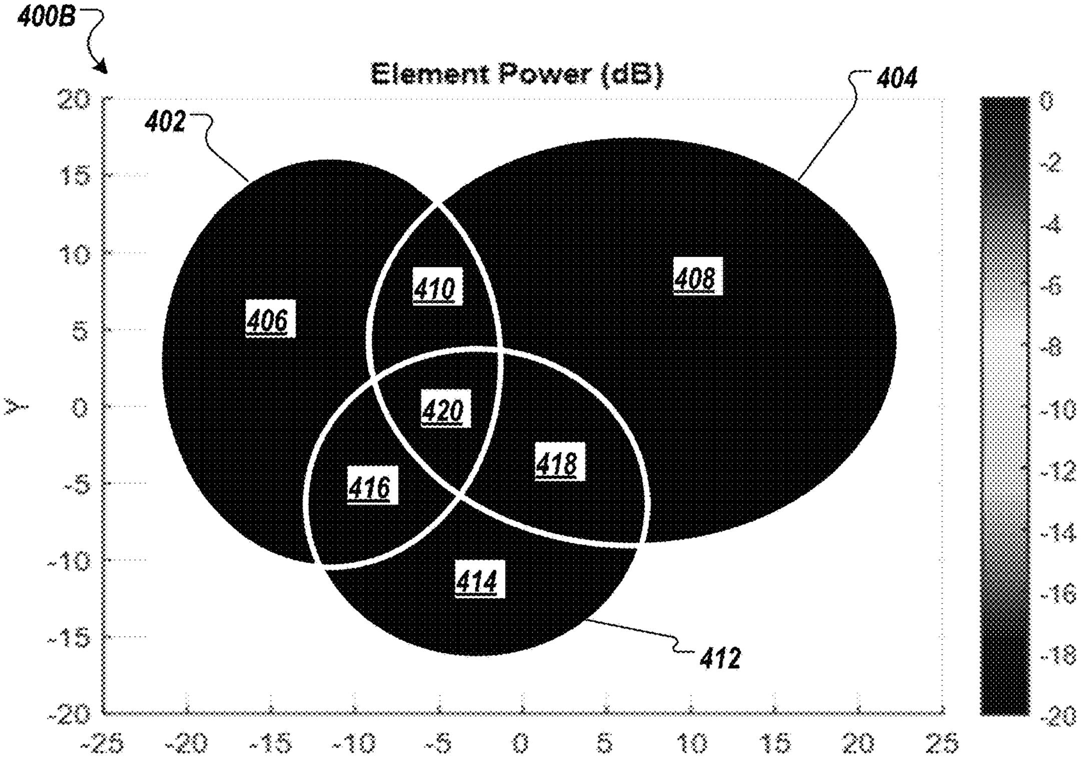
FIG. 4B illustrates a phased array antenna configuration of an antenna structure with three overlapping interleaved phased array antennas disposed on a support structure, according to another embodiment.

FIG. 4B illustrates a phased array antenna configuration 400B of an antenna structure with three overlapping interleaved phased array antennas disposed on a support structure, according to another embodiment. The antenna structure includes a first phased array antenna, a second phased array antenna, and a third array antenna. The first phased array antenna includes a first set of antenna elements located within a perimeter of a first area 402. The second phased array antenna includes a second set of antenna elements located within a perimeter of a second area 404. The third phased array antenna includes a third set of antenna elements located within a perimeter of a third area 412. As shown in FIG. 4B, the three areas 402, 404, and 412 are disposed such that they form various overlapping regions.

As shown in FIG. 4B, the antenna structure is formed into three areas 402, 404, and 406 that collectively include seven different regions. A first region 406 is located inside the first area 402 but outside the second and third areas 404, 412. A second region 408 is located inside the second area 404 but outside the first and third areas 402, 412. A third region 414 is located inside the third area 412 but outside the first and second areas 402, 404. A fourth region 410 is located in the region overlapped by the first and second areas 402, 404, but not the third areas 412. A fifth region 416 is located in the region overlapped by the first and third areas 402, 412, but not the second areas 404. A sixth region 418 is located in the region overlapped by the second and third areas 404, 412. A seventh region 420 is located in the region overlapped by the first, second, and third areas 402, 404, and 412.

In some embodiments, the first, second, and third phased array antennas are complementary such that no two antenna elements from any of the phased array antennas occupy the same space when the antennas are interleaved together on a common support structure. For example, as shown in FIG. 4B, the fourth region 410 may include antenna elements from the first phased array antenna and/or antenna elements from the second phased array antenna, but only one antenna element may be disposed at any given point in the third region 410. In another example, the fifth region 416 may include antenna elements from the first phased array antenna and/or antenna elements from the third phased array antenna, but only antenna elements may be disposed at any given point in the fifth region 416. In another example, the sixth region 418 may include antenna elements from the second phased array antenna and antenna elements from the third phased array antenna, but only one element may be disposed at any given point in the sixth region 418. In another example, the seventh region 420 may include antenna elements from the first, second, and/or third phased array antennas, but only one element may be disposed at any given point in the seventh region 420. In further embodiments, antenna elements in the combination just described may be disposed to fill the entirety of the associated regions of the antenna structure as specified in the other embodiments.

In some embodiments the three phased array antennas perform different radio functions (e.g., receive, transmit, different frequency bands, polarization, beam set, etc.), as detailed in other embodiments. It should be noted the aspects of the embodiments using three interleaved phased array antennas disposed on a support structure can be combined with aspects of other embodiments disclosed herein (e.g., concentric circles, superellipses, etc.).

For example, the first phased antenna array may perform a receive function while the second and third phased antenna arrays may perform a transmit functions. In another example, the first phased array antenna may operate in a first frequency band, the second phased array antenna may operate in a second frequency band, and the third phased array antenna may operate in a third frequency, where the first, second, and third frequency bands are different. In another example, the first phased array antenna may transmit a signal with LHCP polarization, the second phased array antenna may receive a signal with RHCP, and a third signal may receive signal of various polarizations. In addition to these examples, the first, second, and third phased array antennas may perform any combination of radio function. Some embodiments may share radio function features (e.g., two array may operate with the same polarization, frequency range, etc.) while a third phased array antenna is different.

FIGS. 5-8 illustrate further embodiments of an antenna structure with two interleaved phased array antennas having antenna elements formed into two overlapping areas (e.g., ellipses).

Figure 5A:
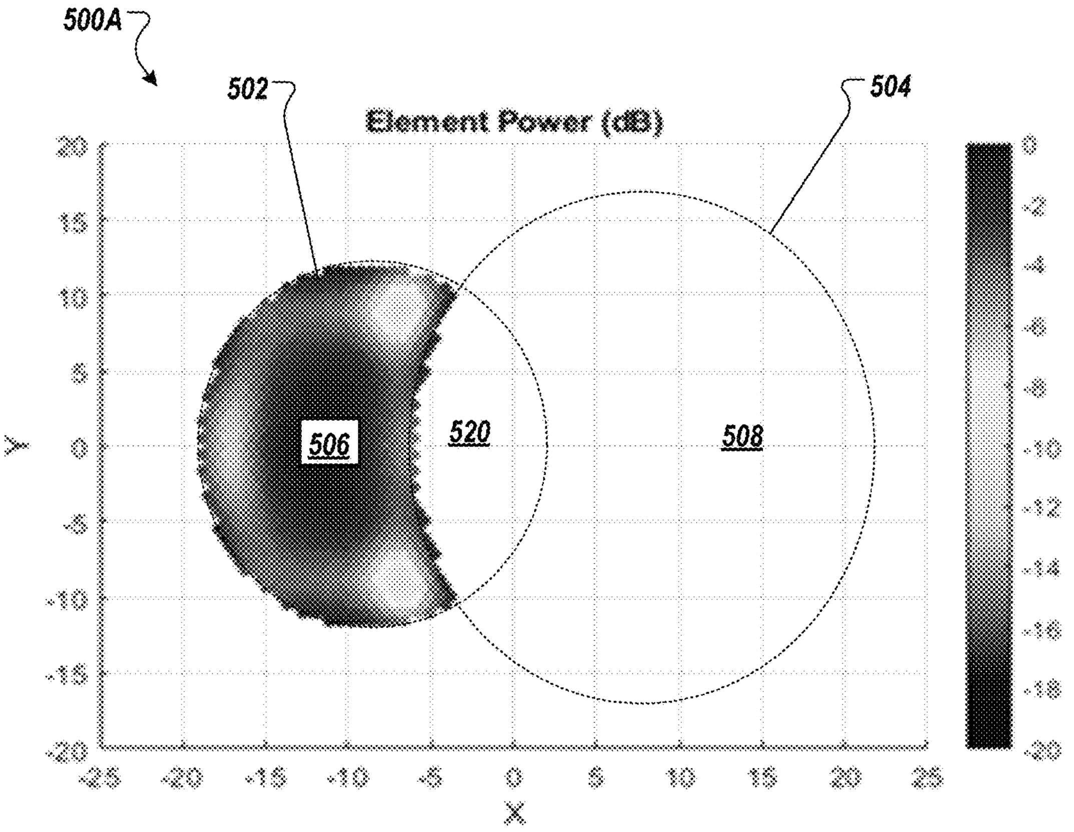
FIGS. 5A-B illustrate an embodiment of an antenna structure with two interleaved phased array antennas having antenna elements formed into two overlapping ellipses, according to another embodiment.
Figure 5B:
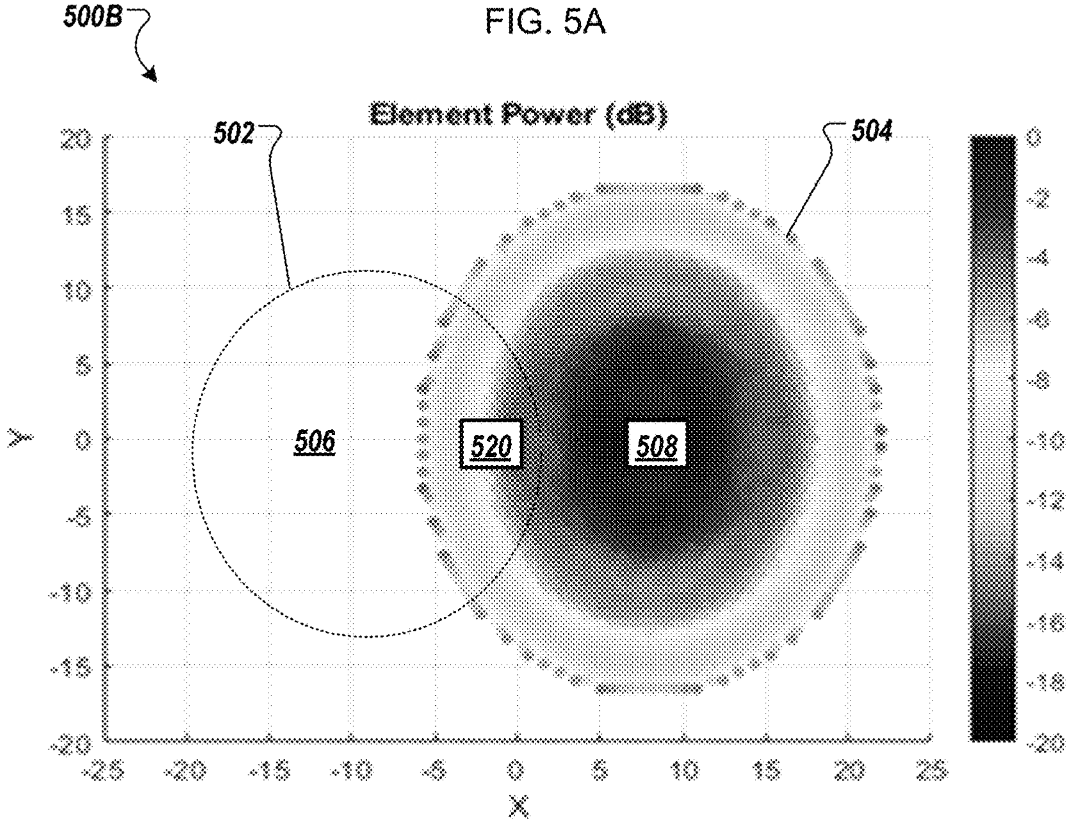
Figure 5C:
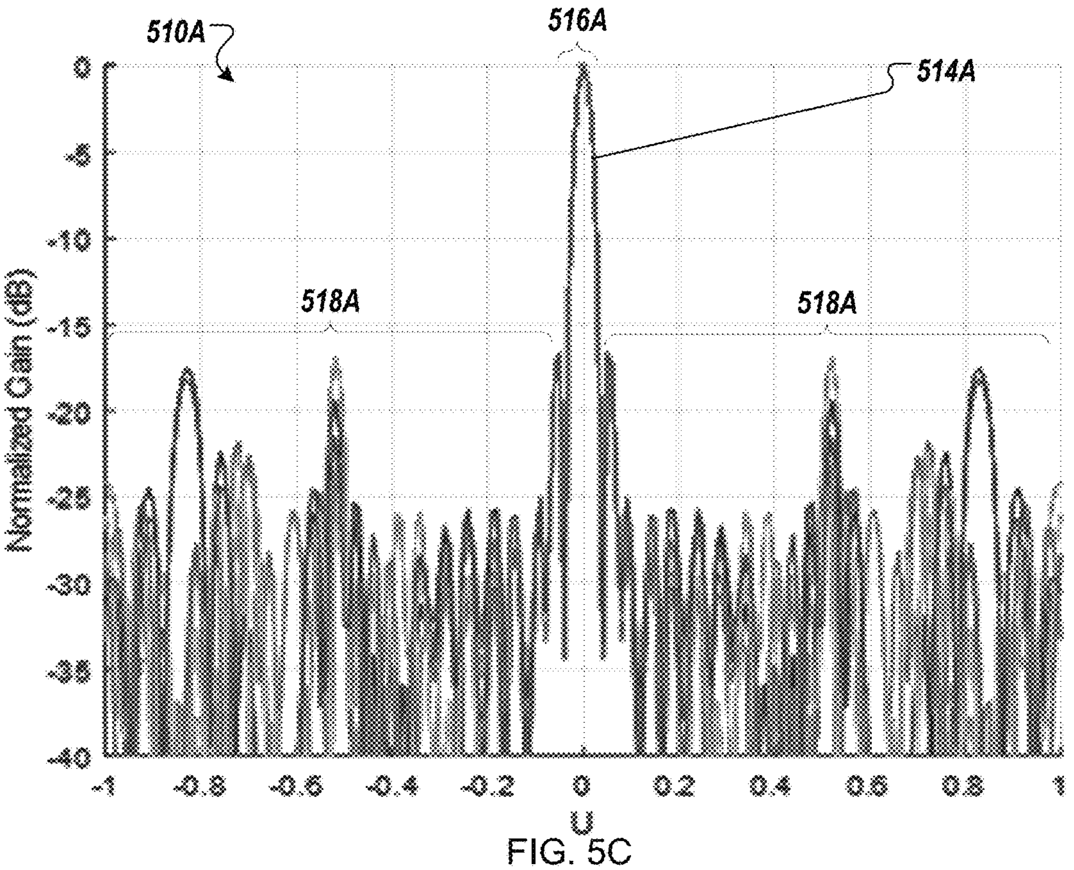
FIGS. 5C-F illustrate radiation patterns of an antenna structure with two interleaved phased array antennas having antenna elements formed into two overlapping ellipses, according to another embodiment.
Figure 5D:
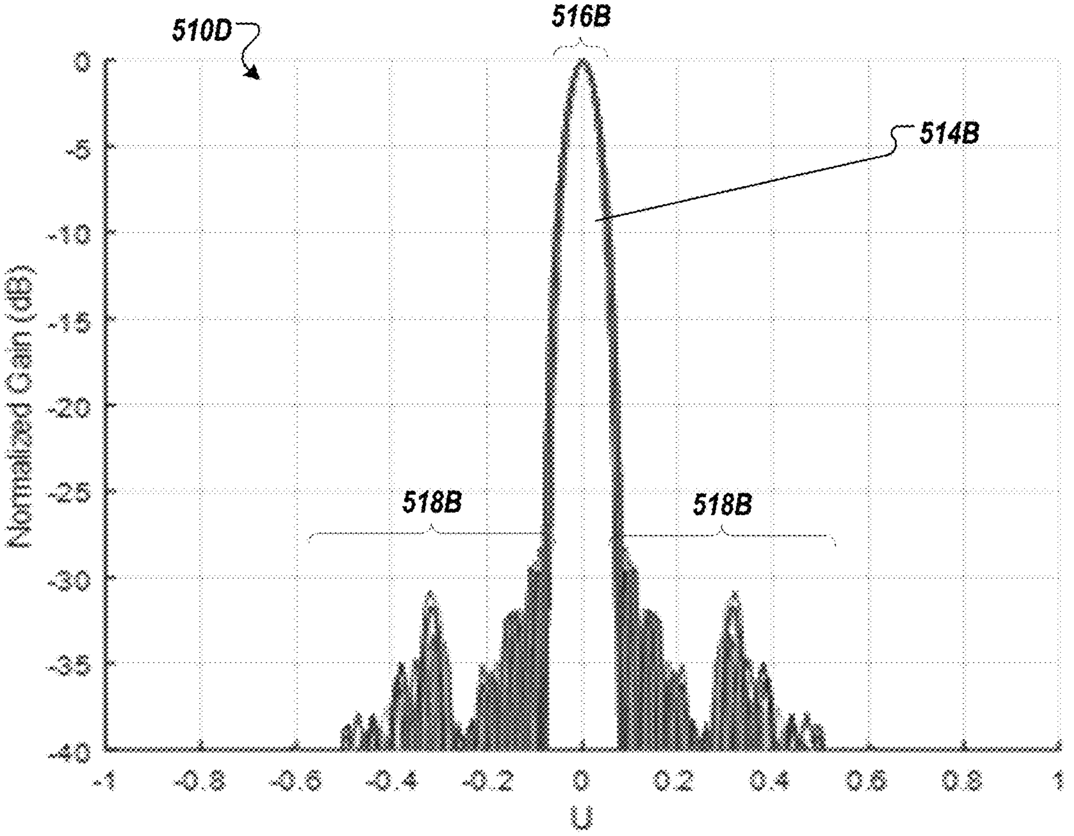
Figure 5E:
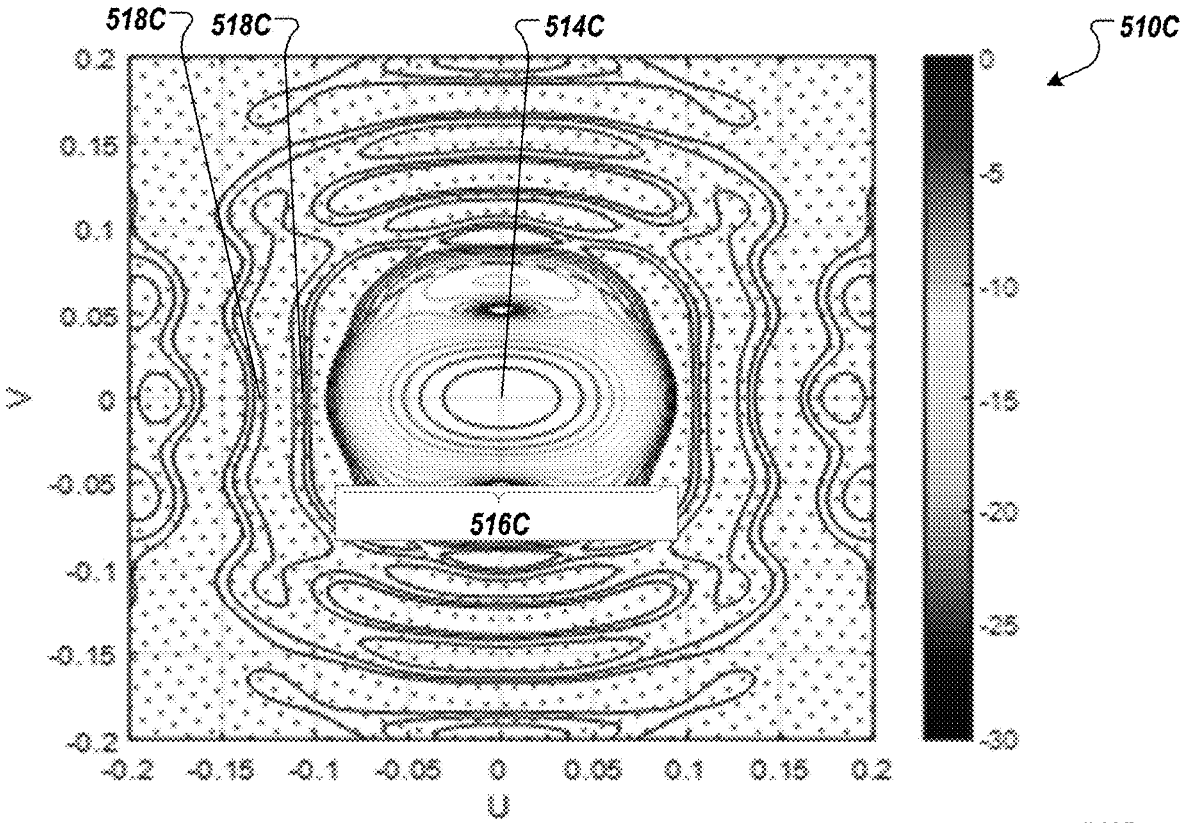
Figure 5F:
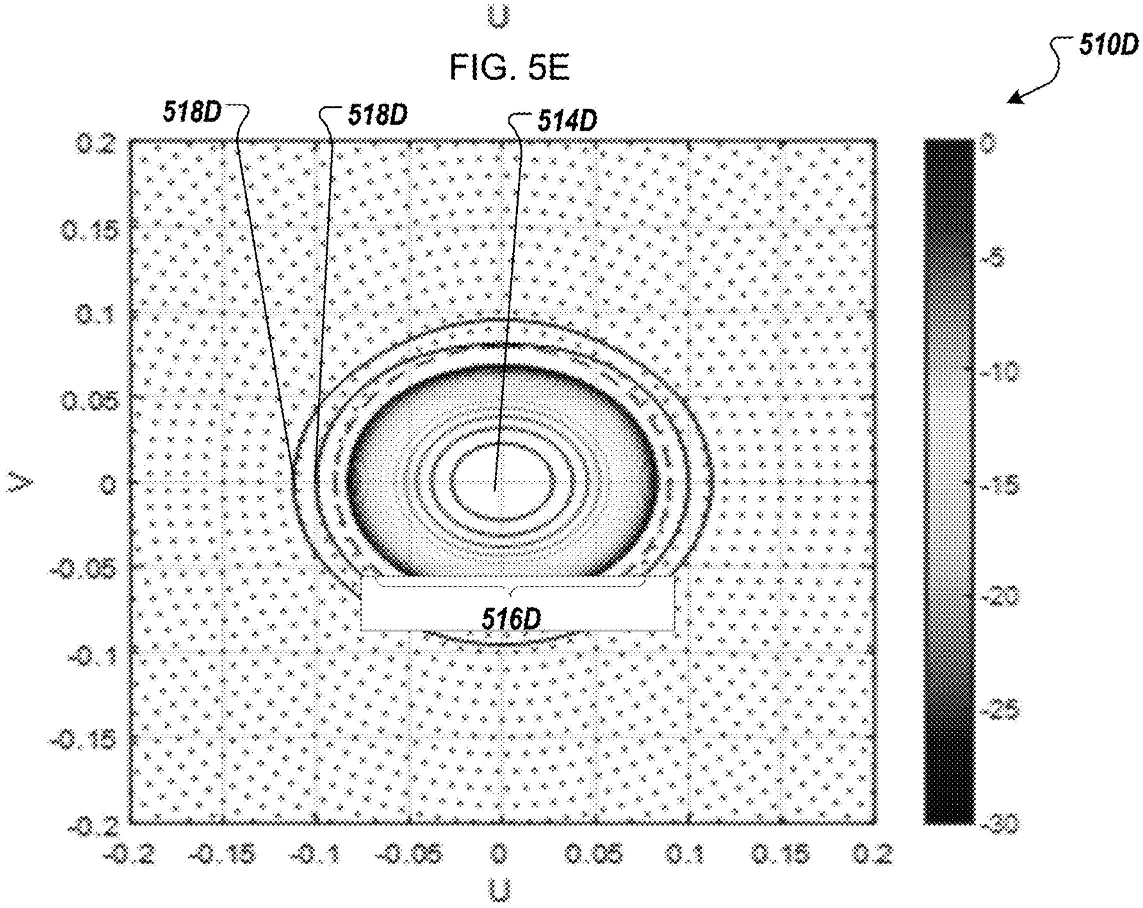

FIGS. 5A-B illustrate an embodiment of an antenna structure with two interleaved phased array antennas 500A and 500B having antenna elements formed into two overlapping ellipses 502 and 504, according to another embodiment. As shown in FIGS. 5A-B, the antenna structure is divided into three regions. A first region 506 is located inside the first ellipse 502 but outside the second ellipse 504. A second region 508 is located inside the second ellipse 504 but outside the first ellipse 502. A third region 520 is located in the region overlapped by the first ellipse 502 and the second ellipse 504. It should be noted that the antenna elements may form two overlapping areas that are not limited to being ellipses (e.g., the areas are circles, elliptical shaped, super ellipse shape, rectangles, etc.)

In some embodiments, a majority of antenna elements of the first phased array antenna 500A are located in the first region 506. The majority may include more than half of the elements. For example, more than 50%, 60%, 70%, 80%, or 90% of the total antenna elements of the first phased array antenna are located in the first region. In some embodiments, as shown in FIG. 5A, all the elements of the first phased array antenna 500A can be located in the first region 506 inside the non-overlapping area of the first ellipse 506. In another embodiment, a majority of antenna elements of the second phased array antenna 500B are located in the second region 508. The majority may include more than half of the elements. For example, more than 50%, 60%, 70%, 80%, or 90% of the total elements of the second phased array antenna are located in the second region. In a further embodiment, all the antenna elements of the second phased array antenna 500B can be located in the second region 508 inside the non-overlapping region of the second ellipse 504.

In some embodiments, the antenna elements of the first phased array antenna 500A may form a sector (e.g., an elliptical sector, as depicted in FIG. 5A) of the first ellipse. The antenna elements of the first phased array antenna may be disposed in a major sector of the first ellipse and the antenna elements of the second phased array may be disposed a minor sector of the first ellipse. The major and minor sectors are defined as the area between radial segments that extend from a location within the first ellipse to the perimeter of the first ellipse. The radial segments may include straight lines, curved lines, or any combination thereof. For example, the sectors may be defined by segments that curve and track a perimeter of the second ellipse, as shown in FIG. 5A. In some embodiments, the antenna elements of the first phased array antenna form the major sector, and in other embodiments, the antenna elements of the first phased array antenna form a minor sector of the first ellipse. In some embodiments, the radial segments meet at the center of the first ellipse, however, in other embodiments, the radial segments meet at a location off-center. The intersection of the radial segments may occur along the major or minor axis of the first ellipse, as shown in FIG. 5A. For example, the major sector may define the first region 506 and the minor sector may define the third region 520. In some embodiments, the roles of the first ellipse and the second ellipse are changed such that the antenna elements of the first and second phased array antennas are formed into a major and minor sector of the second ellipse.

In some embodiments, the major and minor sectors define regions enclosed by a first radial segment, a second radial segment, and a subset of the perimeter between the intersections of the radial segments with the perimeter of the ellipse. The major sector includes a majority, or more than half, of the perimeter of the ellipse, and the minor sector includes a minority, or less than half, of the perimeter of the ellipse. The major sector is enclosed by a subset of the perimeter having a longer path from the intersection of the first radial segment and the perimeter to the intersection of the second radial segment and the perimeter. In some embodiments, the major sector and the minor sector are compliments such that, when combined, they form the first ellipse 502. For example, the major sector forms the first region 506, the minor sector forms the third region 520, and together they form the first ellipse 502. Alternatively, the first ellipse 502 and the second ellipse 504 may be generalized to overlapping areas not limited to being ellipses and the major and minor sector would be analogous to a sector previously described in regards to ellipses.

In some embodiments, antenna elements of the first phased array antenna 500A may be disposed in the first region 506 and extend up to the boundary between the first region 506 and the third region 520. The antenna elements of the first phased array antenna 500A may be disposed to track an outer side of a portion of the perimeter of the second ellipse 504 disposed within the first ellipse 502. Similarly, antenna elements of the second phased array antenna 500B may be disposed just inside a portion of the perimeter of the second ellipse 504 disposed inside the first ellipse. This sector formed by the antenna elements may comprise a reflex angle proximate the center of the first ellipse. The perimeter of the sector formed by the antenna elements may comprise linear radial edges extending from the center of the first ellipse, or, alternatively curved edges that originate at or near the center of the first ellipse and extend to one or more intersection points with the perimeter of the second ellipse. In some embodiments, the third region includes only antenna elements from the first phased array antenna 500A or elements of the second phased array antenna 500B. In a further embodiment, elements from the first phased array antenna 500A or the second phased array antenna 500B may be disposed to fill the entirety of the third region 506. In some embodiments, the first phased array antenna 500A and the second phased array antenna 500B are complementary such that no two antenna elements occupy the same space when the first and second phased array antennas are interleaved together on a common support structure. For example, as shown in FIGS. 5A-B, the third region 520 may include antenna elements from the first phased array antenna 500A and antenna elements from the second phased array antenna 500B, but only one antenna element may be disposed at any given point in the third region 520. In a further embodiment, elements from the first phased array antenna 500A and the second phased array antenna 500B may be disposed to fill the entirety of the first region 506, the second region 508, and the third region 520.

FIGS. 5C-F illustrate radiation patterns 510 of an antenna structure with two interleaved phased array antennas 500A and 500B having antenna elements formed into two overlapping ellipses 502 and 504, according to another embodiment. Radiation pattern 510A represents a two-dimensional (2D) illustration of a signal pattern radiated by the first phased array antenna 500A. Radiation pattern 510B represents a 2D illustration of a signal pattern radiated by the second phased array antenna 500B. Radiation pattern 510C represents a three-dimensional (3D) illustration of a signal pattern radiated by the first phased array antenna 500A. Radiation pattern 510D represents a 3D illustration of a signal pattern radiated by the second phased array antenna 500B. As shown in FIGS. 5C-F, radiation patterns 510 includes a main lobe 514 (e.g., beam) propagating at a desired scan angle. The main lobe 514 includes a beamwidth 516. The radiation patterns 510 include side lobes 518. The side lobes 518 may be a result of dispersive effects of the signals radiated by each of the antenna elements, such as constructive and deconstructive interference between individual signals radiated by each of the antenna elements. In some embodiments, the structure and shape of each phased array antenna 500A and 500B can mitigate side lobes 518 and generate a main lobe 514 with a beamwidth 516 operable with a given apertures size.

Figure 6A:
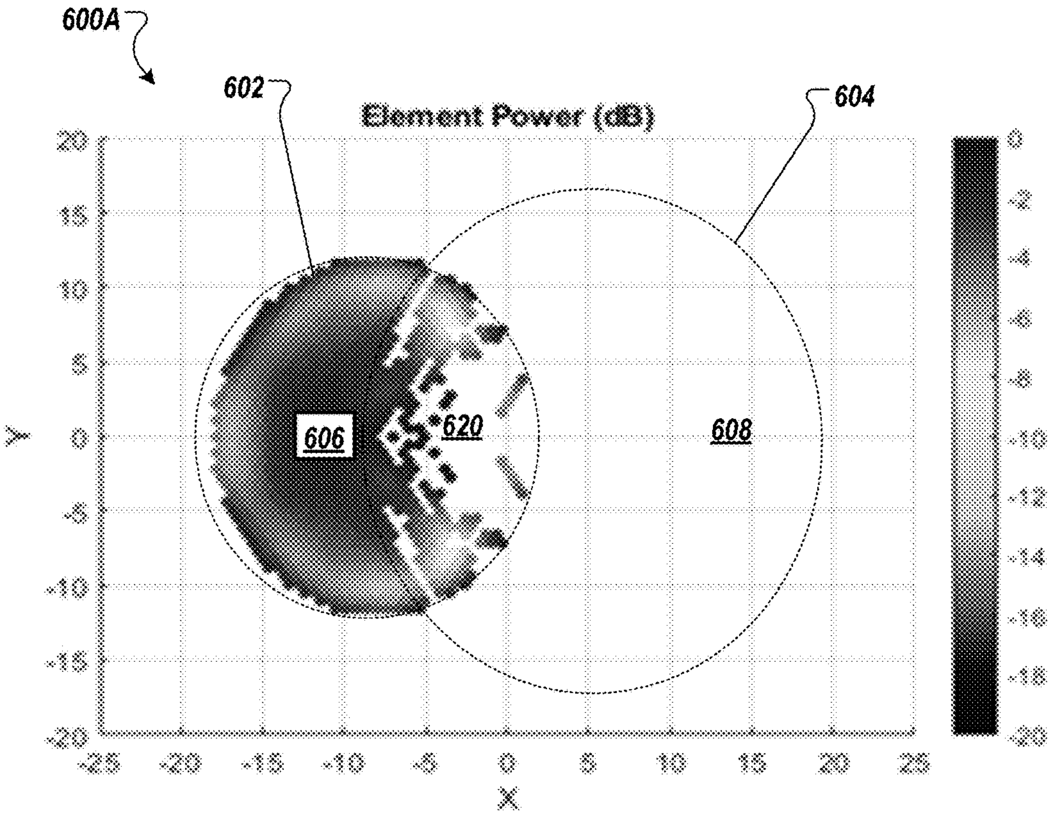
FIGS. 6A-B illustrate an embodiment of an antenna structure with two interleaved phased array antennas having antenna elements formed into two overlapping ellipses, according to another embodiment.
Figure 6B:
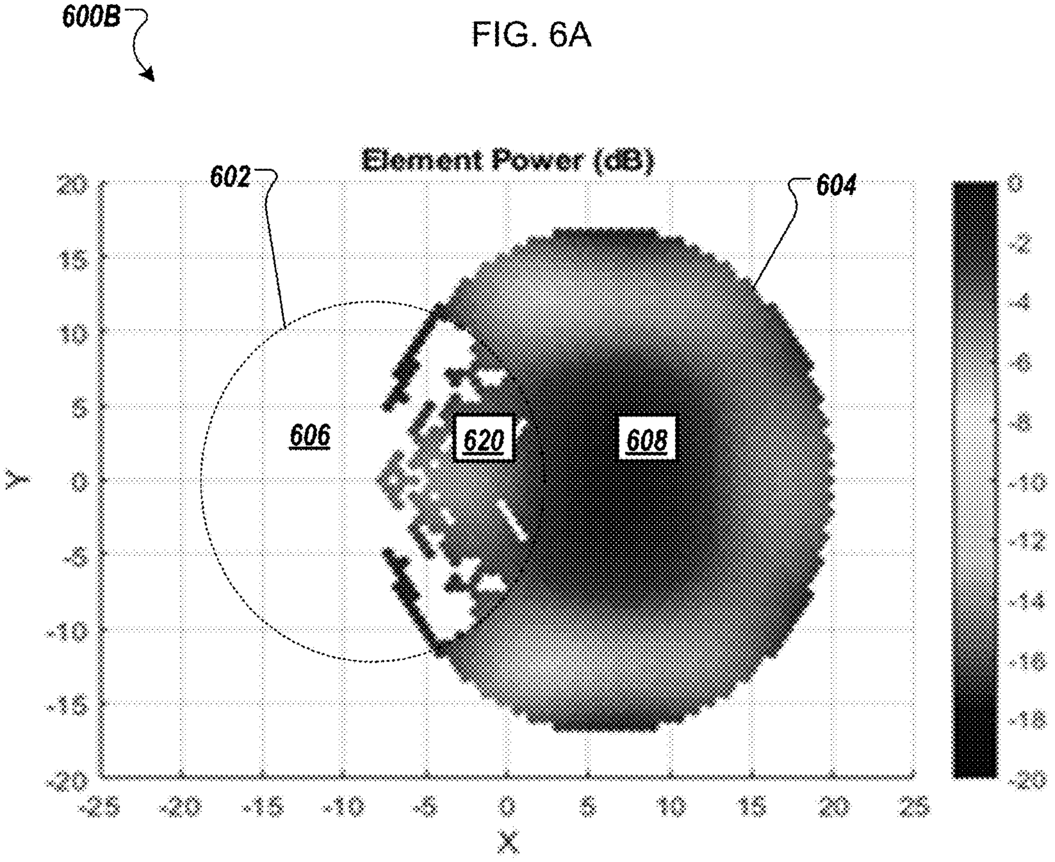
Figure 6C:
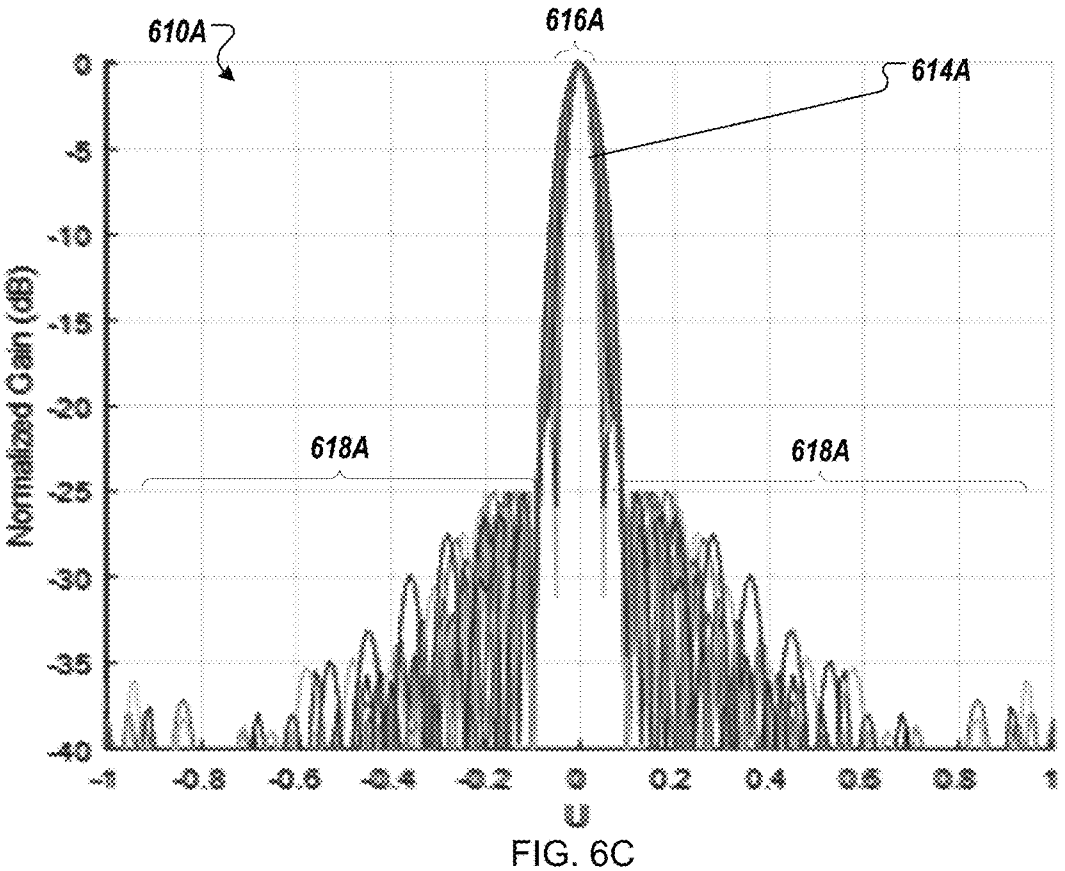
FIGS. 6C-F illustrate radiation patterns of an antenna structure with two interleaved phased array antennas having antenna elements formed into two overlapping ellipses, according to another embodiment.
Figure 6D:
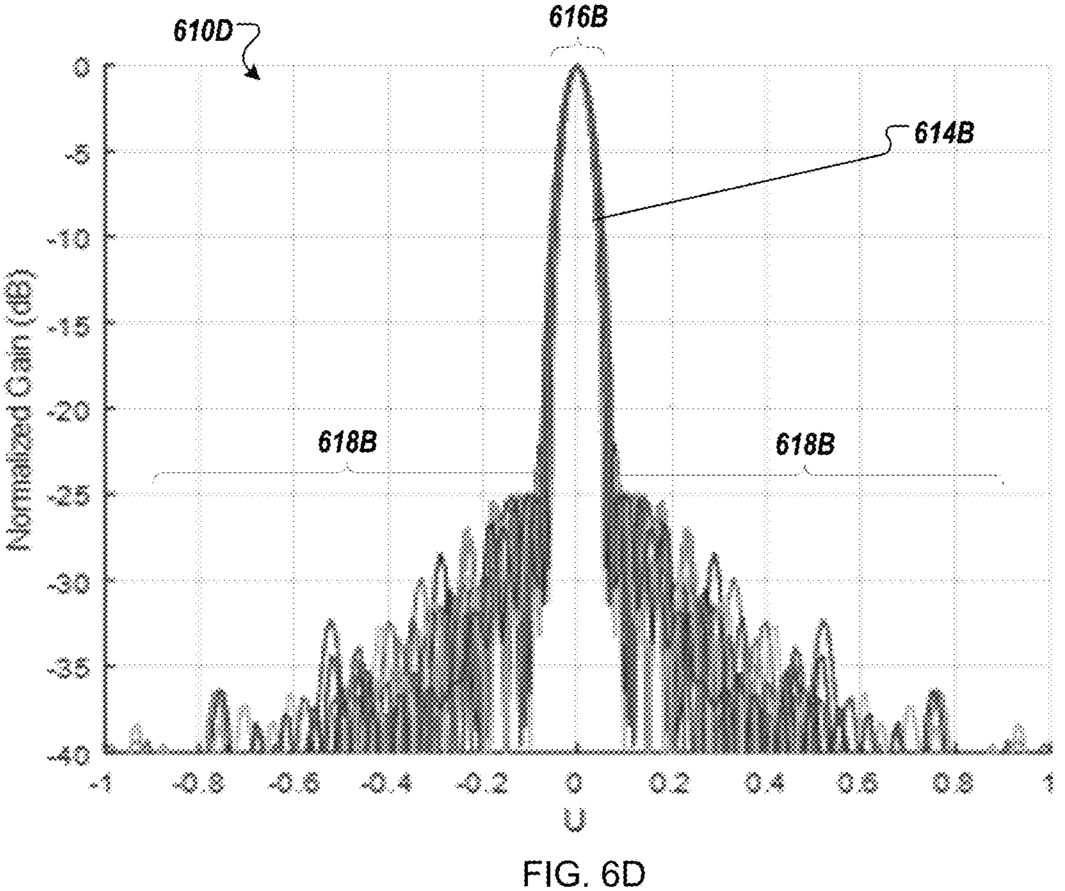
Figure 6E:
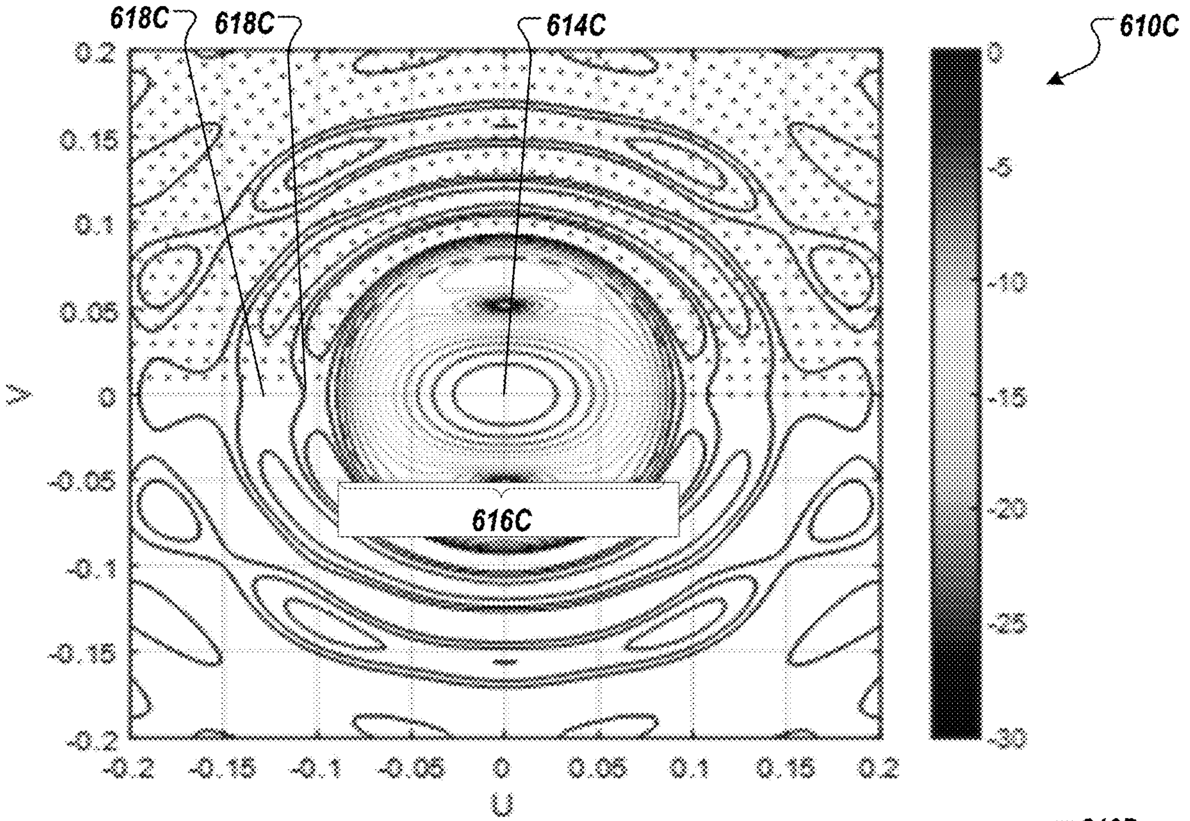
Figure 6F:
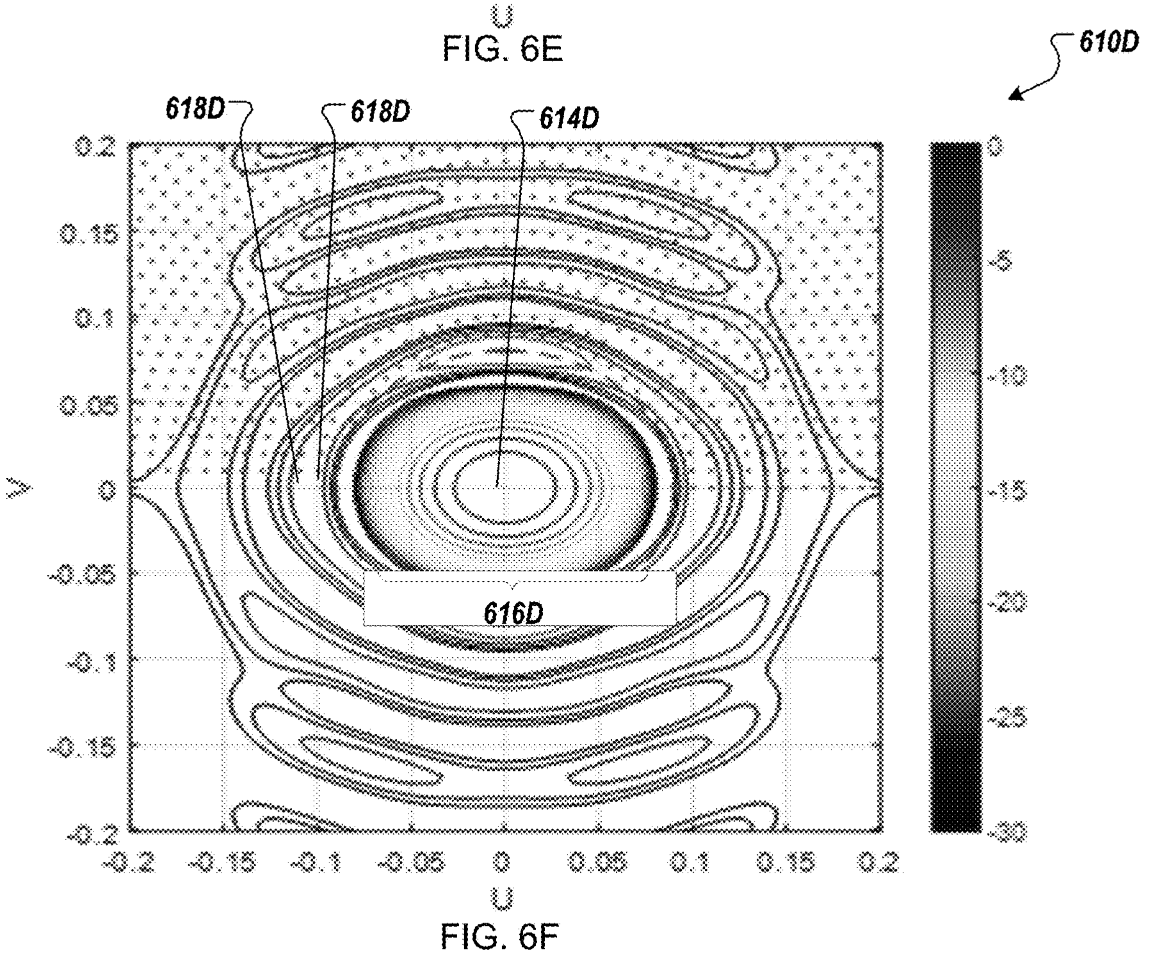

FIGS. 6A-B illustrate an embodiment of an antenna structure with two interleaved phased array antennas 600A, 600B having antenna elements formed into two overlapping ellipses 602, 604, according to another embodiment. As shown in FIGS. 6A-B, the antenna structure is divided into three regions. A first region 606 is located inside the first ellipse 602 but outside the second ellipse 604. A second region 608 is located inside the second ellipse 604 but outside the first ellipse 602. A third region 620 is located in the rea overlapped by the first ellipse 602 and the second ellipse 604. It should be noted that the antenna elements may form two overlapping areas that are not limited to being ellipses (e.g., the areas are circles, elliptical shaped, super ellipse shape, rectangles, etc.)

In some embodiments, as shown in FIGS. 6A-B, a first subset of the second set of antenna elements is located in the second region 608. A second subset of the second set of antenna elements is located in the third region 620. The second subset of the second set of antenna elements can be disposed in the third region 620 such that each antenna element in the second subset occupies a space not occupied by an antenna element from the first set of antenna elements. For example, as shown in FIGS. 6A-B, the first phased array antenna 600A and the second phased array antenna can each include elements within the third region 620 that are complements (e.g., disposed symmetrically). In another example, where an element of the first set of antenna elements is disposed, a gap is disposed in the second set of antenna elements. In a further embodiment, the first phased array antenna 600A and the second phased array antenna 600B when combined, fill the entirety of the third region 620.

FIGS. 6C-F illustrate radiation patterns 610 of an antenna structure with two interleaved phased array antennas 600A, 600B having antenna elements formed into two overlapping ellipses 602, 604, according to another embodiment. Radiation pattern 610A represents a two-dimensional (2D) illustration of a signal pattern radiated by the first phased array antenna 600A. Radiation pattern 610B represents a 2D illustration of a signal pattern radiated by the second phased array antenna 600B. Radiation pattern 610C represents a three-dimensional (3D) illustration of a signal pattern radiated by the first phased array antenna 600A. Radiation pattern 610D represents a 3D illustration of a signal pattern radiated by the second phased array antenna 600B. As shown in FIGS. 6C-F, radiation patterns 610 includes a main lobe 614 (e.g., beam) propagating at a desired scan angle. The main lobe 614 includes a beamwidth 616. The radiation patterns 610 include side lobes 618. The side lobes 618 may be a result of dispersive effects of the signals radiated by each of the antenna elements, such as constructive and deconstructive interference between individual signals radiated by each of the antenna elements. In some embodiments, the structure and shape of each phased array antenna 600A and 600B can mitigate side lobes 618 and generate a main lobe 614 with a beamwidth 616 operable with a given aperture size.

Figure 7A:
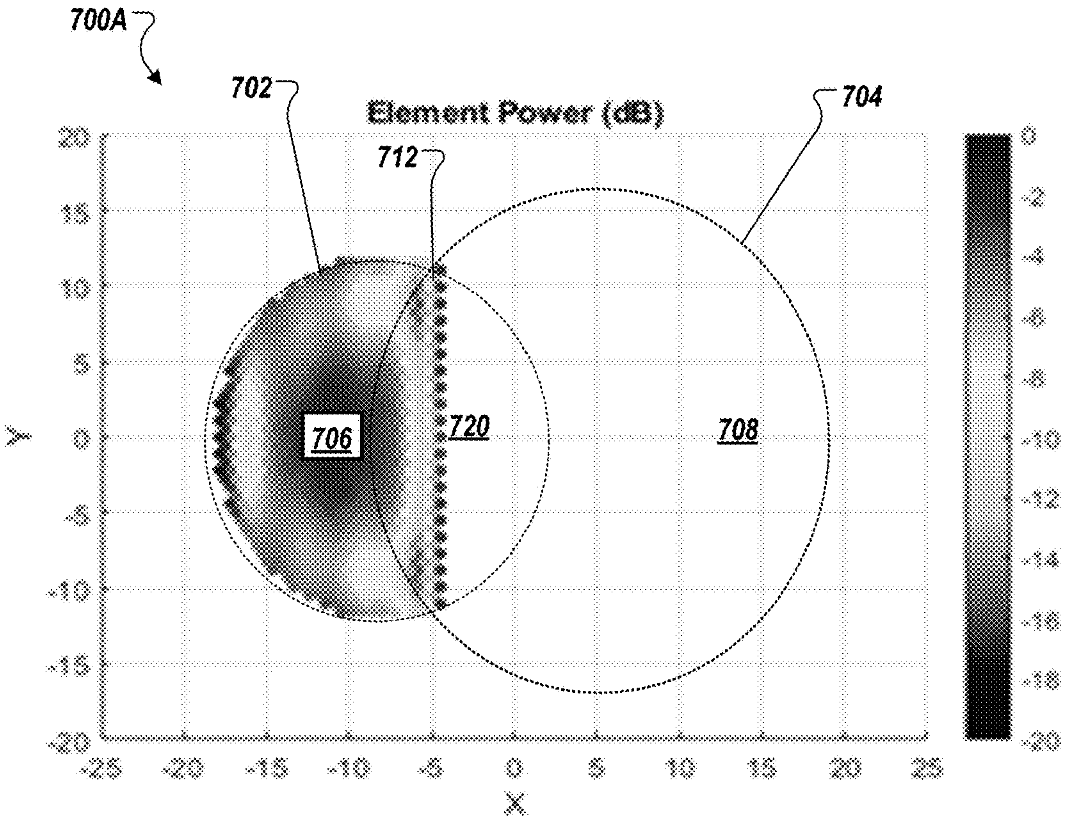
FIGS. 7A-B illustrate an embodiment of an antenna structure with two interleaved phased array antennas having antenna elements formed into two overlapping ellipses, according to another embodiment.
Figure 7B:
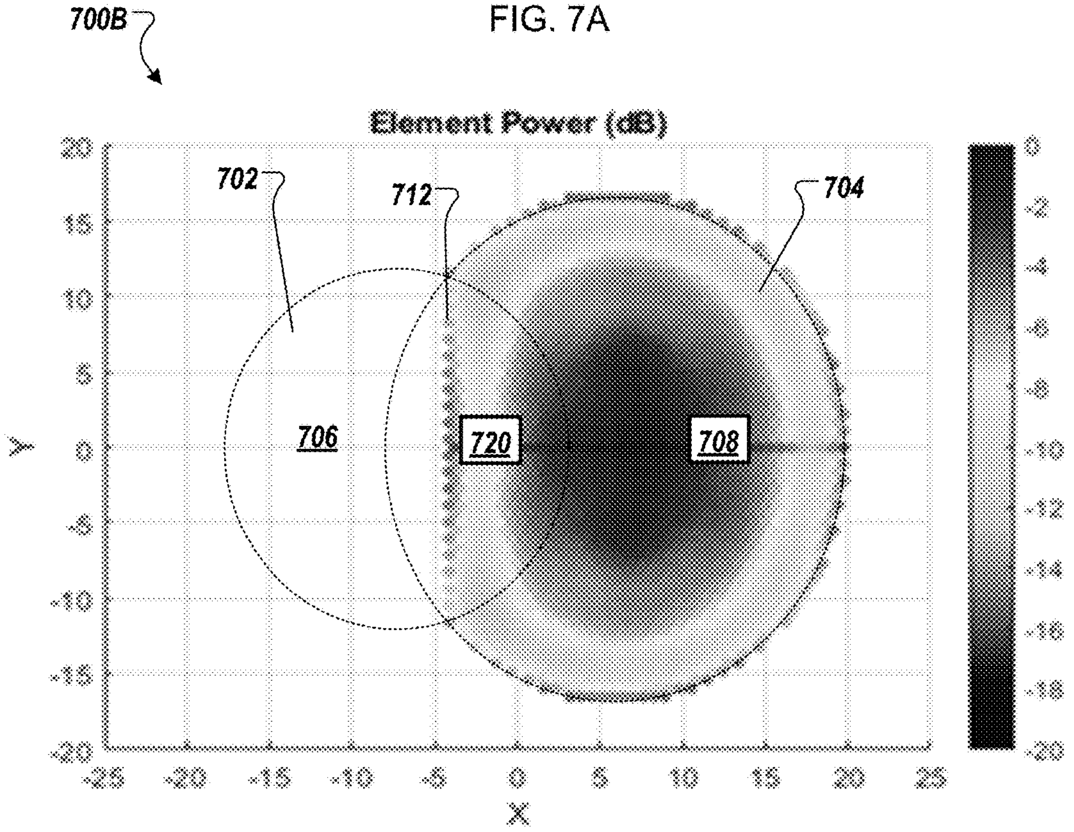
Figure 7C:
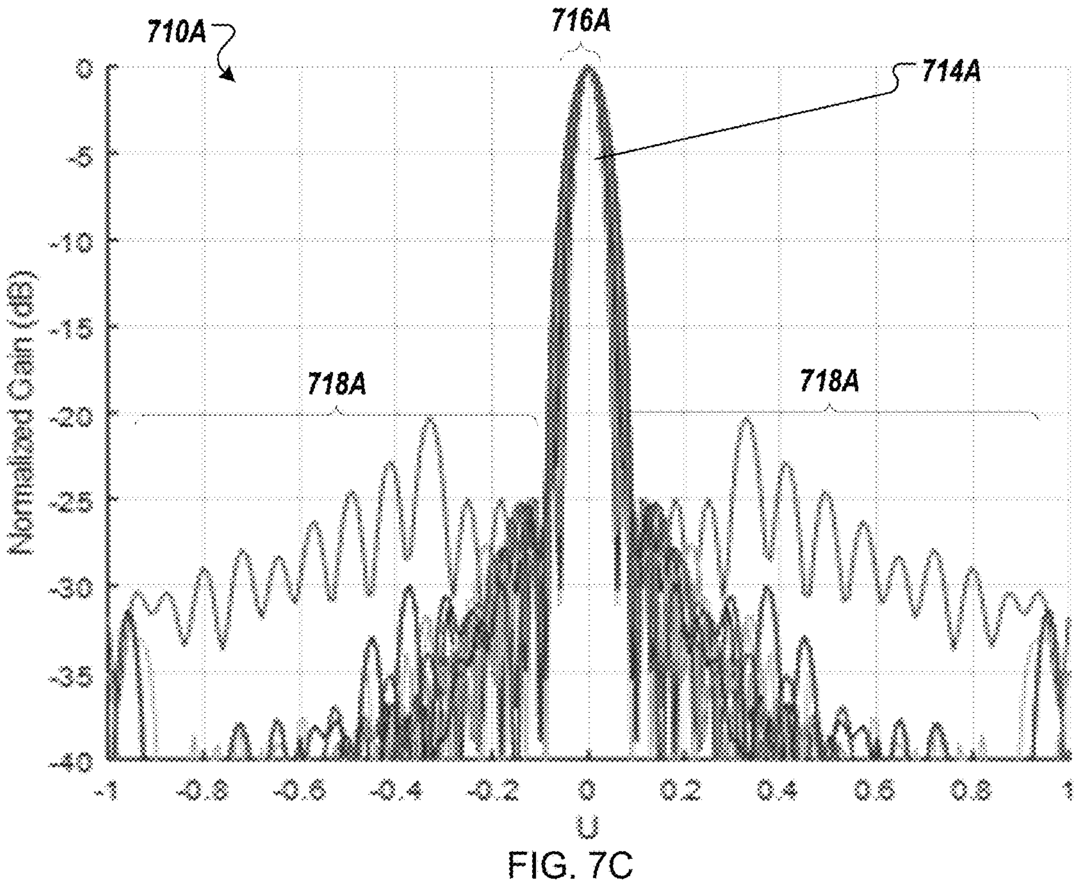
FIGS. 7C-F illustrate radiation patterns of an antenna structure with two interleaved phased array antennas having antenna elements formed into two overlapping ellipses, according to another embodiment.
Figure 7D:
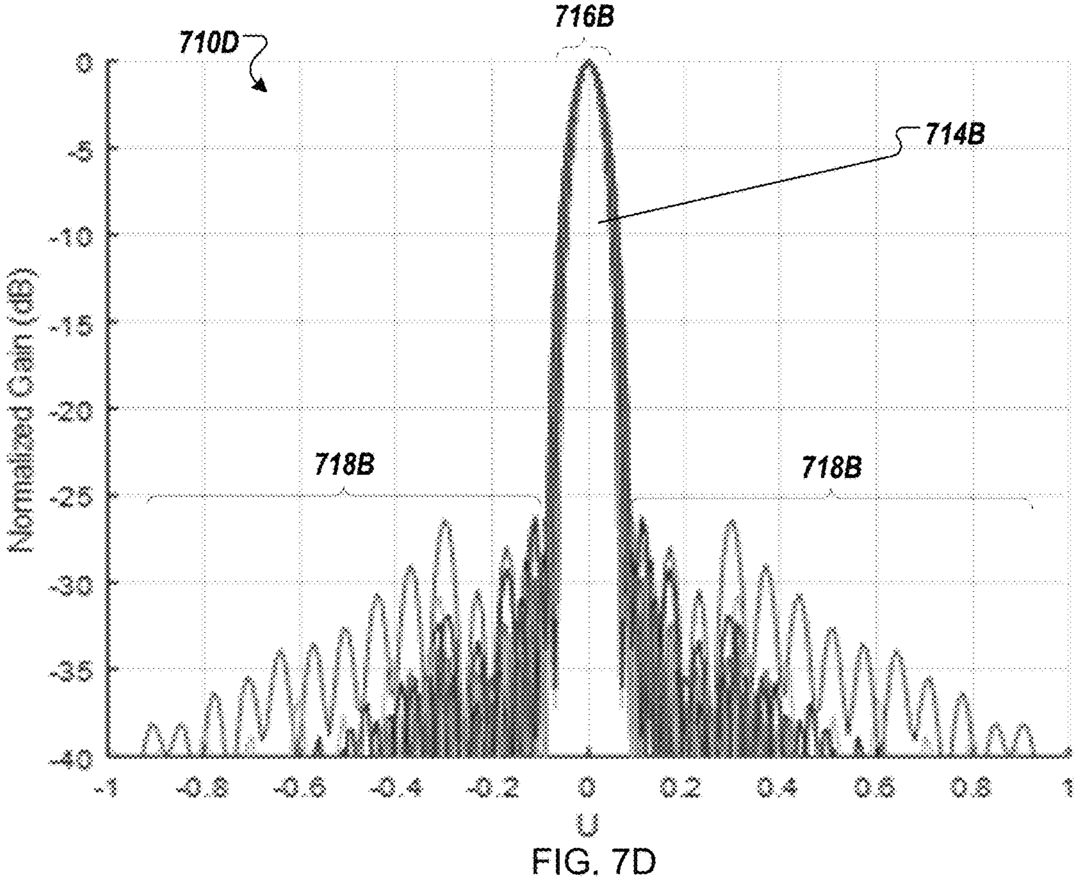
Figure 7E:
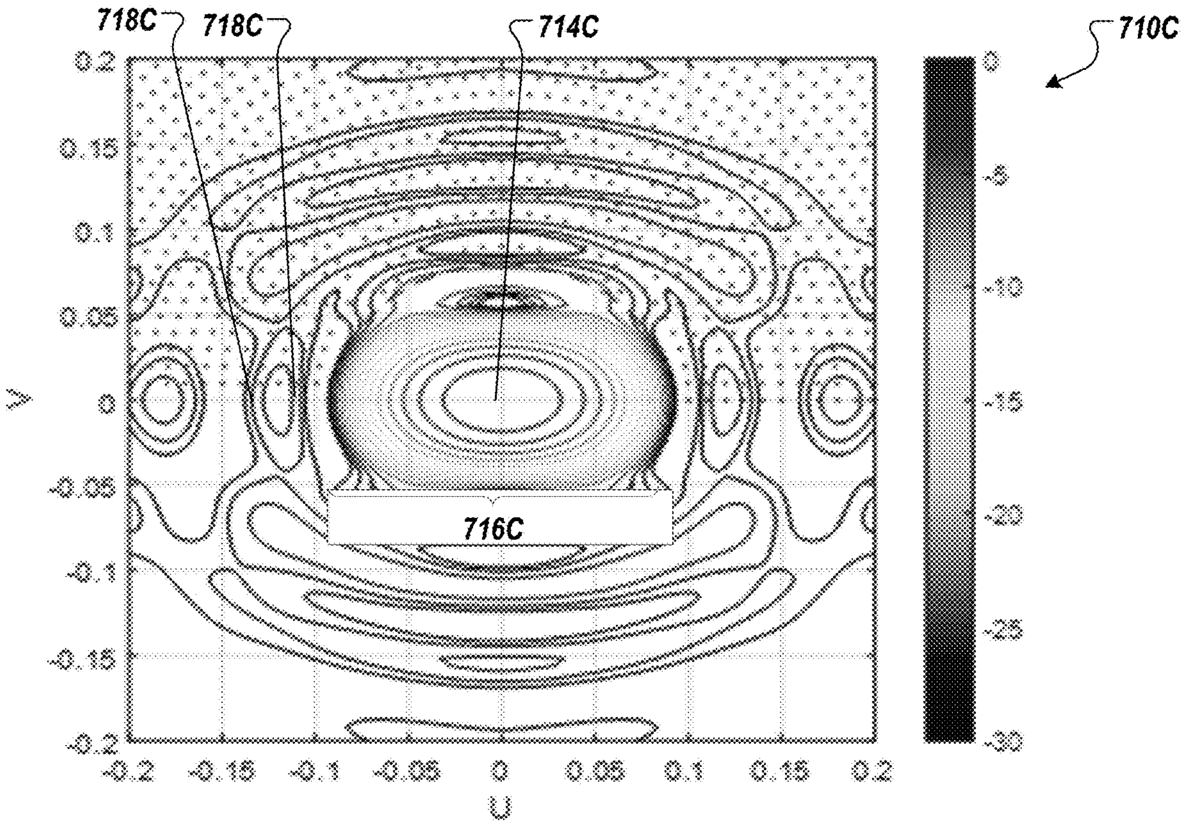
Figure 7F:
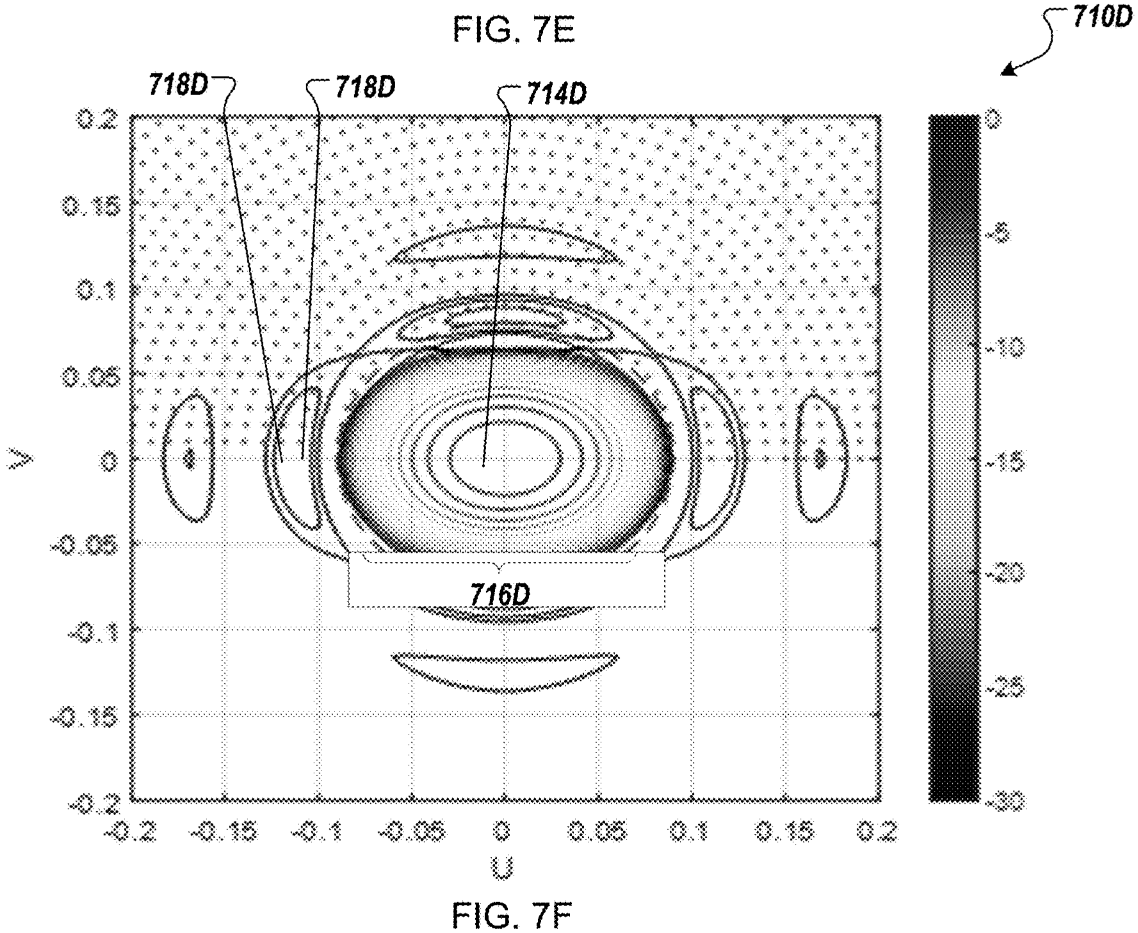

FIGS. 7A-B illustrate an embodiment of an antenna structure with two interleaved phase array antennas 700A, 700B having antenna elements formed into two overlapping ellipses 702, 704, according to another embodiment. As shown in FIGS. 7A-B, the antenna structure includes three regions. A first region 706 is located inside the first ellipse 702 but outside the second ellipse 704. A second region 708 is located inside the second ellipse 704 but outside the first ellipse 702. A third region 720 is located in the area overlapped by the first ellipse 702 and the second ellipse 704. It should be noted that the antenna elements may form two overlapping areas that are not limited to being ellipses (e.g., the areas are circles, elliptical shaped, super ellipse shape, rectangles, etc.)

In some embodiments, as shown in FIGS. 7A-B, a first subset of the first set of antenna elements is located in the third region 620. A second subset of the second set of antenna elements is also located in the third region 620. The first subset of antenna elements and the subset of antenna elements form a boundary within the third region 620 of the antenna structure. The third region 720 may include a boundary 712 that divides the region into two sides. The antenna elements of the first phased array antenna 700A may be disposed on a first side of the boundary 712 (e.g., a side of the boundary closer to the center of the first ellipse). The antenna elements of the second phased array antenna 700B may be disposed on a second side of the boundary 712 (e.g., a side of the boundary closer to the center of the second ellipse). For example, as shown in FIGS. 7A-B, the boundary 612 may include a straight line having antenna elements of the first subset on the left and antenna elements of the second subset on the right. In some embodiments, the boundary may include a non-linear boundary. For example, the boundary may include a curved, a zigzag, or a tapered (e.g. a boundary that comes to a point) interface.

FIGS. 7C-F illustrate radiation patterns 710 of an antenna structure with two interleaved phased array antennas 700A, 700B having antenna elements formed into two overlapping ellipses 702, 704, according to another embodiment. Radiation pattern 710A represents a two-dimensional (2D) illustration of a signal pattern radiated by the first phased array antenna 700A. Radiation pattern 710B represents a 2D illustration of a signal pattern radiated by the second phased array antenna 700B. Radiation pattern 710C represents a three-dimensional (3D) illustration of a signal pattern radiated by the first phased array antenna 700A. Radiation pattern 710D represents a 3D illustration of a signal pattern radiated by the second phased array antenna 700B. As shown in FIGS. 7C-F, radiation patterns 710 includes a main lobe 714 (e.g., beam) propagating at a desired scan angle. The main lobe 714 includes a beamwidth 716. The radiation patterns 710 include side lobes 718. The side lobes 718 may be a result of dispersive effects of the signals radiated by each of the antenna elements, such as constructive and deconstructive interference between individual signals radiated by each of the antenna elements. In some embodiments, the structure and shape of each phased array antenna 700A and 700B can mitigate side lobes 718 and generate a main lobe 714 with a beamwidth 716 operable with a given aperture size.

Figure 8A:
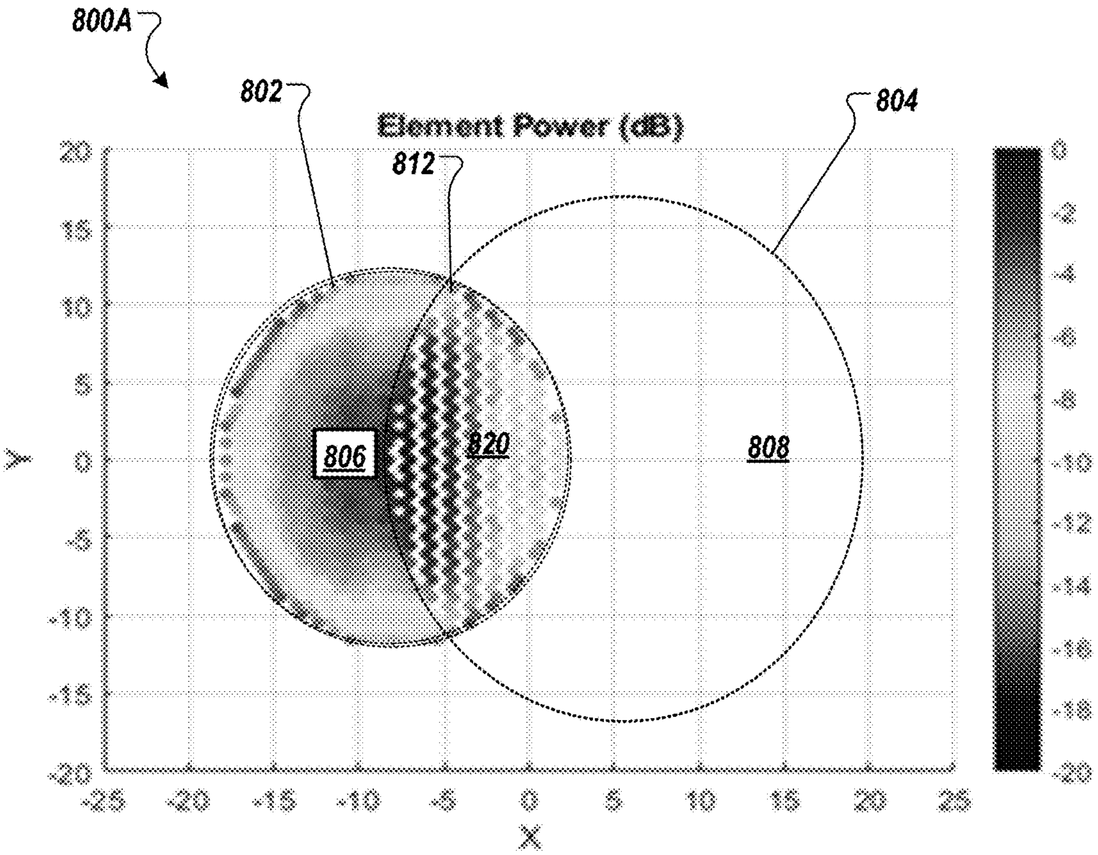
FIGS. 8A-B illustrate an embodiment of an antenna structure with two interleaved phased array antennas having antenna elements formed into two overlapping ellipses, according to another embodiment.
Figure 8B:
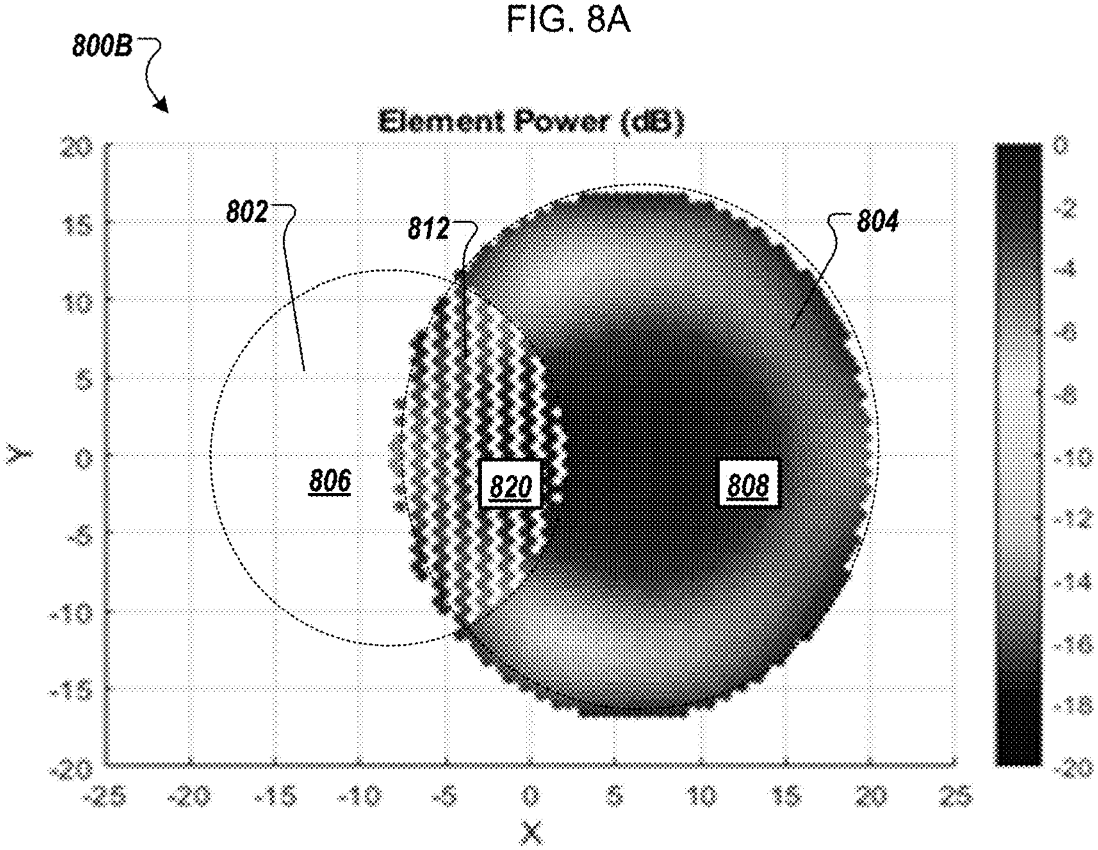
Figure 8C:
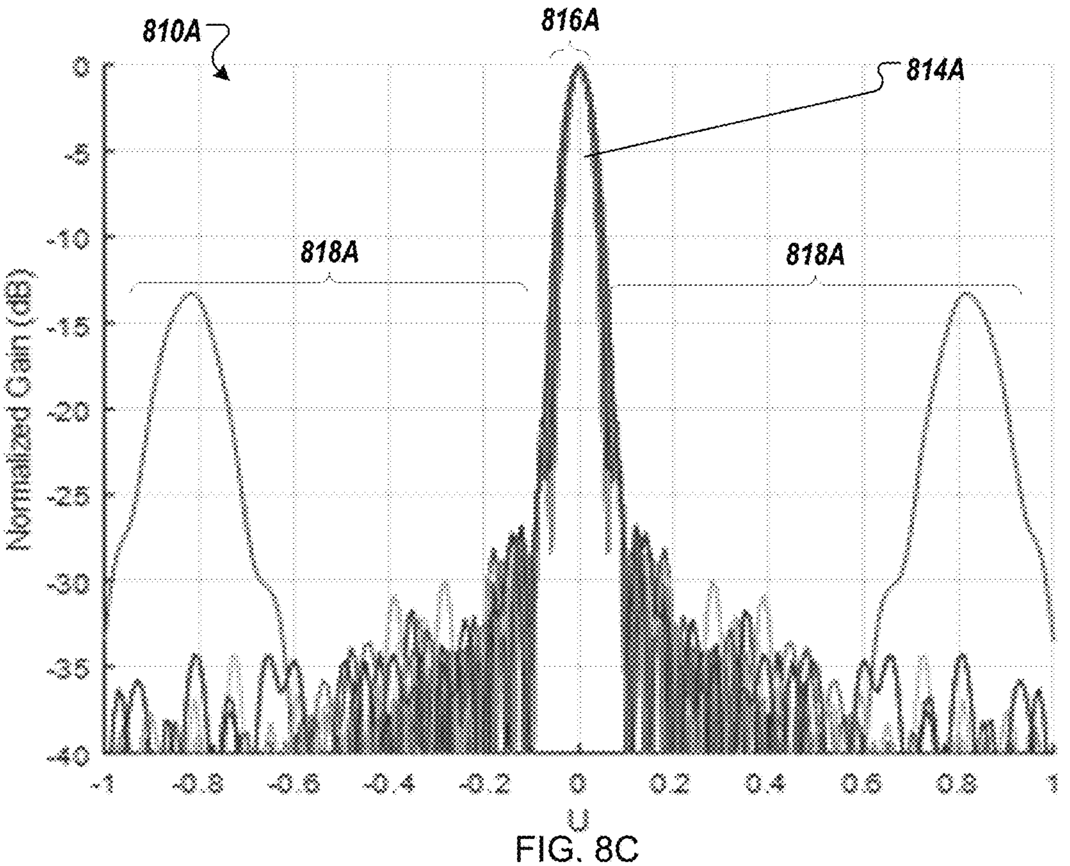
FIGS. 8C-F illustrate radiation patterns of an antenna structure with two interleaved phased array antennas having antenna elements formed into two overlapping ellipses, according to another embodiment.
Figure 8D:
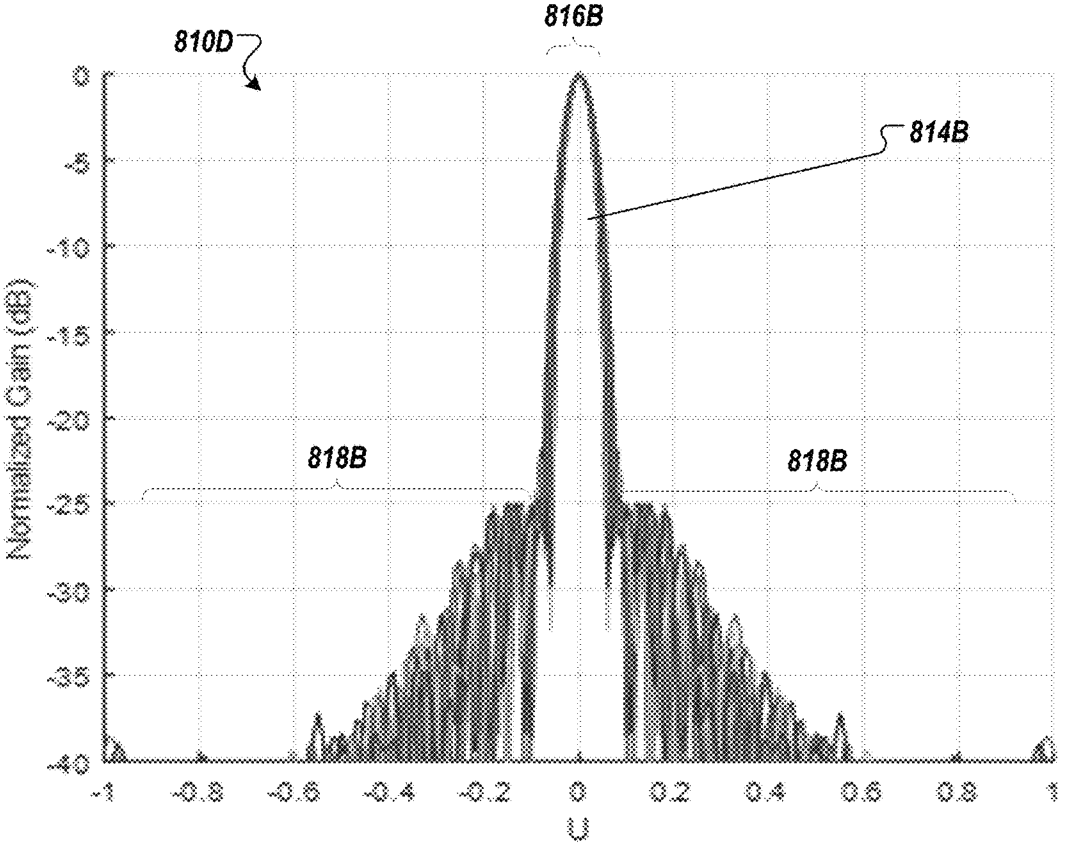
Figure 8E:
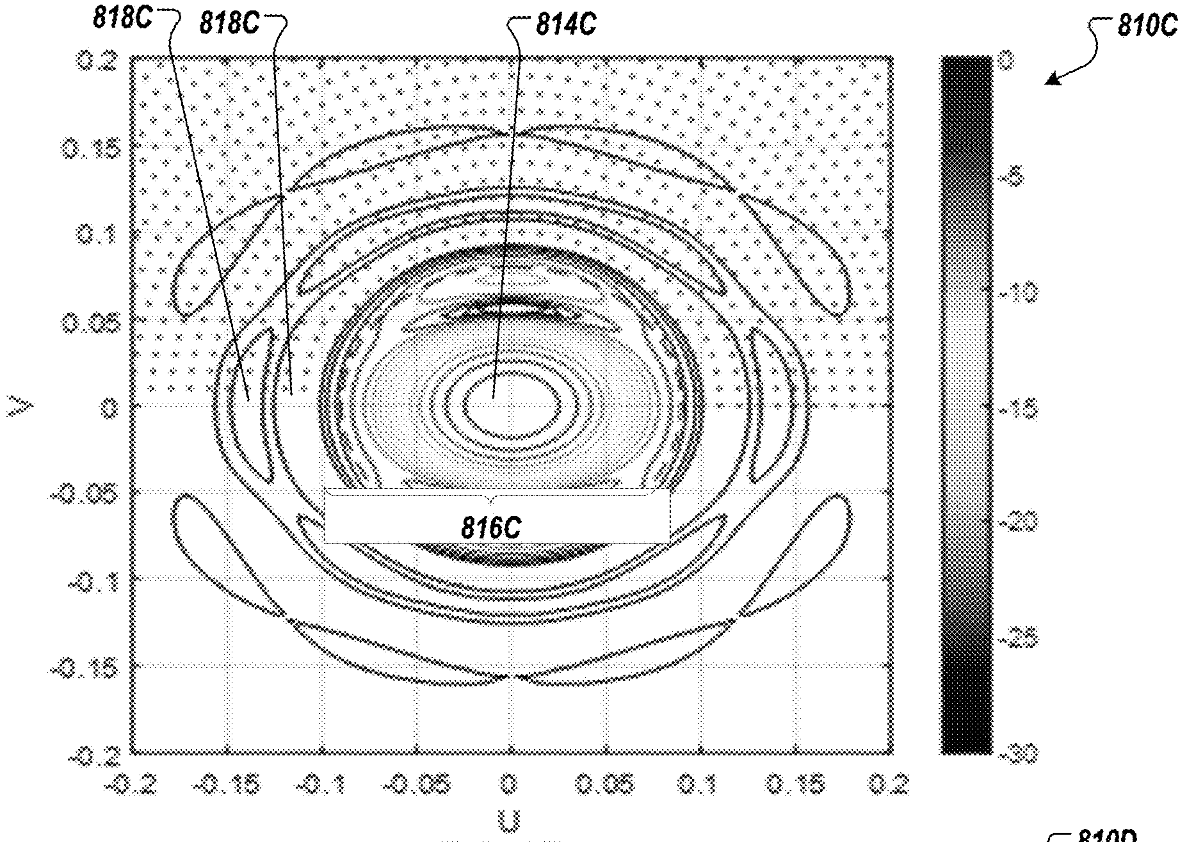
Figure 8F:
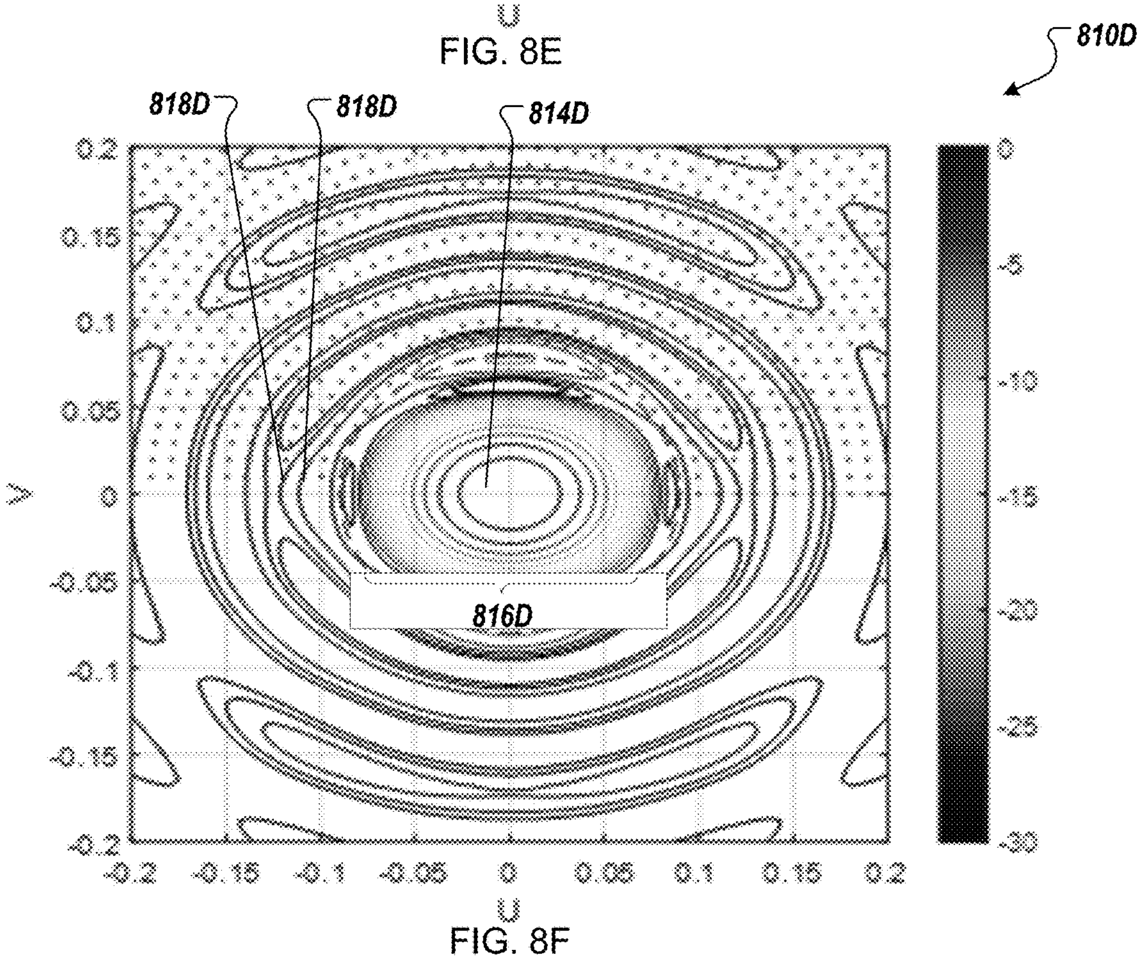

FIGS. 8A-B illustrate an embodiment of an antenna structure with two interleaved phased array antennas 800A, 800B having antenna elements formed into two overlapping ellipses 802, 804 according to another embodiment. As shown in FIGS. 8A-B, the antenna structure includes three regions. A first region 806 is located inside the first ellipse 802 but outside the second ellipse 804. A second region 808 is located inside the second ellipse 804 but outside the first ellipse 802. A third region 820 is located in the area overlapped by the first ellipse 802 and the second ellipse 804. It should be noted that the antenna elements may form two overlapping areas that are not limited to being ellipses (e.g., the areas are circles, elliptical shaped, super ellipse shape, rectangles, etc.)

In some embodiments, as shown in FIGS. 8A-B, a first subset of the first set of antenna elements is located in the third region 620. A second subset of the second set of antenna elements is also located in the third region 620. The first subset and the second subset of antenna elements form one or more alternating boundaries of antenna elements. For example, the alternating boundaries may include alternating linear boundaries (similar to boundary 712 of FIGS. 7A-B) between the first subset of antenna elements and the second subset of antenna elements. In another example, the boundary may include a non-linear boundary, such as having of a curved, a zigzag (e.g., as depicted in FIGS. 8A-B), or a tapered (e.g., a boundary that comes to a point) interface.

FIGS. 8C-F illustrate radiation patterns 810 of an antenna structure with two interleaved phased array antennas 800A, 800B having antenna elements formed into two overlapping ellipses 802, 804, according to another embodiment. Radiation pattern 810A represents a two-dimensional (2D) illustration of a signal pattern radiated by the first phased array antenna 800A. Radiation pattern 810B represents a 2D illustration of a signal pattern radiated by the second phased array antenna 800B. Radiation pattern 810C represents a three-dimensional (3D) illustration of a signal pattern radiated by the first phased array antenna 800A. Radiation pattern 810D represents a 3D illustration of a signal pattern radiated by the second phased array antenna 700B. As shown in FIGS. 8C-F, radiation patterns 810 includes a main lobe 814 (e.g., beam) propagating at a desired scan angle. The main lobe 814 includes a beamwidth 816. The radiation patterns 810 include side lobes 818. The side lobes 818 may be a result of dispersive effects of the signals radiated by each of the antenna elements, such as constructive and deconstructive interference between individual signals radiated by each of the antenna elements. In some embodiments, the structure and shape of each phased array antenna 800A and 800B can mitigate side lobes 818 and generate a main lobe 814 with a beamwidth 816 operable with a given aperture size.

Figure 9:
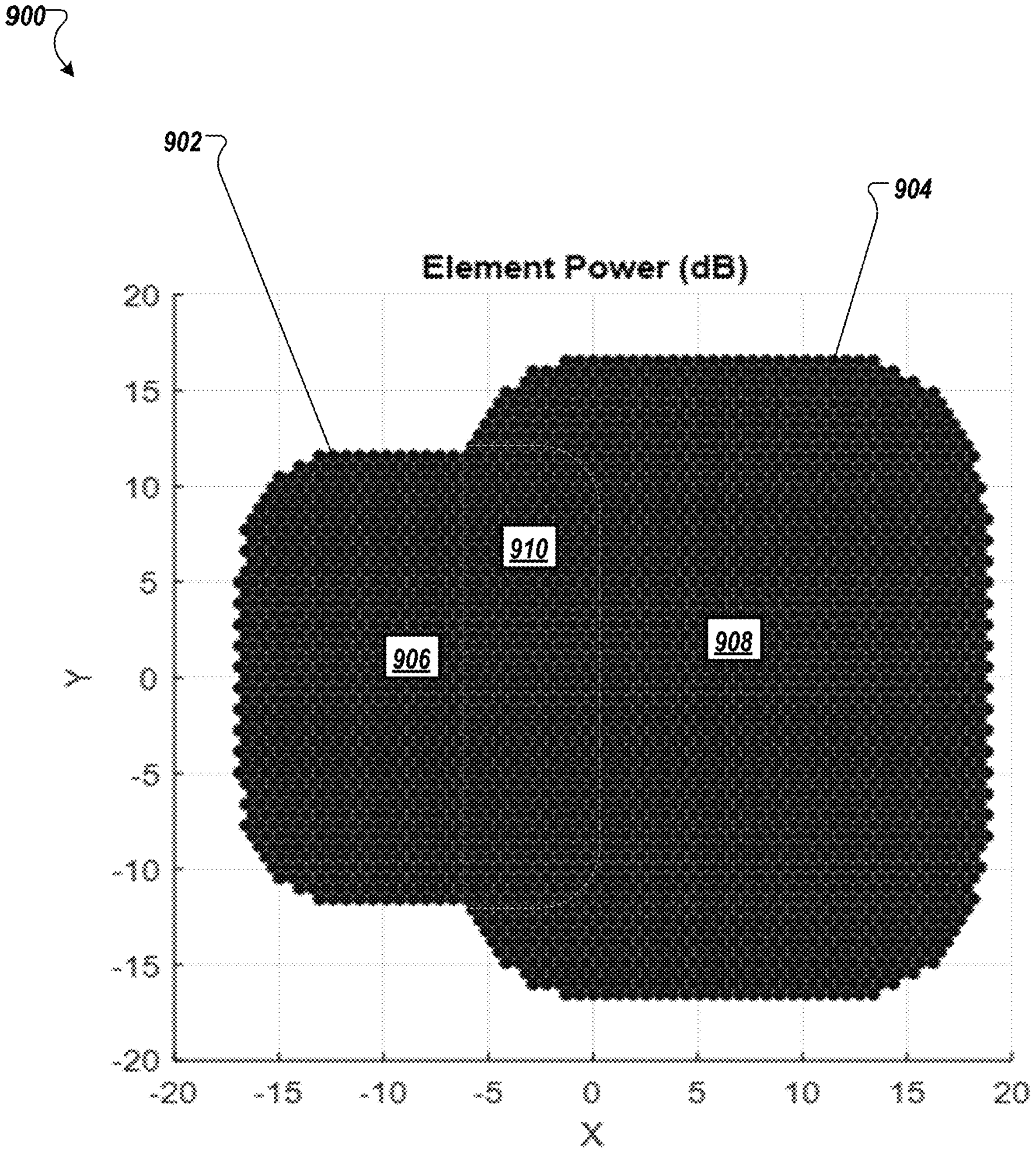
FIG. 9 illustrates a phased array antenna configuration of an antenna structure disposed on a support structure with two overlapping interleaved phased array antennas, according to another embodiment.

FIG. 9 illustrates a phased array antenna configuration 900 of an antenna structure disposed on a support structure with two overlapping interleaved phased array antennas 902, 904, according to another embodiment. The antenna structure includes a first phased array antenna 902 and a second phased array antenna 904. The first phased array antenna 902 includes a first set of antenna elements located within a perimeter of a first area 906. The first area may have a superellipse shape. The second phased array antenna 904 includes a second set of antenna elements located within a perimeter of a second area 908. The second area may have a superellipse shape. As shown in FIG. 9, the two areas 906, 908 have superellipse shapes with convex sides and are disposed such that they form an overlapping region 910.

In some embodiments, a minor axis of the first area 906 and a minor axis of the second area 908 are located on a same line. In some embodiments, a major axis of the first area 906 and a minor axis of the second area 908 are located on a same line. In some embodiments, a major axis of the first area 906 and a major axis of the second area 908 are located on a same line. In some embodiments, a minor axis of the first area 906 and a minor axis of the second area 908 are located on a same line.

In some embodiments, the first phased array antenna 902 and the second phased array antenna 904 are complementary such that no two antenna elements occupy the same space when the first and second phased array antennas are interleaved together on a common support structure. For example, as shown in FIG. 9, the overlapped region 910 may include antenna elements from the first phased array antenna 902 and antenna elements from the second phased array antenna 904, but only one antenna element may be disposed at any given point in the overlapped region 910.

In some embodiments, the antenna elements of both the first set of antenna elements and the second set of antennas may be excited to radiate at various power levels based on the relative location of each individual antenna element within the antenna structure. In some embodiments, for example, the power radiated by elements of the first phased array antenna 902 disposed near the center of the first area 906 may be greater than power radiated by the antenna elements located near the perimeter of the first area 906. In other embodiments, the power radiated by antenna elements of the first phased array antenna 902 disposed near the perimeter of the first area 906 can be greater than power radiated by antenna elements located near the center of the first area 906.

In some embodiments, the two phased array antennas, perform different radio functions (e.g., receive, transmit, different frequency bands, polarization, beam set, etc.), as detailed in other embodiments.

FIGS. 10A-F illustrates further embodiments of an antenna structure with two interleaved phased array antennas having antenna elements formed into two overlapping superellipses.

Figure 10A:
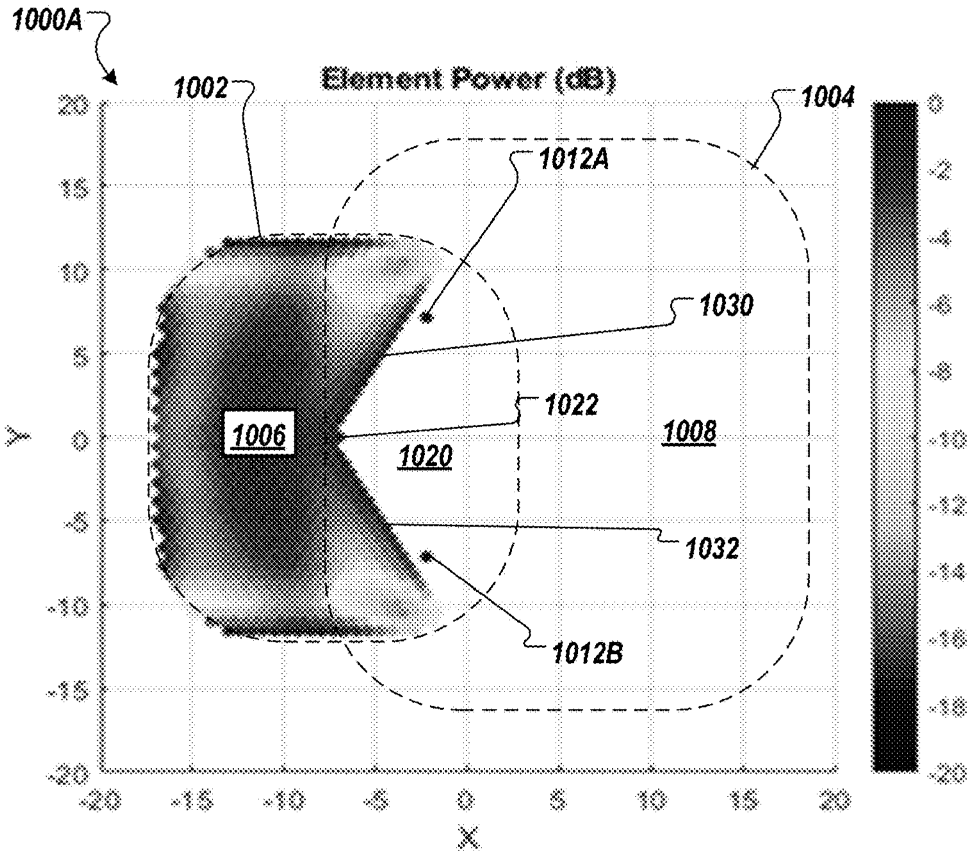
FIGS. 10A-B illustrate an embodiment of an antenna structure with two interleaved phased array antennas having antenna elements formed into two overlapping superellipses, according to another embodiment.
Figure 10B:
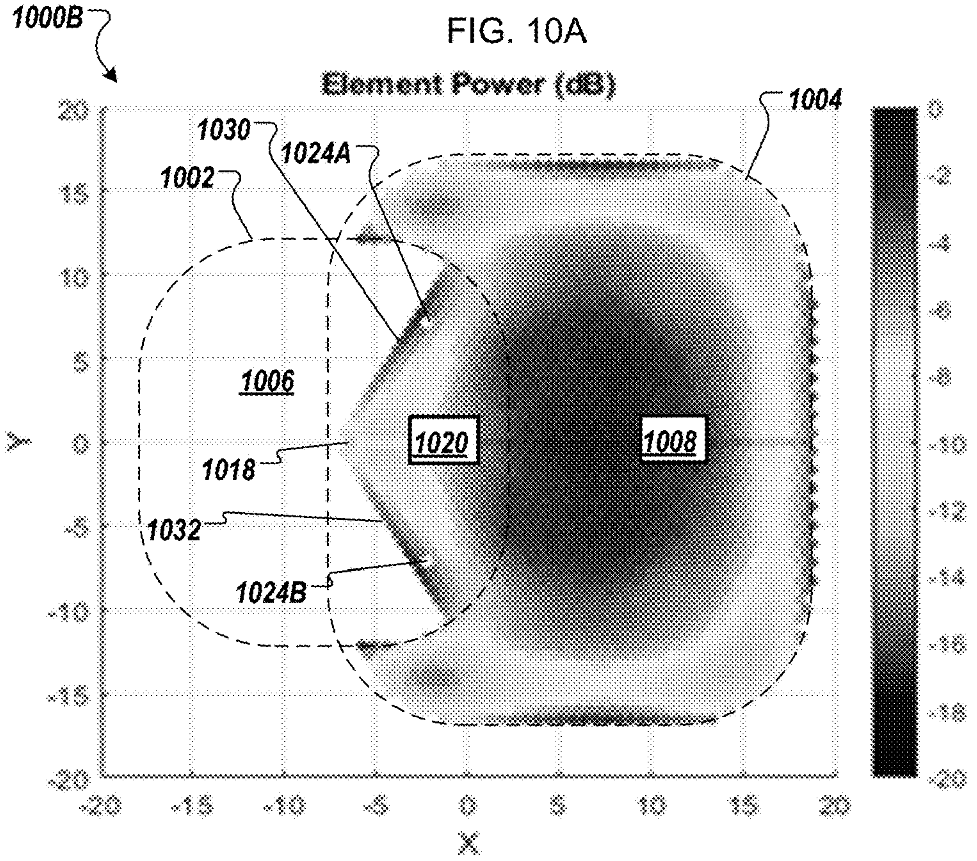
Figure 10C:
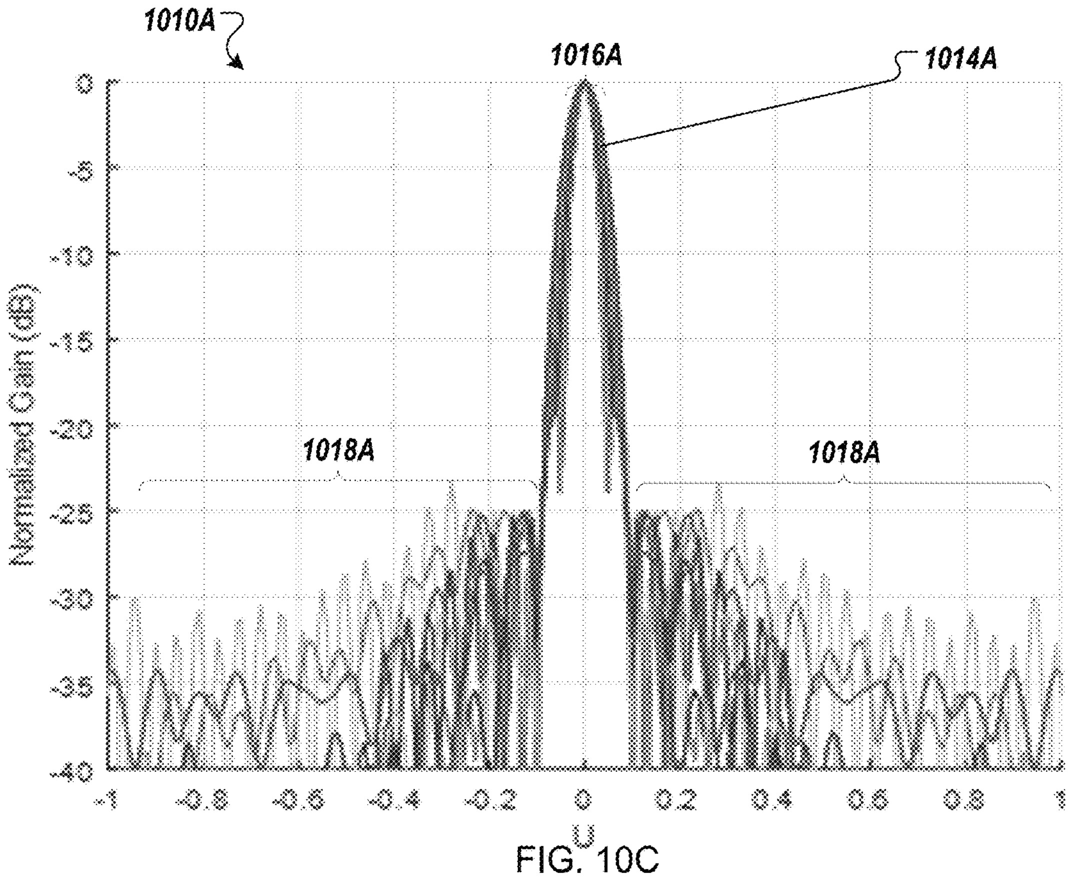
FIGS. 10C-F illustrate radiation patterns of an antenna structure with two interleaved phased array antennas having antenna elements formed into two overlapping superellipses, according to another embodiment.
Figure 10D:
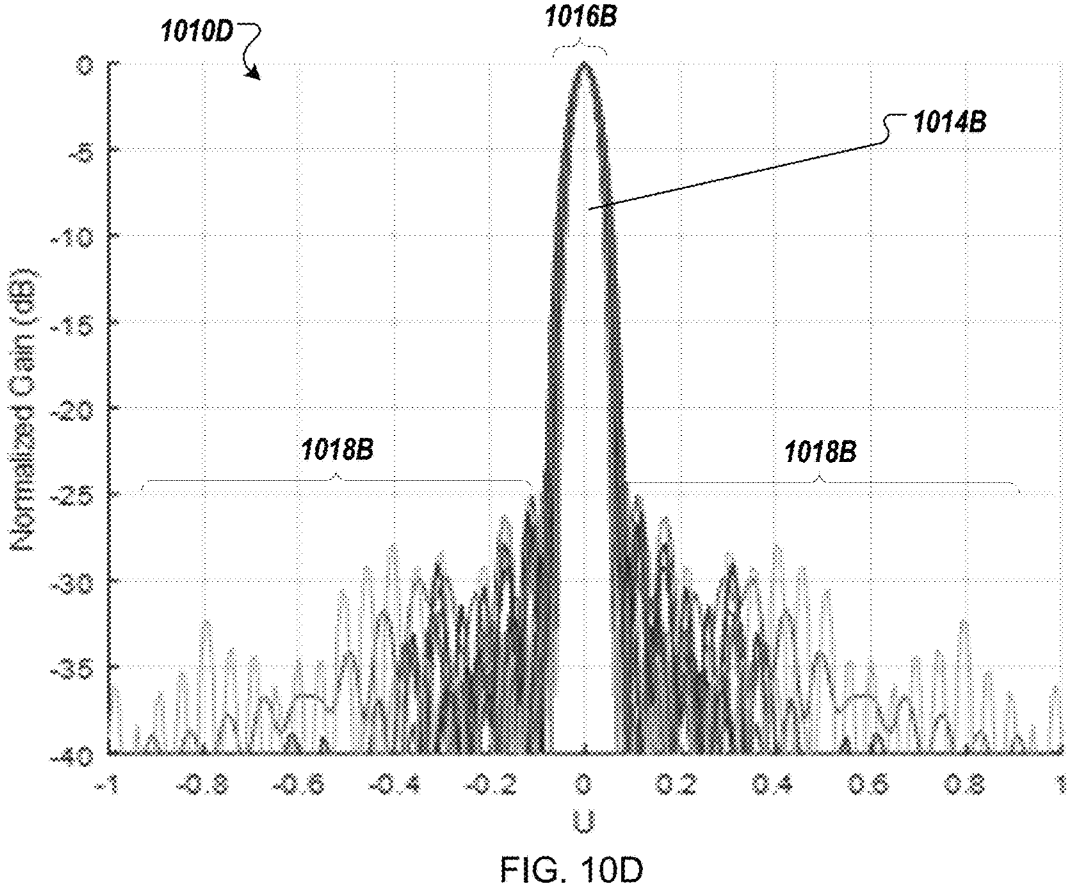
Figure 10E:
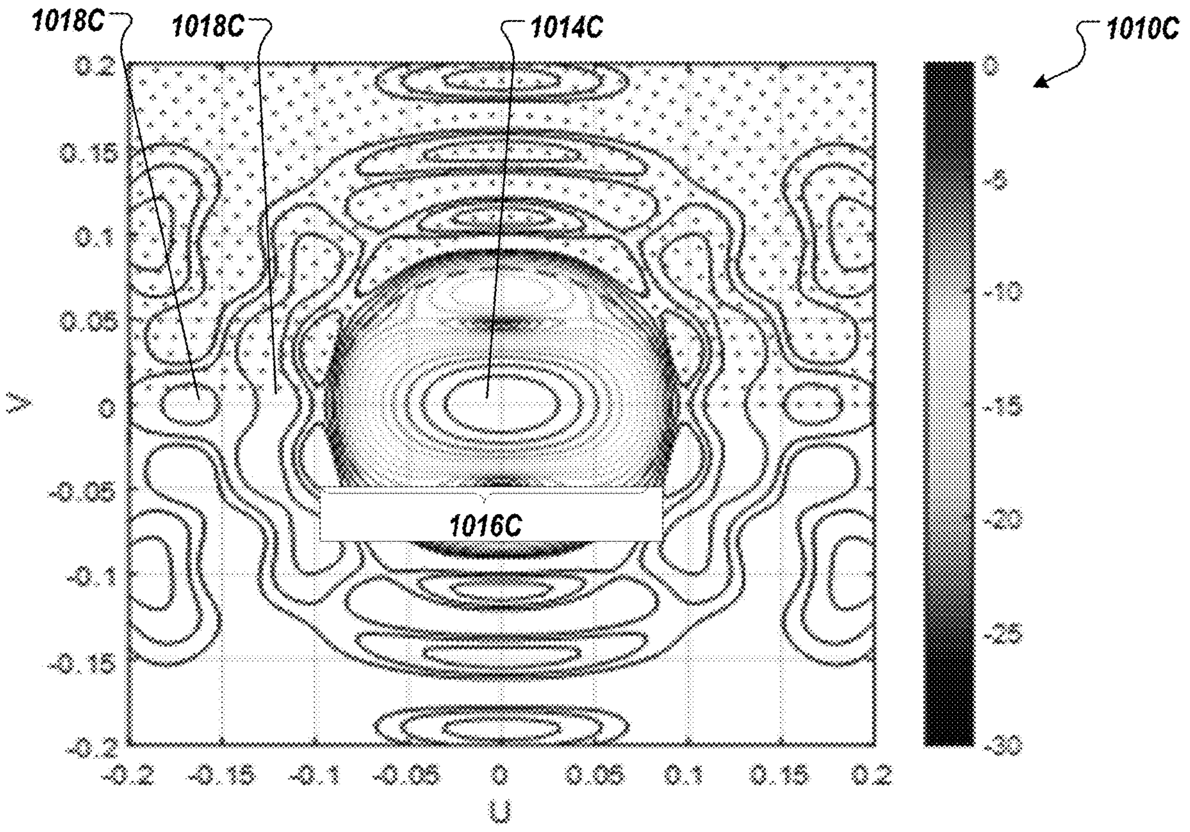
Figure 10F:
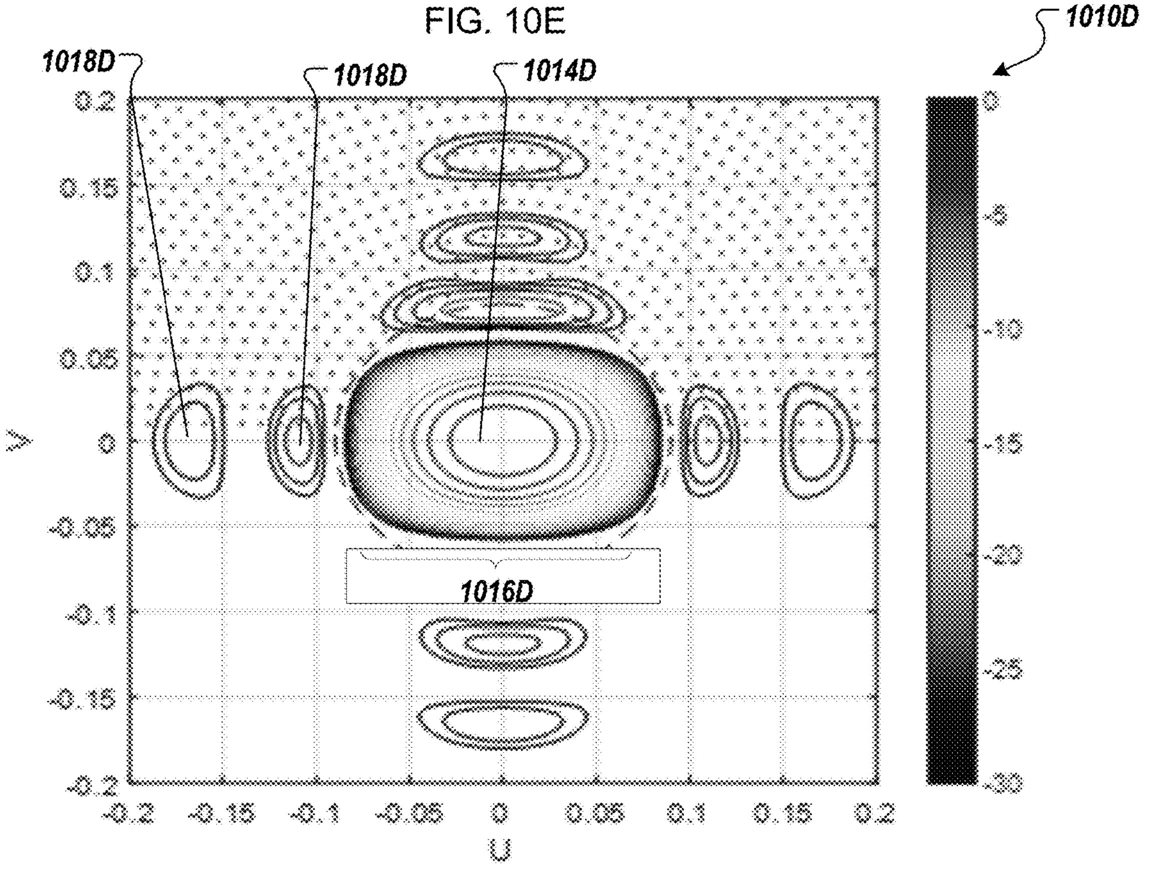

FIGS. 10A-B illustrate an embodiment of an antenna structure with two interleaved phased array antennas, 1000A, 1000B having antenna elements formed into two overlapping superellipses 1002, 1004 according to another embodiment. As shown in FIGS. 10A-B, the antenna structure includes three regions. A first region 1006 is located inside the first superellipse 1002 but outside the second superellipse 1004. A second region 1008 is located inside the second superellipse 1004 but outside the first superellipse 1002. A third region 1020 is located in the area overlapped by the first superellipse 1002 and the second superellipse 1004. It should be noted that the antenna elements may form two overlapping areas that are not limited to being superellipse shaped (e.g., the areas are circles, elliptical shaped, super ellipse shape, rectangles, etc.)

In some embodiments, as shown in FIGS. 10A-B, a first subset of the second set of antenna elements is located in the second region 1008. A second subset of the second set of antenna elements is located in the third region 1020. The second subset may have a first width at the minor axis of the second superellipse and a second width at each of a second axis that is located on a first side of, and parallel to, the minor axis of the second superellipse. The second subset may further have a third axis that is located on a second side of, and parallel to, the minor axis of the second superellipse.

In some embodiments, as shown in FIGS. 10A-B, the first set of antenna elements may include on or more antenna elements 1012A-B disposed in the third region 1020 that are surround by antenna elements of the second set of antenna elements. Accordingly, the second phased array antenna 1000B includes voids 1024A-B such the antenna elements 1012A-B can be disposed in the illustrated location of the antenna structure. Voids 1024A-B can be gaps or areas between elements of the second phased array antenna 1000B in which there are no elements of the second phased array antenna 1000B. FIGS. 10A-B illustrate examples of locations within the third region 1020 where elements of the second phased antenna 1000B include voids 1024A-B. It be appreciated that various embodiments can include configurations where the first phased array antenna 1000A and/or the second phased array antenna 1000B include voids that are occupied by antenna elements from the other phased antenna array.

In some embodiments, the first phased array antenna 1000A and the second phased array antenna 1000B are complementary (e.g., the first phased antenna array 1000A is a mirror image of the second phased antenna array 1000B) such that no two antenna elements occupy the same space when the first and second phased array antennas are interleaved together on a common support structure. For example, as shown in FIGS. 10A-B, the third region 1020 may include antenna elements from the first phased array antenna 1000A and antenna elements from the second phased array antenna 1000B, but only one antenna element may be disposed at any given point in the first, second, third and/or third regions 1006, 1008, and 1020. In a further embodiment, elements from the first phased array antenna 1000A and the second phased array antenna 1000B may be disposed to fill the entirety of the first region 1006, the second region 1008, and the third region 1020.

In some embodiments, the first phased antenna array 1000A form into various shapes. For example, as illustrated in FIG. 10A-B, the first phased antenna array 1000A includes triangular portions that form a bowtie shape. Further, one or more sides of the shape (e.g., triangle) may not be completely linear. For example, the triangle includes sides that track the perimeter of the first ellipse. In other embodiments, various shapes are used to keep the collection of antenna elements contiguous while minimizing the effects of interference between the two phased array antennas. The second phased array 1000B antenna may include complimentary shapes to fill the gaps and void from the shapes generated by the first phased antenna array 1000A.

In some embodiments, as shown in FIGS. 10A-B, the first set of antenna elements may include an antenna element 1022 that is disposed at the intersection of two tapered boundaries between the first set of antenna elements and the second set of antenna elements disposed in the third region 1020.

In some embodiments, as shown in FIGS. 10A-B, a first subset of the first set of antenna elements is disposed in a first area within the third region 1020. The first area may include a first edge 1030 that tapers from a sub-region within the third region 1020. A subset of the second set of antenna elements is disposed in a second area within the third region 1020. The second area may include a second edge 1032 that tapers from a sub-region. In a further embodiment, the first and second edges 1030, 1032 may be disposed from the same sub-region or from different sub-regions that are connected via a third edge (not illustrated). The third edge may be linear, curved, or of a zigzag formation. The sub-region may be associated with elements of the first and second superellipses 1002, 1004. For example, the first edge 1030 tapers from a sub-region disposed on an axis located on a first side of, and parallel to, the minor axis of the second 1004 superellipse. In another example, the second edge 1032 tapers from a sub-region disposed on an axis located on a second side of, and parallel to, the minor axis of the second superellipse 1004 to the minor axis.

FIGS. 10C-F illustrate radiation patterns 1010 of an antenna structure with two interleaved phased array antennas 1000A, 1000B having antenna elements formed into two overlapping superellipses 1002, 1004, according to another embodiment. Radiation pattern 1010A represents a two-dimensional (2D) illustration of a signal pattern radiated by the first phased array antenna 1000A. Radiation pattern 1010B represents a 2D illustration of a signal pattern radiated by the second phased array antenna 1000B. Radiation pattern 1010C represents a three-dimensional (3D) illustration of a signal pattern radiated by the first phased array antenna 1000A. Radiation pattern 1010D represents a 3D illustration of a signal pattern radiated by the second phased array antenna 1000B. As shown in FIGS. 10C-F, radiation patterns 1010 includes a main lobe 1014 (e.g., beam) propagating at a desired scan angle. The main lobe 1014 includes a beamwidth 1016. The radiation patterns 1010 include side lobes 1018. The side lobes 1018 may be a result of dispersive effects of the signals radiated by each of the antenna elements, such as constructive and deconstructive interference between individual signals radiated by each of the antenna elements. In some embodiments, the structure and shape of each phased array antenna 1000A and 1000B can mitigate side lobes 1018 and generate a main lobe 1014 with a beamwidth 1016 operable with a given aperture size.

Figure 11:
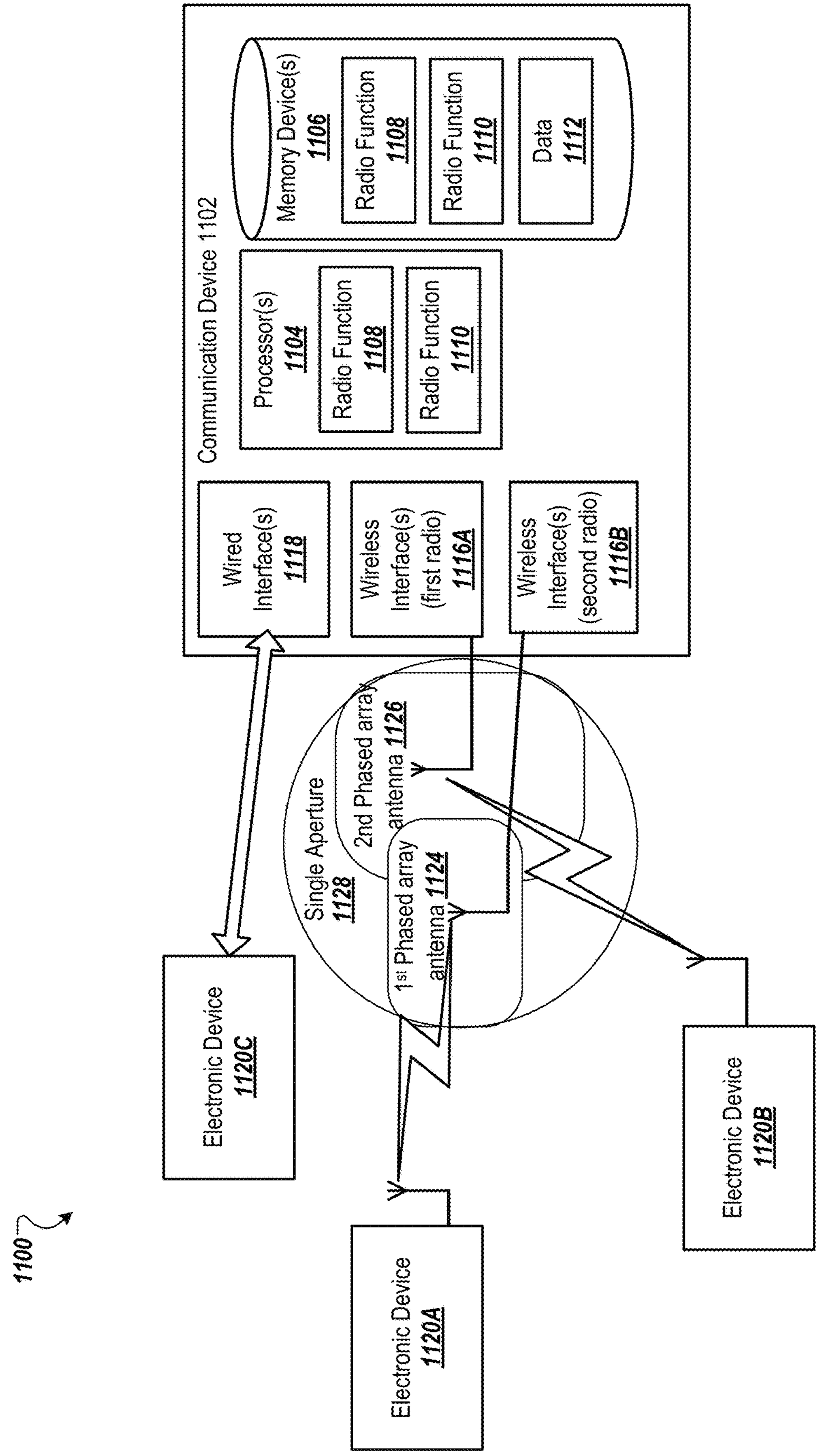
FIG. 11 is a block diagram of an electronic device that includes two interleaved phased array antennas within in a single aperture as described herein, according to one embodiment.

FIG. 11 is a block diagram of an electronic device 1100 that includes two interleaved phased array antennas 1124, 1126 within in a single aperture 1128 as described herein, according to one embodiment. In one embodiment, the electronic device 1100 includes the two interleaved phased array antennas disclosed in any of FIGS. 1-10. Alternatively, the electronic device 1100 may be other electronic devices, as described herein.

The electronic device includes a communication device 1102 that includes one or more processor(s) 1104, such as one or more CPUs, microcontrollers, field programmable gate arrays, or other types of processors. The communication device 1102 further includes one or more memory device(s) 1106, which may correspond to any combination of volatile and/or non-volatile storage mechanisms. The memory device(s) 1106 stores data associated with processing and carrying out both a first radio function 1108 and a second radio function 1110 to be performed in associated with the first phased array antenna 1124 and the second phase phased array antenna 1126, program data 1112, and/or other components. In one embodiment, the memory devices (s) stores instruction of methods to control operations of the communication devices 1102. The communication device 1102 performs functions by using the processor(s) 1104 to execute instructions (e.g., radio function 1108, 1110) provided by the memory device(s).

The first and second phased array antennas 1124, 1126 are coupled to front-end circuitry that includes wireless interfaces (e.g. radios) 1116A, 1116B and/or wired interface(s) 1118. The front-end circuitry may include radio front-end circuitry, antenna-switching circuitry, impedance-matching circuitry, or the like.

Electronic devices 1120A-C (e.g., endpoint devices, user devices, remote devices) may receive signals from and generate signals and send these signals to phased array antenna(s) 1124, 1126. Phased array antennas 1124, 1126 may be configured to transmit in different frequency bands and/or using different wireless communication protocols. The phased array antennas 1124, 1126 may be directional, omnidirectional, or non-directional antennas. In addition to sending data, phased array antennas 1124, 1126 may also receive data, which is sent to appropriate RF modules connected to the antennas. One of the phased array antennas 1124, 1126 may be any combination of the antenna structures described herein.

In one embodiment, the electronic device 1100 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna.

Figure 12:
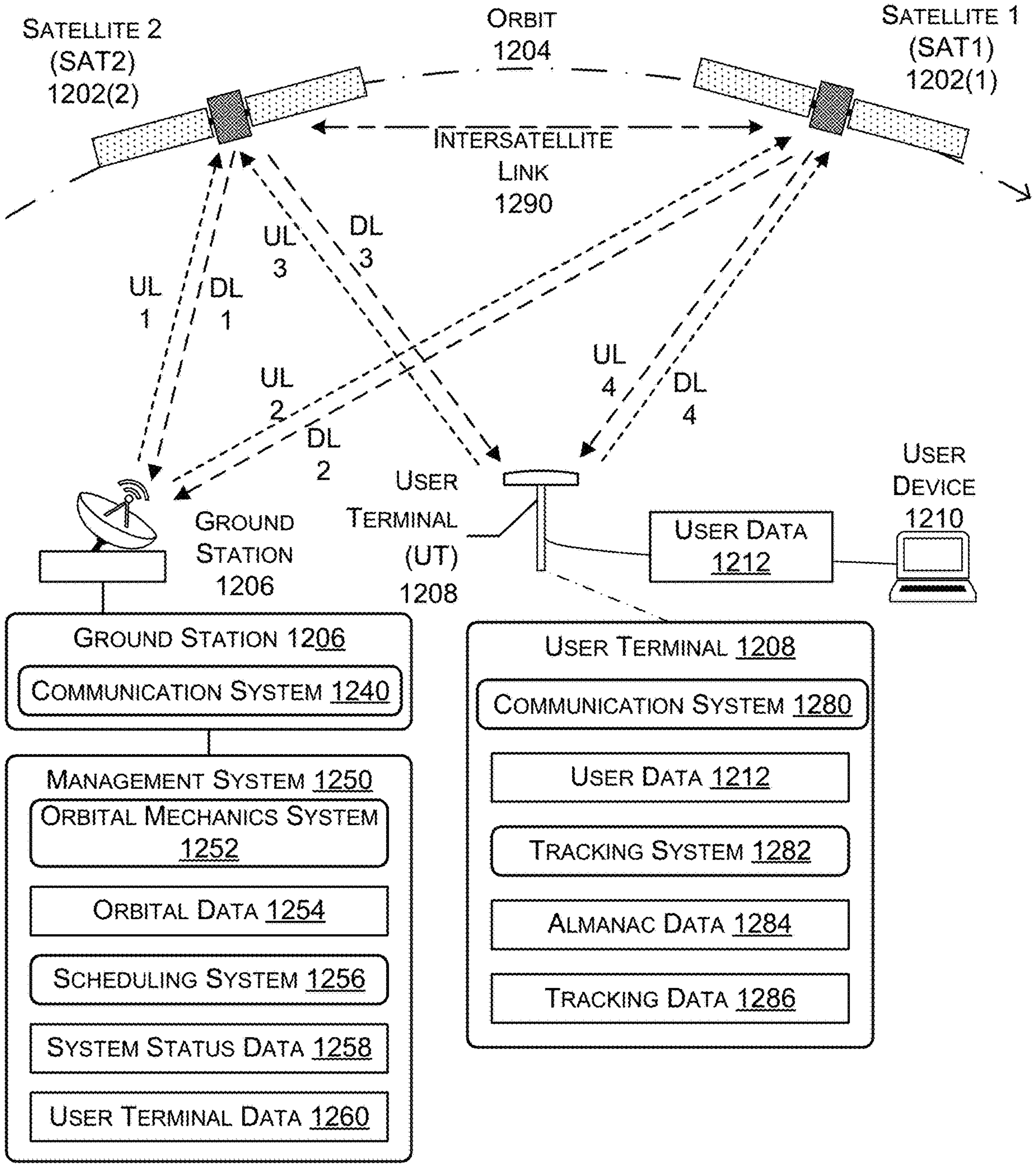
FIG. 12 illustrates a system including a constellation of satellites, each satellite being in orbit, according to embodiments of the present disclosure.

FIG. 12. illustrates a system 1200 including a plurality (or "constellation") of satellites 1202(1), 1202(2), . . . , 1202(S), each satellite 1202 being in orbit 1204. Also shown is a ground station 1206, user terminal (UTs) 1208, and a user device 1210.

The constellation may comprise hundreds or thousands of satellites 1202, in various orbits 1204. For example, one or more of these satellites 1202 may be in non-geosynchronous orbits (NGOs) in which they are in constant motion with respect to the Earth. For example, the orbit 1204 is a low earth orbit (LEO). In this illustration, orbit 1204 is depicted with an arc pointed to the right. A first satellite (SAT1) 1202(1) is leading (ahead of) a second satellite (SAT2) 1202(2) in the orbit 1204. The satellite 1202 is discussed in more detail with regard to FIG. 13.

One or more ground stations 1206 are in communication with one or more satellites 1202. The ground stations 1206 may pass data between the satellites 1202, a management system 1250, networks such as the Internet, and so forth. The ground stations 1206 may be emplaced on land, on vehicles, at sea, and so forth. Each ground station 1206 may comprise a communication system 1240. Each ground station 1206 may use the communication system 1240 to establish communication with one or more satellites 1202, other ground stations 1206, and so forth. The ground station 1206 may also be connected to one or more communication networks. For example, the ground station 1206 may connect to a terrestrial fiber optic communication network. The ground station 1206 may act as a network gateway, passing user data 1212 or other data between the one or more communication networks and the satellites 1202. Such data may be processed by the ground station 1206 and communicated via the communication system 1240. The communication system 1240 of a ground station may include components similar to those of the communication system of a satellite 1202 and may perform similar communication functionalities. For example, the communication system 1240 may include one or more modems, digital signal processors, power amplifiers, antennas (e.g., phased array antennas illustrated in FIGS. 1-10) (including at least one antenna that implements multiple antenna elements, such as a phased array antenna), processors, memories, storage devices, communications peripherals, interface buses, and so forth.

The ground stations 1206 are in communication with a management system 1250. The management system 1250 is also in communication, via the ground stations 1206, with the satellites 1202 and the UTs 1208. The management system 1250 coordinates operation of the satellites 1202, ground stations 1206, UTs 1208, and other resources of the system 1200. The management system 1250 may comprise one or more of an orbital mechanics system 1252 or a scheduling system 1256.

The orbital mechanics system 1252 determines orbital data 1254 that is indicative of a state of a particular satellite 1202 at a specified time. In one implementation, the orbital mechanics system 1252 may use orbital elements that represent characteristics of the orbit 1204 of the satellites 1202 in the constellation to determine the orbital data 1254 that predicts location, velocity, and so forth of particular satellites 1202 at particular times or time intervals. For example, the orbital mechanics system 1252 may use data obtained from actual observations from tracking stations, data from the satellites 1202, scheduled maneuvers, and so forth to determine the orbital elements. The orbital mechanics system 1252 may also consider other data, such as space weather, collision mitigation, orbital elements of known debris, and so forth.

The scheduling system 1256 schedules resources to provide communication to the UTs 1208. For example, the scheduling system 1256 may determine handover data that indicates when communication is to be transferred from the first satellite 1202(1) to the second satellite 1202(2). Continuing the example, the scheduling system 1256 may also specify communication parameters such as frequency, timeslot, and so forth. During operation, the scheduling system 1256 may use information such as the orbital data 1254, system status data 1258, user terminal data 1260, and so forth.

The system status data 1258 may comprise information such as which UTs 1208 are currently transferring data, satellite availability, current satellites 1202 in use by respective UTs 1208, capacity available at particular ground stations 1206, and so forth. For example, the satellite availability may comprise information indicative of satellites 1202 that are available to provide communication service or those satellites 1202 that are unavailable for communication service. Continuing the example, a satellite 1202 may be unavailable due to malfunction, previous tasking, maneuvering, and so forth. The system status data 1258 may be indicative of past status, predictions of future status, and so forth. For example, the system status data 1258 may include information such as projected data traffic for a specified interval of time based on previous transfers of user data 1212. In another example, the system status data 1258 may be indicative of future status, such as a satellite 1202 being unavailable to provide communication service due to scheduled maneuvering, scheduled maintenance, scheduled decommissioning, and so forth.

The user terminal data 1260 may comprise information such as a location of a particular UT 1208. The user terminal data 1260 may also include other information, such as a priority assigned to user data 1212 associated with that UT 1208, information about the communication capabilities of that particular UT 1208, and so forth. For example, a particular UT 1208 in use by a business may be assigned a higher priority relative to a UT 1208 operated in a residential setting. Over time, different versions of UTs 1208 may be deployed, having different communication capabilities such as being able to operate at particular frequencies, supporting different signal encoding schemes, having different antenna configurations, and so forth.

The UT 1208 includes a communication system 1280 to establish communication with one or more satellites 1202. The communication system 1280 of the UT 1208 may include components similar to those of the communication system 1312 of a satellite 1202 and may perform similar communication functionalities. For example, the communication system 1280 may include one or more modems, digital signal processors, power amplifiers, antennas (including at least one antenna that implements multiple antenna elements, such as a phased array antenna), processors, memories, storage devices, communications peripherals, interface buses, and so forth. The UT 1208 passes user data 1212 between the constellation of satellites 1202 and the user device 1210. The user data 1212 includes data originated by the user device 1210 or addressed to the user device 1210. The UT 1208 may be fixed or in motion. For example, the UT 1208 may be used at a residence, or on a vehicle such as a car, boat, aerostat, drone, airplane, and so forth.

The UT 1208 includes a tracking system 1282. The tracking system 1282 uses almanac data 1284 to determine tracking data 1286. The almanac data 1284 provides information indicative of orbital elements of the orbit 1204 of one or more satellites 1202. For example, the almanac data 1284 may comprise orbital elements such as "two-line element" data for the satellites 1202 in the constellation that are broadcast or otherwise sent to the UTs 1208 using the communication system 1280.

The tracking system 1282 may use the current location of the UT 1208 and the almanac data 1284 to determine the tracking data 1286 for the satellite 1202. For example, based on the current location of the UT 1208 and the predicted position and movement of the satellites 1202, the tracking system 1282 is able to calculate the tracking data 1286. The tracking data 1286 may include information indicative of azimuth, elevation, distance to the second satellite, time of flight correction, or other information at a specified time. The determination of the tracking data 1286 may be ongoing. For example, the first UT 1208 may determine tracking data 1286 every 100 milliseconds, every second, every five seconds, or at other intervals.

With regard to FIG. 12, an uplink is a communication link which allows data to be sent to a satellite 1202 from a ground station 1206, UT 1208, or device other than another satellite 1202. Uplinks are designated as UL1, UL2, UL3, and so forth. For example, UL1 is a first uplink from the ground station 1206 to the second satellite 1202(2). In comparison, a downlink is a communication link which allows data to be sent from the satellite 1202 to a ground station 1206, UT 1208, or device other than another satellite 1202. For example, DLI is a first downlink from the second satellite 1202(2) to the ground station 1206. The satellites 1202 may also be in communication with one another. For example, an intersatellite link 1290 provides for communication between satellites 1202 in the constellation.

The satellite 1202, the ground station 1206, the user terminal 1208, the user device 1210, the management system 1250, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 13:
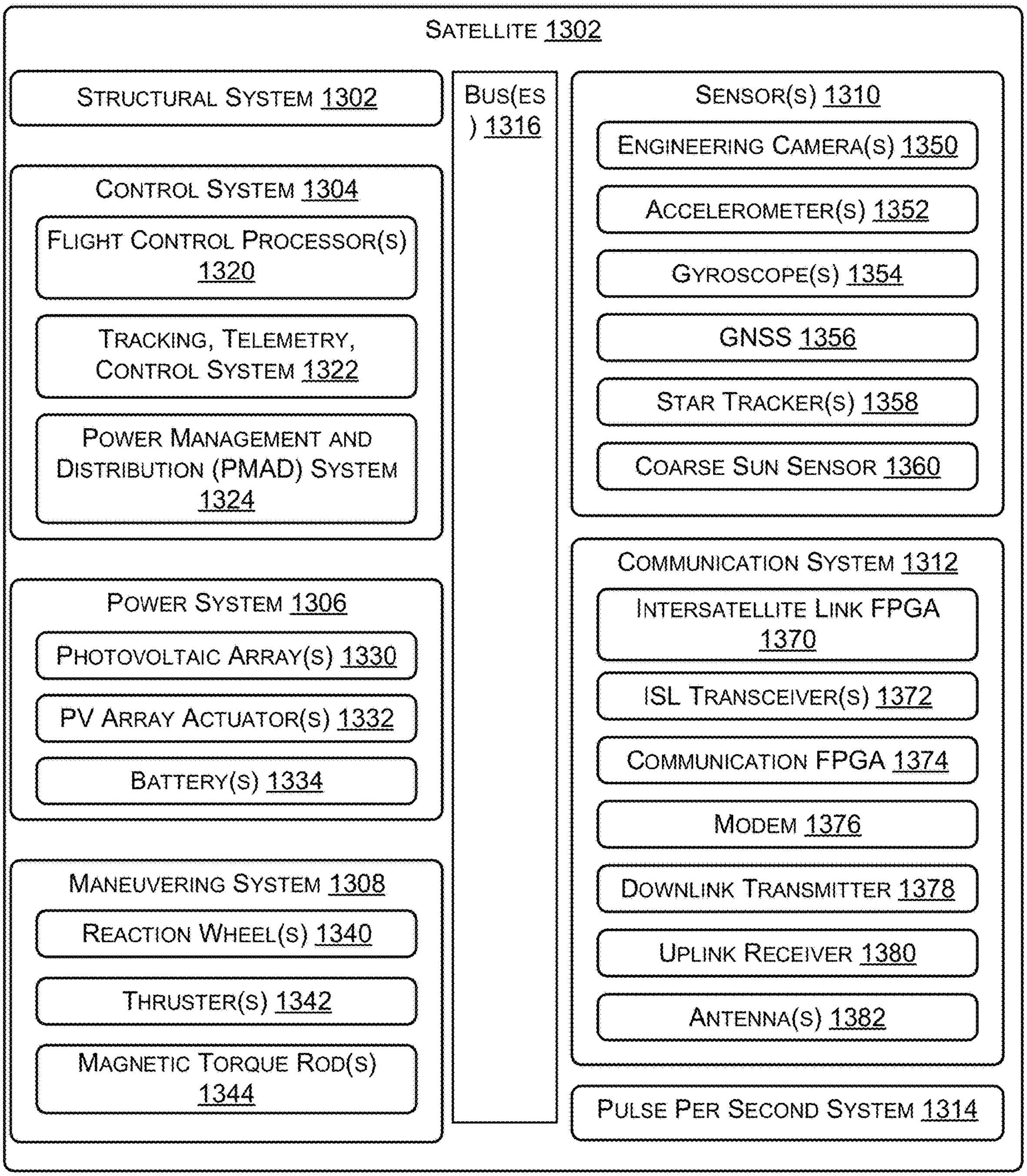
FIG. 13 is a block diagram of some systems associated with the satellite, according to some implementations.

FIG. 13 is a block diagram of some systems associated with the satellite 1202, according to some implementations. The satellite 1202 may comprise a structural system 1302, a control system 1304, a power system 1306, a maneuvering system 1308, one or more sensors 1310, and a communication system 1312. A pulse per second (PPS) system 1314 may be used to provide timing reference to the systems onboard the satellite 1202. One or more busses 1316 may be used to transfer data between the systems onboard the satellite 1202. In some implementations, redundant busses 1316 may be provided. The busses 1316 may include, but are not limited to, data busses such as Controller Area Network Flexible Data Rate (CAN FD), Ethernet, Serial Peripheral Interface (SPI), and so forth. In some implementations the busses 1316 may carry other signals. For example, a radio frequency bus may comprise coaxial cable, waveguides, and so forth to transfer radio signals from one part of the satellite 1202 to another. In other implementations, some systems may be omitted, or other systems added. One or more of these systems may be communicatively coupled with one another in various combinations.

The structural system 1302 comprises one or more structural elements to support operation of the satellite 1202. For example, the structural system 1302 may include trusses, struts, panels, and so forth. The components of other systems may be affixed to, or housed by, the structural system 1302. For example, the structural system 1302 may provide mechanical mounting and support for solar panels in the power system 1306. The structural system 1302 may also provide for thermal control to maintain components of the satellite 1202 within operational temperature ranges. For example, the structural system 1302 may include louvers, heat sinks, radiators, and so forth.

The control system 1304 provides various services, such as operating the onboard systems, resource management, providing telemetry, processing commands, and so forth. For example, the control system 1304 may direct operation of the communication system 1312. The control system 1304 may include one or more flight control processors 1320. The flight control processors 1320 may comprise one or more processors, FPGAs, and so forth. A tracking, telemetry, and control (TTC) system 1322 may include one or more processors, radios, and so forth. For example, the TTC system 1322 may comprise a dedicated radio transmitter and receiver to receive commands from a ground station 1206, send telemetry to the ground station 1206, and so forth. A power management and distribution (PMAD) system 1324 may direct operation of the power system 1306, control distribution of power to the systems of the satellite 1202, control battery 1334 charging, and so forth.

The power system 1306 provides electrical power for operation of the components onboard the satellite 1202. The power system 1306 may include components to generate electrical energy. For example, the power system 1306 may comprise one or more photovoltaic arrays 1330 comprising a plurality of photovoltaic cells, thermoelectric devices, fuel cells, and so forth. One or more photovoltaic (PV) array actuators 1332 may be used to change the orientation of the photovoltaic array(s) 1330 relative to the satellite 1202. For example, the PV array actuator 1332 may comprise a motor. The power system 1306 may include components to store electrical energy. For example, the power system 1306 may comprise one or more batteries 1334, fuel cells, and so forth.

The maneuvering system 1308 maintains the satellite 1202 in one or more of a specified orientation or orbit 1204. For example, the maneuvering system 1308 may stabilize the satellite 1202 with respect to one or more axes. In another example, the maneuvering system 1308 may move the satellite 1202 to a specified orbit 1204. The maneuvering system 1308 may include one or more of reaction wheel(s) 1340, thrusters 1342, magnetic torque rods 1344, solar sails, drag devices, and so forth. The thrusters 1342 may include, but are not limited to, cold gas thrusters, hypergolic thrusters, solid-fuel thrusters, ion thrusters, arcjet thrusters, electrothermal thrusters, and so forth. During operation, the thrusters may expend propellent. For example, an electrothermal thruster may use water as propellent, using electrical power obtained from the power system 1306 to expel the water and produce thrust. During operation, the maneuvering system 1308 may use data obtained from one or more of the sensors 1310.

The satellite 1202 includes one or more sensors 1310. The sensors 1310 may include one or more engineering cameras 1350. For example, an engineering camera 1350 may be mounted on the satellite 1202 to provide images of at least a portion of the photovoltaic array 1330. Accelerometers 1352 provide information about acceleration of the satellite 1202 along one or more axes. Gyroscopes 1354 provide information about rotation of the satellite 1202 with respect to one or more axes. The sensors 1310 may include a global navigation satellite system (GNSS) 1356 receiver, such as a Global Positioning System (GPS) receiver, to provide information about the position of the satellite 1202 relative to Earth. In some implementations the GNSS 1356 may also provide information indicative of velocity, orientation, and so forth. One or more star trackers 1358 may be used to determine an orientation of the satellite 1202. A coarse sun sensor 1360 may be used to detect the sun, provide information on the relative position of the sun with respect to the satellite 1202, and so forth. The satellite 1202 may include other sensors 1310 as well. For example, the satellite 1202 may include a horizon detector, radar, lidar, and so forth.

The communication system 1312 provides communication with one or more other devices, such as other satellites 1202, ground stations 1206, user terminals 1208, and so forth. The communication system 1312 may include one or more modems 1376, digital signal processors, power amplifiers, antennas (including at least one antenna that implements multiple antenna elements, such as a phased array antenna) 1382, processors, memories, storage devices, communications peripherals, interface buses, and so forth. Such components support communications with other satellites 1202, ground stations 1206, user terminals 1208, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1312 may be output to other systems, such as to the control system 1304, for further processing. Output from a system, such as the control system 1304, may be provided to the communication system 1312 for transmission.

The communication system 1312 may include hardware to support the intersatellite link 1290. For example, an intersatellite link FPGA 1370 may be used to modulate data that is sent and received by an ISL transceiver 1372 to send data between satellites 1202. The intersatellite links (ISL) transceiver 1372 may operate using radio frequencies, optical frequencies, and so forth.

A communication FPGA 1374 may be used to facilitate communication between the satellite 1202 and the ground stations 1206, UTs 108, and so forth. For example, the communication FPGA 1374 may direct operation of a modem 1376 to modulate signals sent using a downlink transmitter 1378 and demodulate signals received using an uplink receiver 1380. The satellite 1202 may include one or more antennas 1382. For example, one or more parabolic antennas may be used to provide communication between the satellite 1202 and one or more ground stations 1206. In another example, a phased array antenna may be used to provide communication between the satellite 1202 and the UTs 1208.

Figure 14:
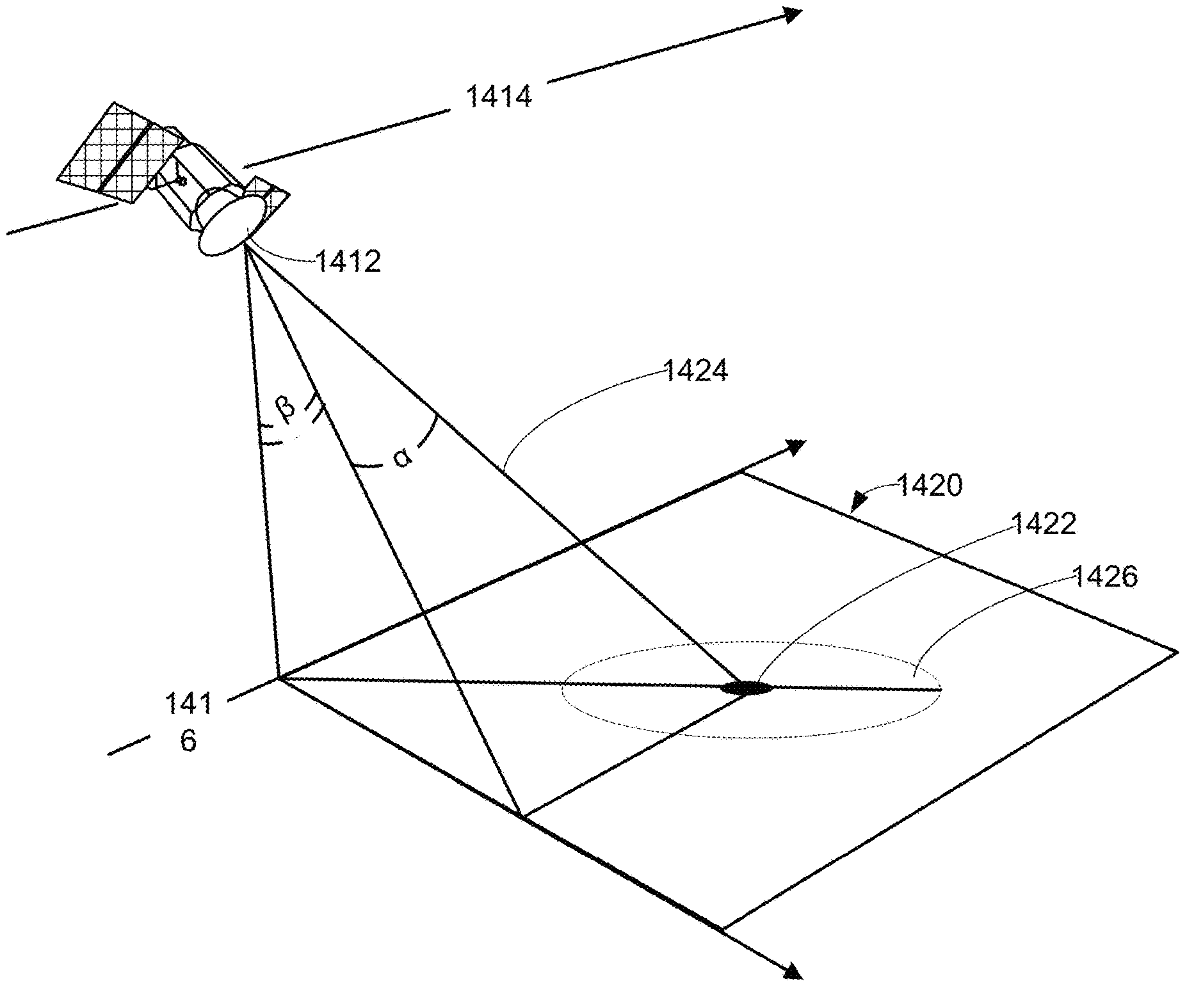
FIG. 14 illustrates the satellite including an antenna system that is steerable, according to another embodiment.

FIG. 14 illustrates the satellite 1400 including an antenna system 1412 that is steerable. The satellite 1400 is an example of a satellite 1202 of FIG. 12. The antenna system 1412 may include multiple antenna elements that form an antenna (e.g., interleaved phased array antennas illustrated in FIGS. 1-10). The antenna system 1412 can be mechanically or electrically steered individually, collectively, or a combination thereof. In an example, the antenna is a phased array antenna.

In orbit 1204, the satellite 1400 follows a path 1414, the projection of which onto the surface of the Earth forms a ground path 1416. In the example illustrated in FIG. 14, the ground path 1416 and a projected axis extending orthogonally from the ground path 1416 at the position of the satellite 1400, together define a region 1420 of the surface of the Earth. In this example, the satellite 1400 is capable of establishing uplink and downlink communications with one or more of ground stations, user terminals, or other devices within the region 1420, including a ground station 1206 and a user terminal 1208 of FIG. 12. In some embodiments, the region 1420 may be located in a different relative position to the ground path 1416 and the position of the satellite 1400. For example, the region 1420 may describe a region of the surface of the Earth directly below the satellite 1400. Furthermore, embodiments may include communications between the satellite 1400, an airborne communications system, and so forth.

As shown in FIG. 14, a communication target 1422 (e.g., a ground station or a user terminal) is located within the region 1420. The satellite 1400 controls the antenna system 1412 to steer transmission and reception of communications signals to selectively communicate with the communication target 1422. For example, in a downlink transmission from the satellite 1400 to the communication target 1422, a signal beam 1424 emitted by the antenna system 1412 is steerable within an area 1426 of the region 1420. In some implementations, the signal beam 1424 may comprise a plurality of subbeams. The extents of the area 1426 define an angular range within which the signal beam 1424 is steerable, where the direction of the signal beam 1424 is described by a beam angle "α" relative to a surface normal vector of the antenna system 1412. In two-dimensional phased array antennas, the signal beam 1424 is steerable in two dimensions, described in FIG. 14 by a second angle "β" orthogonal to the beam angle α. In this way, the area 1426 is a two-dimensional area within the region 1420, rather than a linear track at a fixed angle determined by the orientation of the antenna system 1412 relative to the ground path 1416.

In FIG. 14, as the satellite 1400 follows the path 1414, the area 1426 tracks along the surface of the Earth. In this way, the communication target 1422, which is shown centered in the area 1426 for clarity, is within the angular range of the antenna system 1412 for a period of time. During that time, signals communicated between the satellite 1400 and the communication target 1422 are subject to bandwidth constraints, including but not limited to signal strength and calibration of the signal beam 1424. In an example, for phased array antenna systems, the signal beam 1424 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 15:
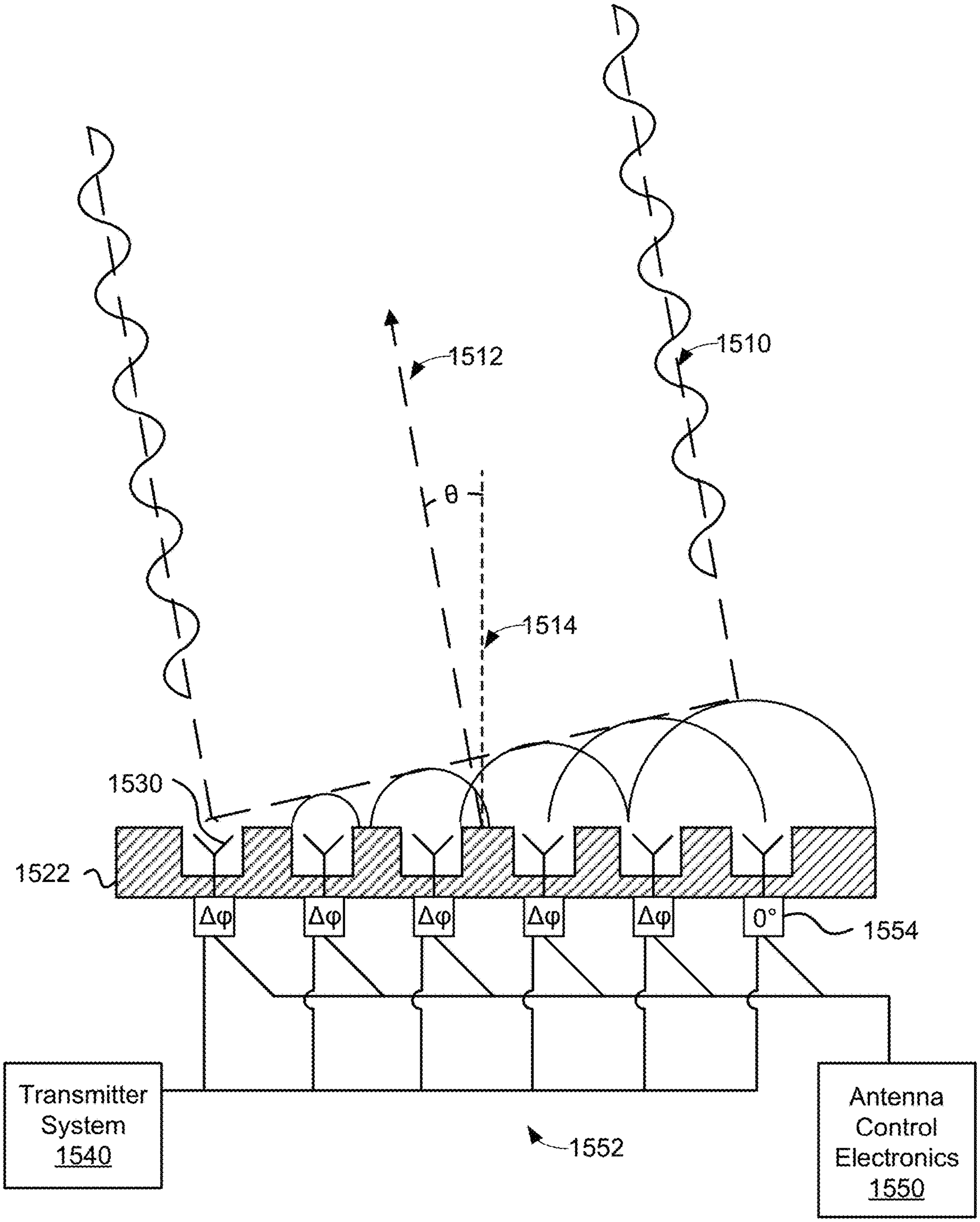
FIG. 15 illustrates a simplified schematic of an antenna, according to embodiments of the present disclosure.

FIG. 15 illustrates a simplified schematic of an antenna 1500, according to embodiments of the present disclosure. The antenna 1500 may be a component of the antenna system 1412 of FIG. 14. As illustrated, the antenna 1500 is a phased array antenna that includes multiple antenna elements 1530. Interference between the antenna elements 1530 forms a directional radiation pattern in both transmitter and receiver arrays, forming a beam 1510 (beam extents shown as dashed lines). The beam 1510 is a portion of a larger transmission pattern (not shown) that extends beyond the immediate vicinity of the antenna 1500. The beam 1510 is directed along a beam vector 1512, described by an angle "θ" relative to an axis 1514 normal to a surface of the antenna 1500. As described below, the beam 1510 is one or more of steerable or shapeable through control of operating parameters including, but not limited to, a phase and an amplitude of each antenna element 1530.

In FIG. 15, the antenna 1500 includes, within a transmitter section 1522, the plurality of antenna elements 1530, which may include, but are not limited to, omnidirectional transmitter antennas coupled to a transmitter system 1540, such as the downlink transmitter 1378. The transmitter system 1540 provides a signal, such as a downlink signal to be transmitted to a ground station on the surface. The downlink signal is provided to each antenna element 1530 as a time-varying signal that may include several multiplexed signals. To steer the beam 1510 relative to the axis 1514, the phased array antenna system 1500 includes antenna control electronics 1550 controlling a radio frequency (RF) feeding network 1552, including a plurality of signal conditioning components 1554 interposed between the antenna elements 1530 and the transmitter system 1540. The signal conditioning components 1554 introduce one or more of a phase modulation or an amplitude modulation, as denoted by "Δφ" in FIG. 15, to the signal sent to the antenna elements 1530. As shown in FIG. 15, introducing a progressive phase modulation produces interference in the individual transmission of each antenna element 1530 that generates the beam 1510.

The phase modulation imposed on each antenna element 1530 will differ and will be dependent on a spatial location of a communication target that determines an optimum beam vector (e.g., where the beam vector 1512 is found by one or more of maximizing signal intensity or connection strength). The optimum beam vector may change with time as the communication target 1422 moves relative to the phased array antenna system 1500.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as but not limited to, any type of disk, including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:

a support structure;

a first radio that operates according to a first radio function;

a second radio that operates according to a second radio function that is different than the first radio function;

a first phased array antenna coupled to the first radio, the first phased array antenna comprising a first plurality of antenna elements disposed on a surface of the support structure, the first plurality of antenna elements being organized as a first set of concentric patterns of antenna elements, the first set of concentric patterns of antenna elements defining a first set of annuluses in which there are none of the first plurality of antenna elements, each annulus of the first set of annuluses being located between two concentric patterns of the first set of concentric patterns; and a second phased array antenna coupled to the second radio, the second phased array antenna comprising a second plurality of antenna elements disposed on the surface of the support structure, the second plurality of antenna elements being organized as a second set of concentric patterns of antenna elements, the second set of concentric patterns of antenna elements defining a second set of annuluses in which there are none of the second plurality of antenna elements, each annulus of the second set of annuluses being located between two concentric patterns of the second set of concentric patterns, wherein the second set of concentric patterns of antenna elements of the second phased array antenna are located in the first set of annuluses of the first phased array antenna, and wherein a subset of the first set of concentric patterns of the first phased array antenna are located in the second set of annuluses of the second phased array antenna.

2. The wireless device of claim 1, wherein the first phased array antenna and the first radio are configured to send or receive first radio frequency (RF) signals with a first polarization corresponding to the first radio function, and wherein the second phased array antenna and the second radio are configured to send or receive second RF signals with a second polarization corresponding to the second radio function, the second polarization being different than the first polarization.

3. The wireless device of claim 1, wherein the first phased array antenna and the first radio are configured to send or receive first radio frequency (RF) signals in a first set of one or more beams corresponding to the first radio function, and wherein the second phased array antenna and the second radio are configured to send or receive second RF signals in a second set of one or more beams corresponding to the second radio function, the first set of one or more beams being different than the second set of one or more beams.

4. The wireless device of claim 1, wherein:

the first phased array antenna is configured to operate in a first frequency range, and the second phased array antenna is configured to operate in a second frequency range having frequencies that are lower than frequencies in the first frequency range; and each of the first plurality of antenna elements has a first size and each of the second plurality of antenna elements has a second size that is smaller than the first size.

5. The wireless device of claim 1, wherein:

the first phased array antenna is configured to operate with a first polarization; and the second phased array antenna is configured to operate with a second polarization that is different than the first polarization.

6. The wireless device of claim 5, wherein the first polarization is a right-hand-circular polarization (RHCP), and the second polarization is a left-hand-circular polarization (LHCP).

7. The wireless device of claim 1, wherein the first phased array antenna and the first radio are configured to send or receive first radio frequency (RF) signals in connection with a first subbeam of a signal beam, the first subbeam corresponding to the first radio function, and wherein the second phased array antenna and the second radio are configured to send or receive second RF signals in a second subbeam of the signal beam, the second subbeam corresponding to the second radio function.

8. The wireless device of claim 1, wherein:

the first radio comprises a first baseband processor and first radio frequency front-end (RFFE) circuitry to perform the first radio function; and the second radio comprises a second baseband processor and second RFFE circuitry to perform the second radio function.

9. The wireless device of claim 1, wherein:

the first radio comprises at least one of a first transmitter or a first receiver to send or receive first radio frequency (RF) signals corresponding to the first radio function; and the second radio comprises at least one of a second transmitter or a second receiver to send or receive second RF signals corresponding to the second radio function.

10. An apparatus comprising:

a support structure;

a first antenna comprising a first plurality of antenna elements disposed on a surface of the support structure, the first plurality of antenna elements being organized as a first set of concentric patterns of antenna elements, the first set of concentric patterns of antenna elements defining a first set of annuluses in which there are none of the first plurality of antenna elements, each annulus of the first set of annuluses being located between two concentric patterns of the first set of concentric patterns; and a second antenna comprising a second plurality of antenna elements disposed on the surface of the support structure, the second plurality of antenna elements being organized as a second set of concentric patterns of antenna elements, the second set of concentric patterns of antenna elements defining a second set of annuluses in which there are none of the second plurality of antenna elements, each annulus of the second set of annuluses being located between two concentric patterns of the second set of concentric patterns, wherein the second set of concentric patterns of antenna elements of the second antenna are located in the first set of annuluses of the first antenna, and wherein a subset of the first set of concentric patterns of the first antenna are located in the second set of annuluses of the second antenna.

11. The apparatus of claim 10, wherein the first antenna and a first radio are configured to send or receive first radio frequency (RF) signals with a first polarization corresponding to a first radio function, and wherein the second antenna and a second radio are configured to send or receive second RF signals with a second polarization corresponding to a second radio function, the second polarization being different than the first polarization.

12. The apparatus of claim 10, wherein the first antenna and a first radio are configured to send or receive first radio frequency (RF) signals in a first set of one or more beams corresponding to a first radio function, and wherein the second antenna and a second radio are configured to send or receive second RF signals in a second set of one or more beams corresponding to a second radio function, the first set of one or more beams being different than the second set of one or more beams.

13. The apparatus of claim 10, wherein:

the first antenna is configured to operate in a first frequency range, and the second antenna is configured to operate in a second frequency range having frequencies that are lower than frequencies in the first frequency range; and each of the first plurality of antenna elements has a first size and each of the second plurality of antenna elements has a second size that is smaller than the first size.

14. The apparatus of claim 10, wherein:

the first antenna is configured to operate with a first polarization; and the second antenna is configured to operate with a second polarization that is different than the first polarization.

15. The apparatus of claim 10, wherein the first antenna and a first radio are configured to send or receive first radio frequency (RF) signals in connection with a first subbeam of a signal beam, the first subbeam corresponding to a first radio function, and wherein the second antenna and a second radio are configured to send or receive second RF signals in a second subbeam of the signal beam, the second subbeam corresponding to a second radio function.

16. The apparatus of claim 10, wherein the first antenna is coupled to a first radio comprising a first baseband processor and first radio frequency front-end (RFFE) circuitry to perform a first radio function; and the second antenna is coupled to a second radio comprising a second baseband processor and second RFFE circuitry to perform a second radio function.

17. The apparatus of claim 10, wherein the first antenna is coupled to a first radio comprising at least one of a first transmitter or a first receiver to send or receive first radio frequency (RF) signals corresponding to a first radio function; and the second antenna is coupled to a second radio comprising at least one of a second transmitter or a second receiver to send or receive second RF signals corresponding to a second radio function.

18. An apparatus comprising:

a support structure;

a first antenna comprising a first plurality of antenna elements disposed on a surface of the support structure, the first plurality of antenna elements being organized as a first set of concentric patterns of antenna elements, the first set of concentric patterns of antenna elements defining a first set of annuluses in which there are none of the first plurality of antenna elements, each annulus of the first set of annuluses being located between two concentric patterns of the first set of concentric patterns;

a second antenna comprising a second plurality of antenna elements disposed on the surface of the support structure, the second plurality of antenna elements being organized as a second set of concentric patterns of antenna elements, the second set of concentric patterns of antenna elements defining a second set of annuluses in which there are none of the second plurality of antenna elements, each annulus of the second set of annuluses being located between two concentric patterns of the second set of concentric patterns, wherein the second set of concentric patterns of antenna elements of the second antenna are located in the first set of annuluses of the first antenna, and wherein a subset of the first set of concentric patterns of the first antenna are located in the second set of annuluses of the second antenna;

a first radio coupled to the first antenna, wherein the first radio operates according to a first radio function; and a second radio coupled to the second antenna, wherein the second radio operates according to a second radio function that is different from the first radio function.

19. The apparatus of claim 18, wherein the first radio comprises at least one of a first transmitter or a first receiver, and the second radio comprises at least one of a second transmitter or a second receiver, wherein the first antenna and the first radio are configured to send or receive first radio frequency (RF) signals with a first polarization corresponding to the first radio function, and wherein the second antenna and the second radio are configured to send or receive second RF signals with a second polarization corresponding to the second radio function, the second polarization being different than the first polarization.

20. The apparatus of claim 18, wherein the first radio comprises a first baseband processor and first radio frequency front-end (RFFE) circuitry, and the second radio comprises a second baseband processor and second RFFE circuitry, wherein the first antenna and the first radio are configured to send or receive first radio frequency (RF) signals in a first set of one or more beams corresponding to the first radio function, and wherein the second antenna and the second radio are configured to send or receive second RF signals in a second set of one or more beams corresponding to the second radio function, the first set of one or more beams being different than the second set of one or more beams.

* * * * *